(12) United States Patent
Allen et al.

(10) Patent No.: US 12,726,454 B1
(45) Date of Patent: Sep. 1, 2026

(54) GALLERY USER INTERFACE WITH LAST POSTED MESSAGE INDICATION

(71) Applicant: Snap Inc., Santa Monica, CA (US)

(72) Inventors: Nicholas Allen, Santa Monica, CA (US); Donald Giovannini, Venice, CA (US); Chiayi Lin, Venice, CA (US); Robert Murphy, Venice, CA (US); Evan Spiegel, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/224,365

(22) Filed: Jul. 29, 2016

Related U.S. Application Data

(63) Continuation of application No. 14/505,478, filed on Oct. 2, 2014, now Pat. No. 9,537,811.

(51) Int. Cl.

| | |
|---|---|
| ***G06F 15/16*** | (2006.01) |
| ***G06F 3/0482*** | (2013.01) |
| ***G06F 16/16*** | (2019.01) |
| ***G06F 16/215*** | (2019.01) |
| ***G06F 16/23*** | (2019.01) |
| ***H04L 51/42*** | (2022.01) |
| *G06Q 10/40* | (2026.01) |

(52) U.S. Cl.
CPC ............ *H04L 51/42* (2022.05); *G06F 3/0482* (2013.01); *G06F 16/162* (2019.01); *G06F 16/215* (2019.01); *G06F 16/2365* (2019.01); *G06Q 10/40* (2026.01)

(58) Field of Classification Search
CPC ............. G06F 3/0482; G06F 17/30117; G06F 17/30303; G06F 17/30371
USPC .......................................................... 709/206
See application file for complete search history.

(56) References Cited

U.S. PATENT DOCUMENTS

| | | | |
|---|---|---|---|
| 666,223 | A | 1/1901 | Shedlock |
| 4,581,634 | A | 4/1986 | Williams |
| 4,654,795 | A | 3/1987 | Shimoni |
| 4,975,690 | A | 12/1990 | Torres |
| 5,072,412 | A | 12/1991 | Henderson, Jr. et al. |

(Continued)

FOREIGN PATENT DOCUMENTS

| | | |
|---|---|---|
| CA | 2887596 A1 | 7/2015 |
| CA | 2894332 C | 8/2018 |

(Continued)

OTHER PUBLICATIONS

US 10,075,404 B1, 09/2018, Allen et al. (withdrawn)

(Continued)

*Primary Examiner* — Thuong Nguyen
(74) *Attorney, Agent, or Firm* — Schwegman Lundberg & Woessner, P.A.

(57) ABSTRACT

A server maintains a gallery of ephemeral messages. Each ephemeral message is posted to the gallery by a user for viewing by recipients via recipient devices. In response to a gallery view request from any of the recipient devices, the ephemeral messages in the gallery are displayed on the requesting device in automated sequence, each message being displayed for a respective display duration before display of the next message in the gallery. A user interface via which the gallery is viewable includes indicia based on a posting time of that one of the plurality of ephemeral messages which was posted to the gallery last.

20 Claims, 10 Drawing Sheets

(56) References Cited

U.S. PATENT DOCUMENTS 5,493,692 A 2/1996 Theimer et al.
5,713,073 A 1/1998 Warsta
5,754,939 A 5/1998 Herz et al.
5,855,008 A 12/1998 Goldhaber et al.
5,883,639 A 3/1999 Walton et al.
5,999,932 A 12/1999 Paul
6,012,098 A 1/2000 Bayeh et al.
6,014,090 A 1/2000 Rosen et al.
6,029,141 A 2/2000 Bezos et al.
6,038,295 A 3/2000 Mattes
6,049,711 A 4/2000 Yehezkel et al.
6,075,535 A 6/2000 Fitzhugh et al.
6,154,764 A 11/2000 Nitta et al.
6,158,044 A 12/2000 Tibbetts
6,167,435 A 12/2000 Druckenmiller et al.
6,204,840 B1 3/2001 Petelycky et al.
6,205,432 B1 3/2001 Gabbard et al.
6,216,141 B1 4/2001 Straub et al.
6,285,381 B1 9/2001 Sawano et al.
6,285,987 B1 9/2001 Roth et al.
6,290,504 B1 9/2001 Benitz et al.
6,310,694 B1 10/2001 Okimoto et al.
6,317,789 B1 11/2001 Rakavy et al.
6,334,149 B1 12/2001 Davis, Jr. et al.
6,349,203 B1 2/2002 Asaoka et al.
6,353,170 B1 3/2002 Eyzaguirre et al.
6,363,380 B1 3/2002 Dimitrova
6,446,004 B1 9/2002 Cao et al.
6,449,657 B2 9/2002 Stanbach et al.
6,456,852 B2 9/2002 Bar et al.
6,484,196 B1 11/2002 Maurille
6,487,586 B2 11/2002 Ogilvie et al.
6,487,601 B1 11/2002 Hubacher et al.
6,499,016 B1 12/2002 Anderson
6,523,008 B1 2/2003 Avrunin
6,542,476 B1 * 4/2003 Elizondo ............... H04W 76/38
370/278
6,542,749 B2 4/2003 Tanaka et al.
6,549,768 B1 4/2003 Fraccaroli
6,587,118 B1 7/2003 Yoneda
6,618,593 B1 9/2003 Drutman et al.
6,622,174 B1 9/2003 Ukita et al.
6,631,463 B1 10/2003 Floyd et al.
6,636,247 B1 10/2003 Hamzy et al.
6,636,855 B2 10/2003 Holloway et al.
6,643,684 B1 11/2003 Malkin et al.
6,658,095 B1 12/2003 Yoakum et al.
6,665,531 B1 12/2003 Soderbacka et al.
6,668,173 B2 12/2003 Greene
6,684,238 B1 1/2004 Dutta
6,684,257 B1 1/2004 Camut et al.
6,684,293 B1 1/2004 Backman et al.
6,698,020 B1 2/2004 Zigmond et al.
6,700,506 B1 3/2004 Winkler
6,701,347 B1 3/2004 Ogilvie
6,711,608 B1 3/2004 Ogilvie
6,720,860 B1 4/2004 Narayanaswami
6,724,403 B1 4/2004 Santoro et al.
6,757,713 B1 6/2004 Ogilvie et al.
6,832,222 B1 12/2004 Zimowski
6,834,195 B2 12/2004 Brandenberg et al.
6,836,792 B1 12/2004 Chen
6,898,626 B2 5/2005 Ohashi
6,959,324 B1 10/2005 Kubik et al.
6,970,088 B2 11/2005 Kovach
6,970,907 B1 11/2005 Ullmann et al.
6,980,909 B2 12/2005 Root et al.
6,981,040 B1 12/2005 Konig et al.
7,004,394 B2 2/2006 Kim
7,020,494 B2 3/2006 Spriestersbach et al.
7,027,124 B2 4/2006 Foote et al.
7,072,963 B2 7/2006 Anderson et al.
7,085,571 B2 8/2006 Kalhan et al.
7,110,744 B2 9/2006 Freeny, Jr.
7,124,091 B1 10/2006 Khoo et al.
7,124,164 B1 10/2006 Chemtob
7,142,823 B1 11/2006 Logue et al.
7,149,893 B1 12/2006 Leonard et al.
7,173,651 B1 2/2007 Knowles
7,188,143 B2 3/2007 Szeto
7,203,380 B2 4/2007 Chiu et al.
7,206,568 B2 4/2007 Sudit
7,227,937 B1 6/2007 Yoakum et al.
7,237,002 B1 6/2007 Estrada et al.
7,240,025 B2 7/2007 Stone et al.
7,240,089 B2 7/2007 Boudreau
7,243,163 B1 7/2007 Friend et al.
7,254,585 B2 8/2007 Frieden et al.
7,269,426 B2 9/2007 Kokkonen et al.
7,278,168 B1 10/2007 Chaudhury et al.
7,280,658 B2 10/2007 Amini et al.
7,315,823 B2 1/2008 Brondrup
7,349,768 B2 3/2008 Bruce et al.
7,356,564 B2 4/2008 Hartselle et al.
7,376,715 B2 5/2008 Cunningham et al.
7,394,345 B1 7/2008 Ehlinger et al.
7,411,493 B2 8/2008 Smith
7,423,580 B2 9/2008 Markhovsky et al.
7,454,442 B2 11/2008 Cobleigh et al.
7,478,402 B2 1/2009 Christensen et al.
7,496,347 B2 2/2009 Puranik
7,496,567 B1 2/2009 Steichen
7,508,419 B2 3/2009 Toyama et al.
7,512,649 B2 3/2009 Faybishenko et al.
7,519,670 B2 4/2009 Hagale et al.
7,535,890 B2 5/2009 Rojas
7,546,554 B2 6/2009 Chiu et al.
7,571,244 B2 8/2009 Costanzo et al.
7,607,096 B2 10/2009 Oreizy et al.
7,639,943 B1 12/2009 Kalajan
7,650,231 B2 1/2010 Gadler
7,668,537 B2 2/2010 DeVries
7,703,140 B2 4/2010 Nath et al.
7,770,137 B2 8/2010 Forbes et al.
7,778,973 B2 8/2010 Choi
7,779,444 B2 8/2010 Glad
7,787,886 B2 8/2010 Markhovsky et al.
7,796,946 B2 9/2010 Eisenbach
7,801,954 B2 9/2010 Cadiz et al.
7,856,360 B2 12/2010 Kramer et al.
7,856,449 B1 12/2010 Martino et al.
7,912,896 B2 3/2011 Wolovitz et al.
7,934,156 B2 4/2011 Forstall et al.
7,971,156 B2 6/2011 Albertson et al.
7,991,638 B1 8/2011 House et al.
7,996,793 B2 8/2011 Latta et al.
8,001,204 B2 8/2011 Burtner et al.
8,014,762 B2 9/2011 Chmaytelli et al.
8,032,586 B2 10/2011 Challenger et al.
8,063,797 B1 11/2011 Sonnabend et al.
8,073,947 B1 12/2011 Yeh et al.
8,082,255 B1 12/2011 Carlson, Jr. et al.
8,090,351 B2 1/2012 Klein
8,098,904 B2 1/2012 Loffe et al.
8,099,109 B2 1/2012 Altman et al.
8,112,716 B2 2/2012 Kobayashi
8,127,035 B1 2/2012 Hood et al.
8,131,597 B2 3/2012 Hudetz
8,135,166 B2 3/2012 Rhoads et al.
8,136,028 B1 3/2012 Loeb et al.
8,146,001 B1 3/2012 Reese
8,161,115 B2 4/2012 Yamamoto
8,161,417 B1 4/2012 Lee
8,170,957 B2 5/2012 Richard
8,195,203 B1 6/2012 Tseng
8,199,747 B2 6/2012 Rojas et al.
8,208,943 B2 6/2012 Petersen
8,214,443 B2 7/2012 Hamburg
8,234,350 B1 7/2012 Gu et al.
8,238,947 B2 8/2012 Lottin et al.
8,244,593 B2 8/2012 Klinger et al.
8,276,092 B1 9/2012 Narayanan et al.
8,279,319 B2 10/2012 Date
8,280,406 B2 10/2012 Ziskind et al.

(56) References Cited

U.S. PATENT DOCUMENTS 8,285,199 B2 10/2012 Hsu et al.
8,287,380 B2 10/2012 Nguyen et al.
8,301,159 B2 10/2012 Hamynen et al.
8,306,922 B1 11/2012 Kunal et al.
8,312,086 B2 11/2012 Velusamy et al.
8,312,097 B1 11/2012 Siegel et al.
8,326,315 B2 12/2012 Phillips et al.
8,326,327 B2 12/2012 Hymel et al.
8,332,475 B2 12/2012 Rosen et al.
8,347,021 B1 1/2013 Phillips et al.
8,352,494 B1 1/2013 Badoiu
8,352,546 B1 1/2013 Dollard
8,369,866 B2 2/2013 Ashley, Jr. et al.
8,379,130 B2 2/2013 Forutanpour et al.
8,385,950 B1 2/2013 Wagner et al.
8,402,097 B2 3/2013 Szeto
8,405,773 B2 3/2013 Hayashi et al.
8,418,067 B2 4/2013 Cheng et al.
8,423,409 B2 4/2013 Rao
8,428,453 B1 4/2013 Spiegel et al.
8,471,914 B2 6/2013 Sakiyama et al.
8,472,935 B1 6/2013 Fujisaki
8,487,938 B2 7/2013 Latta et al.
8,494,481 B1 7/2013 Bacco et al.
8,510,383 B2 8/2013 Hurley et al.
8,527,345 B2 9/2013 Rothschild et al.
8,542,685 B2 9/2013 Forbes, Jr. et al.
8,554,627 B2 10/2013 Svendsen et al.
8,560,612 B2 10/2013 Kilmer et al.
8,570,907 B2 10/2013 Garcia, Jr. et al.
8,594,680 B2 11/2013 Ledlie et al.
8,613,089 B1 12/2013 Holloway et al.
8,639,648 B2 1/2014 Koponen et al.
8,660,358 B1 2/2014 Bergboer et al.
8,660,369 B2 2/2014 Llano et al.
8,660,793 B2 2/2014 Ngo et al.
8,661,466 B2 2/2014 Stephens
8,666,152 B1 3/2014 Ramanathan et al.
8,681,178 B1 3/2014 Tseng
8,682,350 B2 3/2014 Altman et al.
8,686,962 B2 4/2014 Christie
8,687,021 B2 4/2014 Bathiche et al.
8,688,519 B1 4/2014 Lin et al.
8,713,124 B1 4/2014 Weiss
8,718,333 B2 5/2014 Wolf et al.
8,724,622 B2 5/2014 Rojas
8,732,168 B2 5/2014 Johnson
8,744,523 B2 6/2014 Fan et al.
8,745,132 B2 6/2014 Obradovich
8,751,310 B2 6/2014 Van Datta et al.
8,761,800 B2 6/2014 Kuwahara
8,762,201 B1 6/2014 Noonan
8,768,876 B2 7/2014 Shim et al.
8,775,401 B2 7/2014 Zhou et al.
8,775,972 B2 7/2014 Spiegel
8,788,680 B1 7/2014 Naik
8,788,947 B2 7/2014 Putz et al.
8,790,187 B2 7/2014 Walker et al.
8,797,415 B2 8/2014 Arnold
8,798,646 B1 8/2014 Wang et al.
8,856,349 B2 10/2014 Jain et al.
8,856,691 B2 10/2014 Geisner et al.
8,868,223 B1 10/2014 Sharifi
8,874,677 B2 10/2014 Rosen et al.
8,886,227 B2 11/2014 Schmidt et al.
8,909,679 B2 12/2014 Roote et al.
8,909,714 B2 12/2014 Agarwal et al.
8,909,725 B1 12/2014 Sehn
8,914,752 B1 12/2014 Spiegel
8,925,106 B1 12/2014 Steiner et al.
8,943,140 B1 1/2015 Kothari
8,965,271 B1 2/2015 Vucurevich
8,972,357 B2 3/2015 Shim et al.
8,977,296 B1 3/2015 Briggs et al.
8,982,161 B2 3/2015 Koshimae
8,995,433 B2 3/2015 Rojas
9,015,285 B1 4/2015 Ebsen et al.
9,020,745 B2 4/2015 Johnston et al.
9,026,943 B1 5/2015 Spiegel
9,037,577 B1 5/2015 Saylor et al.
9,040,574 B2 5/2015 Wang et al.
9,043,329 B1 5/2015 Patton et al.
9,055,416 B2 6/2015 Rosen et al.
9,063,638 B1 6/2015 Schrock et al.
9,083,770 B1 7/2015 Dröse et al.
9,094,137 B1 7/2015 Sehn et al.
9,098,832 B1 8/2015 Scardino
9,100,806 B2 8/2015 Rosen et al.
9,100,807 B2 8/2015 Rosen et al.
9,113,301 B1 8/2015 Spiegel et al.
9,119,027 B2 8/2015 Sharon et al.
9,123,074 B2 9/2015 Jacobs
9,137,700 B2 9/2015 Elefant et al.
9,143,382 B2 9/2015 Bhogal et al.
9,143,681 B1 9/2015 Ebsen et al.
9,148,424 B1 9/2015 Yang
9,148,742 B1 9/2015 Koulomzin et al.
9,152,477 B1 10/2015 Campbell et al.
9,159,364 B1 10/2015 Matias et al.
9,191,776 B2 11/2015 Root et al.
9,204,252 B2 12/2015 Root
9,225,805 B2 12/2015 Kujawa et al.
9,225,897 B1 12/2015 Sehn et al.
9,230,160 B1 1/2016 Kanter
9,237,202 B1 1/2016 Sehn
9,258,459 B2 2/2016 Hartley
9,264,463 B2 2/2016 Rubinstein et al.
9,269,011 B1 2/2016 Sikka et al.
9,276,886 B1 3/2016 Samaranayake
9,294,425 B1 3/2016 Son
9,319,472 B2 4/2016 Cathcart et al.
9,344,606 B2 5/2016 Hartley et al.
9,385,983 B1 7/2016 Sehn
9,396,354 B1 7/2016 Murphy et al.
9,407,712 B1 8/2016 Sehn
9,407,816 B1 8/2016 Sehn
9,417,754 B2 8/2016 Smith
9,430,783 B1 8/2016 Sehn
9,439,041 B2 9/2016 Parvizi et al.
9,443,227 B2 9/2016 Evans et al.
9,450,907 B2 9/2016 Pridmore et al.
9,459,778 B2 10/2016 Hogeg et al.
9,477,391 B2 10/2016 Flynn, III et al.
9,482,882 B1 11/2016 Hanover et al.
9,482,883 B1 11/2016 Meisenholder
9,489,661 B2 11/2016 Evans et al.
9,491,134 B2 11/2016 Rosen et al.
9,532,171 B2 12/2016 Allen et al.
9,537,811 B2 * 1/2017 Allen .................... H04L 51/22 709/206
9,542,422 B2 1/2017 Duggal et al.
9,544,379 B2 1/2017 Gauglitz et al.
9,560,006 B2 1/2017 Prado et al.
9,591,445 B2 3/2017 Zises
9,628,950 B1 4/2017 Noeth et al.
9,641,572 B1 5/2017 Yeskel et al.
9,645,221 B1 5/2017 Heizer
9,648,581 B1 5/2017 Vaynblat et al.
9,652,896 B1 5/2017 Jurgenson et al.
9,659,244 B2 5/2017 Anderton et al.
9,672,538 B1 6/2017 Vaynblat et al.
9,674,660 B1 6/2017 Vaynblat et al.
9,693,191 B2 6/2017 Sehn
9,705,831 B2 7/2017 Spiegel
9,706,355 B1 7/2017 Cali et al.
9,710,821 B2 7/2017 Heath
9,742,713 B2 8/2017 Spiegel et al.
9,785,796 B1 10/2017 Murphy et al.
9,788,027 B1 10/2017 Vucurevich
9,802,121 B2 10/2017 Ackley et al.
9,825,898 B2 11/2017 Sehn
9,843,720 B1 12/2017 Ebsen et al.
9,854,219 B2 12/2017 Sehn
9,866,999 B1 1/2018 Noeth et al.

(56) References Cited

U.S. PATENT DOCUMENTS 9,881,094 B2 1/2018 Pavlovskaia et al.
9,894,478 B1 2/2018 Deluca et al.
9,961,520 B2 5/2018 Brooks et al.
10,026,226 B1 7/2018 Lotto
10,080,102 B1 9/2018 Noeth et al.
10,102,423 B2 10/2018 Shaburov et al.
10,133,705 B1 11/2018 Allen et al.
10,135,949 B1 11/2018 Pavlovskaia et al.
10,182,311 B2 1/2019 Sehn
10,186,299 B2 1/2019 Wang et al.
10,200,813 B1 2/2019 Allen et al.
10,250,683 B2 4/2019 Karkkainen et al.
10,284,508 B1 5/2019 Allen et al.
10,285,002 B2 5/2019 Colonna et al.
10,285,006 B2 5/2019 Colonna et al.
10,289,287 B2 5/2019 Rathod
10,311,916 B2 6/2019 Sehn
10,349,209 B1 7/2019 Noeth et al.
10,354,425 B2 7/2019 Yan et al.
10,395,519 B2 8/2019 Colonna et al.
10,416,845 B1 9/2019 Allen et al.
10,438,094 B1 10/2019 Ko et al.
10,439,972 B1 10/2019 Spiegel et al.
10,440,420 B2 10/2019 Hogeg et al.
10,448,201 B1 10/2019 Sehn et al.
10,475,079 B2 11/2019 Hagen et al.
10,476,830 B2 11/2019 Allen et al.
10,509,466 B1 12/2019 Miller et al.
10,514,876 B2 12/2019 Sehn
10,524,087 B1 12/2019 Allen et al.
10,572,681 B1 2/2020 Murphy et al.
10,579,869 B1 3/2020 Xiong et al.
10,580,458 B2 3/2020 Sehn
10,581,782 B2 3/2020 Tang
10,582,277 B2 3/2020 Tang
10,591,730 B2 3/2020 Rodriguez, II
10,614,855 B2 4/2020 Huang
10,616,239 B2 4/2020 Allen et al.
10,616,476 B1 4/2020 Ebsen et al.
10,623,891 B2 4/2020 Sehn et al.
10,659,914 B1 5/2020 Allen et al.
10,708,210 B1 7/2020 Allen et al.
10,748,347 B1 8/2020 Li et al.
10,779,113 B2 9/2020 Sehn et al.
10,811,053 B2 10/2020 Sehn
10,893,055 B2 1/2021 Allen et al.
10,944,710 B1 3/2021 Allen et al.
10,958,608 B1 3/2021 Allen et al.
10,962,809 B1 3/2021 Castañeda
10,990,697 B2 4/2021 Murphy et al.
10,996,846 B2 5/2021 Robertson et al.
10,997,787 B2 5/2021 Ge et al.
11,012,390 B1 5/2021 Al Majid et al.
11,012,398 B1 5/2021 Allen et al.
11,030,454 B1 6/2021 Xiong et al.
11,036,368 B1 6/2021 Al Majid et al.
11,038,829 B1 6/2021 Allen et al.
11,062,498 B1 7/2021 Voss et al.
11,087,728 B1 8/2021 Canberk et al.
11,092,998 B1 8/2021 Castañeda et al.
11,106,342 B1 8/2021 Al Majid et al.
11,126,206 B2 9/2021 Meisenholder et al.
11,143,867 B2 10/2021 Rodriguez, II
11,166,121 B2 11/2021 Sehn et al.
11,169,600 B1 11/2021 Canberk et al.
11,227,626 B1 1/2022 Krishnan Gorumkonda et al.
11,249,617 B1 2/2022 Allen et al.
11,250,887 B2 2/2022 Sehn
11,307,747 B2 4/2022 Dancie et al.
11,317,240 B2 4/2022 Allen et al.
11,372,608 B2 6/2022 Sehn
11,411,908 B1 8/2022 Allen et al.
11,522,822 B1 12/2022 Allen et al.
11,531,402 B1 12/2022 Stolzenberg
11,546,505 B2 1/2023 Canberk
11,627,141 B2 4/2023 Allen et al.
11,706,176 B2 7/2023 Prabhu
11,783,862 B2 10/2023 Sehn
11,803,345 B2 10/2023 Sehn
11,855,947 B1 12/2023 Allen et al.
11,902,287 B2 2/2024 Allen et al.
11,972,014 B2 4/2024 Murphy et al.
12,113,764 B2 10/2024 Allen et al.
12,155,617 B1 11/2024 Allen et al.
12,155,618 B2 11/2024 Allen et al.
12,231,437 B2 2/2025 Allen et al.
12,236,148 B2 2/2025 Sehn
2001/0025316 A1 9/2001 Oh
2001/0028787 A1* 10/2001 Nomura ............... G11B 27/002 386/283
2002/0023101 A1 2/2002 Kurihara et al.
2002/0032771 A1 3/2002 Gledje
2002/0047686 A1 4/2002 Kodama et al.
2002/0047858 A1 4/2002 Bayliss et al.
2002/0047868 A1 4/2002 Miyazawa
2002/0078456 A1 6/2002 Hudson et al.
2002/0087631 A1 7/2002 Sharma
2002/0097257 A1 7/2002 Miller et al.
2002/0098850 A1 7/2002 Akhteruzzaman et al.
2002/0122659 A1 9/2002 Mcgrath et al.
2002/0128047 A1 9/2002 Gates
2002/0131078 A1 9/2002 Tsukinokizawa
2002/0141378 A1 10/2002 Bays et al.
2002/0144154 A1 10/2002 Tomkow
2002/0146103 A1 10/2002 Holt et al.
2002/0171669 A1* 11/2002 Meron ............... A61B 1/00009 345/619
2003/0001846 A1 1/2003 Davis et al.
2003/0016247 A1 1/2003 Lai et al.
2003/0016253 A1 1/2003 Aoki et al.
2003/0017823 A1 1/2003 Mager et al.
2003/0020623 A1 1/2003 Cao et al.
2003/0023874 A1 1/2003 Prokupets et al.
2003/0037124 A1 2/2003 Yamaura et al.
2003/0052925 A1 3/2003 Daimon et al.
2003/0074404 A1 4/2003 Parker et al.
2003/0083929 A1 5/2003 Springer et al.
2003/0101230 A1 5/2003 Benschoter et al.
2003/0110503 A1 6/2003 Perkes
2003/0126215 A1 7/2003 Udell
2003/0131362 A1 7/2003 Jasinschi et al.
2003/0148773 A1 8/2003 Spriestersbach et al.
2003/0163370 A1 8/2003 Chen et al.
2003/0164856 A1 9/2003 Prager et al.
2003/0210280 A1 11/2003 Baker et al.
2003/0217106 A1 11/2003 Adar et al.
2003/0217118 A1 11/2003 Kobayashi et al.
2003/0229607 A1 12/2003 Zellweger et al.
2003/0236823 A1 12/2003 Patzer et al.
2004/0027371 A1 2/2004 Jaeger
2004/0059796 A1 3/2004 Mclintock
2004/0064429 A1 4/2004 Hirstius et al.
2004/0078367 A1 4/2004 Anderson et al.
2004/0111467 A1 6/2004 Willis
2004/0158739 A1 8/2004 Wakai et al.
2004/0185877 A1 9/2004 Asthana et al.
2004/0189465 A1 9/2004 Capobianco et al.
2004/0193488 A1 9/2004 Khoo et al.
2004/0199402 A1 10/2004 Walker et al.
2004/0203959 A1 10/2004 Coombes
2004/0205480 A1 10/2004 Moore
2004/0205514 A1 10/2004 Sommerer et al.
2004/0215625 A1 10/2004 Svendsen et al.
2004/0243531 A1 12/2004 Dean
2004/0243688 A1 12/2004 Wugofski
2004/0243704 A1 12/2004 Botelho et al.
2005/0019014 A1 1/2005 Yoo et al.
2005/0021444 A1 1/2005 Bauer et al.
2005/0022211 A1 1/2005 Veselov et al.
2005/0024941 A1 2/2005 Lasser et al.
2005/0048989 A1 3/2005 Jung
2005/0071435 A1 3/2005 Karstens
2005/0078804 A1 4/2005 Yomoda
2005/0097176 A1 5/2005 Schatz et al.

(56) References Cited

U.S. PATENT DOCUMENTS

2005/0102180 A1 5/2005 Gailey et al.
2005/0102381 A1 5/2005 Jiang et al.
2005/0102397 A1 5/2005 Tsuyama et al.
2005/0104976 A1 5/2005 Currans
2005/0114783 A1 5/2005 Szeto
2005/0119936 A1 6/2005 Buchanan et al.
2005/0122405 A1 6/2005 Voss et al.
2005/0193340 A1 9/2005 Amburgey et al.
2005/0193345 A1 9/2005 Klassen et al.
2005/0198128 A1 9/2005 Anderson
2005/0223066 A1 10/2005 Buchheit et al.
2005/0253699 A1 11/2005 Madonia
2005/0288954 A1 12/2005 McCarthy et al.
2006/0004630 A1 1/2006 Criddle et al.
2006/0026067 A1 2/2006 Nicholas et al.
2006/0045343 A1* 3/2006 Tremblay ............. G06V 30/422 382/186
2006/0069623 A1 3/2006 Korth
2006/0069734 A1* 3/2006 Gersh .................. G06Q 10/107 709/207
2006/0107297 A1 5/2006 Toyama et al.
2006/0109238 A1 5/2006 Lau et al.
2006/0114338 A1 6/2006 Rothschild
2006/0119882 A1 6/2006 Harris et al.
2006/0127054 A1 6/2006 Matsuyama
2006/0136297 A1 6/2006 Willis et al.
2006/0152605 A1 7/2006 Okazaki
2006/0242234 A1 10/2006 Counts et al.
2006/0242239 A1 10/2006 Morishima et al.
2006/0242306 A1* 10/2006 Boro ....................... G06F 21/62 709/227
2006/0242550 A1 10/2006 Rahman et al.
2006/0242554 A1 10/2006 Gerace et al.
2006/0252438 A1 11/2006 Ansamaa et al.
2006/0259359 A1 11/2006 Gogel
2006/0261219 A1* 11/2006 Sharkey .................. B61L 29/30 246/473.1
2006/0265417 A1* 11/2006 Amato .............. G06F 17/30864
2006/0270419 A1 11/2006 Crowley et al.
2006/0282819 A1 12/2006 Graham et al.
2006/0287878 A1 12/2006 Wadhwa et al.
2007/0002408 A1 1/2007 Ikeno
2007/0003221 A1 1/2007 Hamada et al.
2007/0004426 A1 1/2007 Pfleging et al.
2007/0028183 A1 2/2007 Ostojic et al.
2007/0038715 A1 2/2007 Collins et al.
2007/0040931 A1 2/2007 Nishizawa
2007/0064899 A1 3/2007 Boss et al.
2007/0067317 A1 3/2007 Stevenson
2007/0073517 A1 3/2007 Panje
2007/0073823 A1 3/2007 Cohen et al.
2007/0075898 A1 4/2007 Markhovsky et al.
2007/0082707 A1 4/2007 Flynt et al.
2007/0088832 A1 4/2007 Tsang et al.
2007/0106706 A1 5/2007 Ahrens et al.
2007/0118801 A1 5/2007 Harshbarger et al.
2007/0136228 A1 6/2007 Petersen
2007/0192128 A1 8/2007 Celestini
2007/0198340 A1 8/2007 Lucovsky et al.
2007/0198495 A1 8/2007 Buron et al.
2007/0208751 A1 9/2007 Cowan et al.
2007/0210936 A1 9/2007 Nicholson
2007/0214180 A1 9/2007 Crawford
2007/0214216 A1 9/2007 Carrer et al.
2007/0233556 A1 10/2007 Koningstein
2007/0233801 A1 10/2007 Eren et al.
2007/0233859 A1 10/2007 Zhao et al.
2007/0243887 A1 10/2007 Bandhole et al.
2007/0244750 A1 10/2007 Grannan et al.
2007/0250791 A1 10/2007 Halliday et al.
2007/0255456 A1 11/2007 Funayama
2007/0268381 A1 11/2007 Gastinger et al.
2007/0268988 A1 11/2007 Hedayat et al.
2007/0281690 A1 12/2007 Altman et al.
2007/0294735 A1 12/2007 Luo
2007/0299807 A1 12/2007 Lea et al.
2008/0002776 A1 1/2008 Borer et al.
2008/0005240 A1 1/2008 Knighton et al.
2008/0012987 A1 1/2008 Hirata et al.
2008/0022329 A1 1/2008 Glad
2008/0025701 A1 1/2008 Ikeda
2008/0032703 A1 2/2008 Krumm et al.
2008/0033795 A1 2/2008 Wishnow et al.
2008/0033930 A1 2/2008 Warren
2008/0043041 A2 2/2008 Hedenstroem et al.
2008/0046476 A1 2/2008 Anderson et al.
2008/0046574 A1* 2/2008 Kinoshita ............... H04L 67/59 709/228
2008/0046831 A1* 2/2008 Imai ...................... G06F 16/904 715/765
2008/0049704 A1 2/2008 Witteman et al.
2008/0055269 A1 3/2008 Lemay et al.
2008/0062141 A1 3/2008 Chandhri
2008/0076505 A1 3/2008 Nguyen et al.
2008/0091723 A1 4/2008 Zuckerberg et al.
2008/0092233 A1 4/2008 Tian et al.
2008/0094387 A1 4/2008 Chen
2008/0104503 A1 5/2008 Beall et al.
2008/0109844 A1 5/2008 Baldeschwieler et al.
2008/0120409 A1 5/2008 Sun et al.
2008/0133336 A1 6/2008 Altman et al.
2008/0147730 A1 6/2008 Lee et al.
2008/0148150 A1 6/2008 Mall
2008/0158230 A1 7/2008 Sharma et al.
2008/0160956 A1 7/2008 Jackson et al.
2008/0167106 A1 7/2008 Lutnick et al.
2008/0168033 A1 7/2008 Ott et al.
2008/0168146 A1 7/2008 Fletcher
2008/0168489 A1 7/2008 Schraga
2008/0172413 A1* 7/2008 Chiu .................. G06F 16/4387
2008/0184117 A1 7/2008 Alsbury et al.
2008/0189177 A1 8/2008 Anderton et al.
2008/0193101 A1 8/2008 Agnihotri et al.
2008/0196046 A1 8/2008 Athas et al.
2008/0207176 A1 8/2008 Brackbill et al.
2008/0208692 A1 8/2008 Garaventi et al.
2008/0214210 A1 9/2008 Rasanen et al.
2008/0222158 A1 9/2008 Saika
2008/0222545 A1 9/2008 Lemay
2008/0244438 A1 10/2008 Peters et al.
2008/0255976 A1 10/2008 Altberg et al.
2008/0256430 A1 10/2008 Gold
2008/0256446 A1 10/2008 Yamamoto
2008/0256450 A1 10/2008 Takakura et al.
2008/0256577 A1 10/2008 Funaki et al.
2008/0263103 A1 10/2008 Mcgregor et al.
2008/0266421 A1 10/2008 Takahata et al.
2008/0270938 A1 10/2008 Carlson
2008/0284587 A1 11/2008 Saigh et al.
2008/0288338 A1 11/2008 Wiseman et al.
2008/0306826 A1 12/2008 Kramer et al.
2008/0313329 A1 12/2008 Wang et al.
2008/0313346 A1 12/2008 Kujawa et al.
2008/0316181 A1 12/2008 Nurmi
2008/0318616 A1 12/2008 Chipalkatti et al.
2009/0006191 A1 1/2009 Arankalle et al.
2009/0006565 A1 1/2009 Velusamy et al.
2009/0012788 A1 1/2009 Gilbert et al.
2009/0015703 A1 1/2009 Kim et al.
2009/0019472 A1 1/2009 Cleland et al.
2009/0024956 A1 1/2009 Kobayashi
2009/0030774 A1 1/2009 Rothschild et al.
2009/0030999 A1 1/2009 Gatzke et al.
2009/0040324 A1 2/2009 Nonaka
2009/0042588 A1 2/2009 Lottin et al.
2009/0058822 A1 3/2009 Chaudhri
2009/0079846 A1 3/2009 Chou
2009/0087161 A1 4/2009 Roberts et al.
2009/0089169 A1 4/2009 Gupta et al.
2009/0089378 A1 4/2009 Maresh
2009/0089678 A1 4/2009 Sacco et al.
2009/0089710 A1 4/2009 Wood et al.
2009/0093261 A1 4/2009 Ziskind et al.
2009/0132341 A1 5/2009 Klinger et al.

(56) References Cited

U.S. PATENT DOCUMENTS

2009/0132453 A1 5/2009 Hangartner et al.
2009/0132665 A1 5/2009 Thomsen et al.
2009/0132687 A1 5/2009 Yue et al.
2009/0148045 A1 6/2009 Lee et al.
2009/0153492 A1 6/2009 Popp
2009/0157450 A1 6/2009 Athsani et al.
2009/0157752 A1 6/2009 Gonzalez
2009/0158183 A1 6/2009 Mccurdy et al.
2009/0160970 A1 6/2009 Fredlund et al.
2009/0163182 A1 6/2009 Gatti et al.
2009/0169062 A1 7/2009 Cheung et al.
2009/0177299 A1 7/2009 Van De Sluis
2009/0177588 A1 7/2009 Marchese
2009/0177730 A1 7/2009 Annamalai et al.
2009/0187825 A1 7/2009 Sandquist et al.
2009/0192900 A1 7/2009 Collison et al.
2009/0197582 A1 8/2009 Lewis et al.
2009/0197616 A1 8/2009 Lewis et al.
2009/0199242 A1 8/2009 Johnson et al.
2009/0215469 A1 8/2009 Fisher et al.
2009/0232354 A1 9/2009 Camp, Jr. et al.
2009/0234815 A1 9/2009 Boerries et al.
2009/0235155 A1 9/2009 Ueda
2009/0239552 A1 9/2009 Churchill et al.
2009/0249222 A1 10/2009 Schmidt et al.
2009/0249244 A1 10/2009 Robinson et al.
2009/0260010 A1 10/2009 Burkhart et al.
2009/0265647 A1 10/2009 Martin et al.
2009/0284658 A1* 11/2009 Cho ..................... G11B 27/34 348/569
2009/0288022 A1 11/2009 Almstrand et al.
2009/0291665 A1* 11/2009 Gaskarth ........... H04M 15/8355 455/405
2009/0291672 A1 11/2009 Treves et al.
2009/0292608 A1 11/2009 Polachek
2009/0300139 A1 12/2009 Shoemaker et al.
2009/0319607 A1 12/2009 Belz et al.
2009/0327073 A1 12/2009 Li
2010/0001980 A1 1/2010 Kim et al.
2010/0011316 A1 1/2010 Sar et al.
2010/0014833 A1 1/2010 Pjanovic et al.
2010/0039505 A1 2/2010 Inoue et al.
2010/0041378 A1 2/2010 Aceves et al.
2010/0062794 A1 3/2010 Han
2010/0073509 A1 3/2010 Shioji
2010/0082427 A1 4/2010 Burgener et al.
2010/0082693 A1 4/2010 Hugg et al.
2010/0100568 A1 4/2010 Papin et al.
2010/0100729 A1 4/2010 Read et al.
2010/0113065 A1 5/2010 Narayan et al.
2010/0115281 A1 5/2010 Camenisch et al.
2010/0130233 A1 5/2010 Lansing
2010/0131880 A1 5/2010 Lee et al.
2010/0131895 A1 5/2010 Wohlert
2010/0153144 A1 6/2010 Miller et al.
2010/0153197 A1 6/2010 Byon
2010/0156933 A1 6/2010 Jones et al.
2010/0159944 A1 6/2010 Pascal et al.
2010/0161635 A1 6/2010 Dey
2010/0161658 A1 6/2010 Hamynen et al.
2010/0161831 A1 6/2010 Haas et al.
2010/0162149 A1 6/2010 Sheleheda et al.
2010/0183280 A1 7/2010 Beauregard et al.
2010/0185552 A1 7/2010 Deluca et al.
2010/0185665 A1 7/2010 Horn et al.
2010/0185750 A1 7/2010 Nakayama
2010/0185987 A1 7/2010 Yang et al.
2010/0191631 A1 7/2010 Weidmann
2010/0197318 A1 8/2010 Petersen et al.
2010/0197319 A1 8/2010 Petersen et al.
2010/0198683 A1 8/2010 Aarabi
2010/0198694 A1 8/2010 Muthukrishnan
2010/0198826 A1 8/2010 Petersen et al.
2010/0198828 A1 8/2010 Petersen et al.
2010/0198862 A1 8/2010 Jennings et al.
2010/0198870 A1 8/2010 Petersen et al.
2010/0198917 A1 8/2010 Petersen et al.
2010/0199166 A1 8/2010 Fisk, III
2010/0199227 A1 8/2010 Xiao et al.
2010/0201482 A1 8/2010 Robertson et al.
2010/0201536 A1 8/2010 Robertson et al.
2010/0211431 A1 8/2010 Lutnick et al.
2010/0214436 A1 8/2010 Kim et al.
2010/0223128 A1 9/2010 Dukellis et al.
2010/0223343 A1 9/2010 Bosan et al.
2010/0241713 A1* 9/2010 Shimizu ................ G06Q 10/00 709/204
2010/0247064 A1 9/2010 Yeh et al.
2010/0250109 A1 9/2010 Johnston et al.
2010/0250652 A1* 9/2010 Suzuki .................. G06Q 10/10 709/206
2010/0251143 A1 9/2010 Thomas et al.
2010/0257196 A1 10/2010 Waters et al.
2010/0259386 A1 10/2010 Holley et al.
2010/0262461 A1 10/2010 Bohannon
2010/0273463 A1 10/2010 Bonnefoy
2010/0273509 A1 10/2010 Sweeney et al.
2010/0281045 A1 11/2010 Dean
2010/0287249 A1 11/2010 Yigang et al.
2010/0293105 A1 11/2010 Blinn et al.
2010/0299763 A1 11/2010 Marcus et al.
2010/0306669 A1 12/2010 Della Pasqua
2010/0325527 A1 12/2010 Estrada et al.
2010/0332958 A1 12/2010 Weinberger et al.
2011/0004071 A1 1/2011 Faiola et al.
2011/0010205 A1 1/2011 Richards
2011/0029512 A1 2/2011 Folgner et al.
2011/0037605 A1 2/2011 Robison, Jr. et al.
2011/0040783 A1 2/2011 Uemichi et al.
2011/0040804 A1 2/2011 Peirce et al.
2011/0044549 A1 2/2011 Bressan
2011/0050909 A1 3/2011 Ellenby et al.
2011/0050915 A1 3/2011 Wang et al.
2011/0064388 A1 3/2011 Brown et al.
2011/0066743 A1 3/2011 Hurley et al.
2011/0083101 A1 4/2011 Sharon et al.
2011/0085059 A1 4/2011 Noh
2011/0093444 A1 4/2011 Rose
2011/0099507 A1 4/2011 Nesladek et al.
2011/0099519 A1 4/2011 Ma et al.
2011/0102630 A1 5/2011 Rukes
2011/0106882 A1 5/2011 Takakura et al.
2011/0119133 A1 5/2011 Igelman et al.
2011/0131633 A1 6/2011 Macaskill et al.
2011/0137782 A1 6/2011 Fang
2011/0137881 A1 6/2011 Cheng et al.
2011/0141025 A1 6/2011 Tsai
2011/0145564 A1 6/2011 Moshir et al.
2011/0159890 A1 6/2011 Fortescue et al.
2011/0161423 A1 6/2011 Pratt et al.
2011/0164163 A1 7/2011 Bilbrey et al.
2011/0170838 A1 7/2011 Rosengart et al.
2011/0181520 A1 7/2011 Boda et al.
2011/0184980 A1 7/2011 Jeong et al.
2011/0191368 A1 8/2011 Muzatko
2011/0197194 A1 8/2011 D'Angelo et al.
2011/0202598 A1 8/2011 Evans et al.
2011/0202968 A1 8/2011 Nurmi
2011/0211534 A1 9/2011 Schmidt et al.
2011/0213845 A1 9/2011 Logan et al.
2011/0215966 A1 9/2011 Kim et al.
2011/0225048 A1 9/2011 Nair
2011/0238300 A1 9/2011 Schenken
2011/0238762 A1* 9/2011 Soni ....................... H04L 51/32 709/206
2011/0238763 A1 9/2011 Shin et al.
2011/0246890 A1 10/2011 Mellamphy et al.
2011/0249551 A1 10/2011 Rollins
2011/0251790 A1 10/2011 Liotopoulos et al.
2011/0255736 A1 10/2011 Thompson et al.
2011/0256881 A1 10/2011 Huang et al.
2011/0258275 A1* 10/2011 Rao .................... G06F 16/9535 709/206
2011/0273575 A1 11/2011 Lee

(56) References Cited

U.S. PATENT DOCUMENTS

2011/0276637 A1 11/2011 Thornton et al.
2011/0282799 A1 11/2011 Huston
2011/0283172 A1 11/2011 Berger et al.
2011/0283188 A1 11/2011 Farrenkopf
2011/0286586 A1 11/2011 Saylor et al.
2011/0294541 A1 12/2011 Zheng et al.
2011/0295577 A1 12/2011 Ramachandran
2011/0295677 A1 12/2011 Dhingra et al.
2011/0296474 A1 12/2011 Babic
2011/0301934 A1 12/2011 Tardif
2011/0302525 A1 12/2011 Jeon
2011/0306387 A1 12/2011 Moon
2011/0314084 A1 12/2011 Saretto et al.
2011/0314419 A1 12/2011 Dunn et al.
2011/0320373 A1 12/2011 Lee et al.
2012/0004956 A1 1/2012 Huston et al.
2012/0019722 A1 1/2012 Kwisthout et al.
2012/0023522 A1 1/2012 Anderson et al.
2012/0028659 A1 2/2012 Whitney et al.
2012/0030194 A1 2/2012 Jain
2012/0033718 A1 2/2012 Kauffman et al.
2012/0036015 A1 2/2012 Sheikh
2012/0036443 A1 2/2012 Ohmori et al.
2012/0054001 A1 3/2012 Zivkovic et al.
2012/0054797 A1 3/2012 Skog et al.
2012/0054811 A1 3/2012 Spears
2012/0059722 A1 3/2012 Rao
2012/0062805 A1 3/2012 Candelore
2012/0062935 A1 3/2012 Kamath et al.
2012/0070045 A1 3/2012 Vesper et al.
2012/0084731 A1 4/2012 Filman et al.
2012/0084835 A1 4/2012 Thomas et al.
2012/0098836 A1 4/2012 Kim et al.
2012/0099800 A1 4/2012 Llano et al.
2012/0108293 A1 5/2012 Law et al.
2012/0110096 A1 5/2012 Smarr et al.
2012/0113143 A1 5/2012 Adhikari et al.
2012/0113272 A1 5/2012 Hata
2012/0117456 A1 5/2012 Koskimies
2012/0123830 A1 5/2012 Svendsen et al.
2012/0123867 A1 5/2012 Hannan
2012/0123871 A1 5/2012 Svendsen et al.
2012/0123875 A1 5/2012 Svendsen et al.
2012/0124126 A1 5/2012 Alcazar et al.
2012/0124147 A1 5/2012 Hamlin et al.
2012/0124176 A1 5/2012 Curtis et al.
2012/0124458 A1 5/2012 Cruzada
2012/0127196 A1* 5/2012 Landry .................... G06F 3/147 345/619
2012/0129548 A1 5/2012 Rao et al.
2012/0131507 A1 5/2012 Sparandara et al.
2012/0131512 A1 5/2012 Takeuchi et al.
2012/0136998 A1 5/2012 Hough et al.
2012/0141088 A1 6/2012 Isozu et al.
2012/0143760 A1 6/2012 Abulafia et al.
2012/0150978 A1 6/2012 Monaco
2012/0158532 A1 6/2012 Fitzsimmons
2012/0158814 A1* 6/2012 Sabiwalsky ............... G06F 9/54 709/201
2012/0158837 A1 6/2012 Kaul
2012/0163664 A1 6/2012 Zhu
2012/0165100 A1 6/2012 Lalancette et al.
2012/0166462 A1 6/2012 Pathak et al.
2012/0166468 A1 6/2012 Gupta et al.
2012/0166971 A1 6/2012 Sachson et al.
2012/0169855 A1 7/2012 Oh
2012/0172062 A1 7/2012 Altman et al.
2012/0173991 A1 7/2012 Roberts et al.
2012/0176401 A1 7/2012 Hayward et al.
2012/0180021 A1 7/2012 Byrd et al.
2012/0184248 A1 7/2012 Speede
2012/0197690 A1 8/2012 Agulnek
2012/0197724 A1 8/2012 Kendall
2012/0200743 A1 8/2012 Blanchflower et al.
2012/0201362 A1 8/2012 Crossan et al.
2012/0203849 A1 8/2012 Collins et al.
2012/0208564 A1 8/2012 Clark et al.
2012/0209892 A1 8/2012 Macaskill et al.
2012/0209921 A1 8/2012 Adafin et al.
2012/0209924 A1 8/2012 Evans et al.
2012/0210244 A1 8/2012 De Francisco et al.
2012/0212632 A1 8/2012 Mate et al.
2012/0220219 A1 8/2012 Hill et al.
2012/0220264 A1 8/2012 Kawabata
2012/0226663 A1 9/2012 Valdez Kline et al.
2012/0226748 A1 9/2012 Bosworth et al.
2012/0233000 A1 9/2012 Fisher et al.
2012/0236162 A1 9/2012 Imamura
2012/0239761 A1 9/2012 Linner et al.
2012/0245982 A1 9/2012 Daniel
2012/0250951 A1 10/2012 Chen
2012/0252418 A1 10/2012 Kandekar et al.
2012/0254324 A1 10/2012 Majeti et al.
2012/0254325 A1 10/2012 Majeti et al.
2012/0259815 A1 10/2012 Olson
2012/0263439 A1 10/2012 Lassman et al.
2012/0271684 A1 10/2012 Shutter
2012/0278387 A1 11/2012 Garcia et al.
2012/0278692 A1* 11/2012 Shi ...................... H04L 67/2842 715/205
2012/0281129 A1 11/2012 Wang et al.
2012/0288147 A1 11/2012 Fujitani
2012/0290637 A1 11/2012 Perantatos et al.
2012/0299954 A1 11/2012 Wada et al.
2012/0304052 A1 11/2012 Tanaka et al.
2012/0304080 A1 11/2012 Wormald et al.
2012/0307096 A1 12/2012 Bray et al.
2012/0307112 A1 12/2012 Kunishige et al.
2012/0311465 A1 12/2012 Nealer et al.
2012/0311623 A1 12/2012 Davis et al.
2012/0319904 A1 12/2012 Lee et al.
2012/0323933 A1 12/2012 He et al.
2012/0324018 A1 12/2012 Metcalf et al.
2013/0004014 A1 1/2013 Hickman
2013/0006759 A1 1/2013 Srivastava et al.
2013/0006777 A1 1/2013 Krishnareddy et al.
2013/0018960 A1 1/2013 Knysz et al.
2013/0024292 A1 1/2013 David
2013/0024757 A1 1/2013 Doll et al.
2013/0036364 A1 2/2013 Johnson
2013/0045753 A1 2/2013 Obermeyer et al.
2013/0050260 A1 2/2013 Reitan
2013/0055083 A1 2/2013 Fino
2013/0057489 A1 3/2013 Morton et al.
2013/0057587 A1 3/2013 Leonard et al.
2013/0059607 A1 3/2013 Herz et al.
2013/0060690 A1 3/2013 Oskolkov et al.
2013/0063369 A1 3/2013 Malhotra et al.
2013/0067027 A1 3/2013 Song et al.
2013/0067028 A1* 3/2013 Takamura .............. G06Q 50/01 709/217
2013/0071093 A1 3/2013 Hanks et al.
2013/0076758 A1 3/2013 Li et al.
2013/0080254 A1 3/2013 Thramann
2013/0082959 A1* 4/2013 Shimazu ............. G06F 3/04886 345/173
2013/0085790 A1 4/2013 Palmer et al.
2013/0086072 A1 4/2013 Peng et al.
2013/0090171 A1 4/2013 Holton et al.
2013/0095857 A1 4/2013 Garcia et al.
2013/0104053 A1 4/2013 Thornton et al.
2013/0110885 A1 5/2013 Brundrett, III
2013/0111514 A1 5/2013 Slavin et al.
2013/0115872 A1 5/2013 Huang et al.
2013/0117261 A1 5/2013 Sambrani
2013/0117389 A1* 5/2013 Yamada ........... G08G 1/096775 709/206
2013/0122862 A1 5/2013 Horn et al.
2013/0122929 A1 5/2013 Al-mufti et al.
2013/0124297 A1 5/2013 Hegeman et al.
2013/0128059 A1 5/2013 Kristensson
2013/0129252 A1 5/2013 Lauper
2013/0132194 A1 5/2013 Rajaram
2013/0132477 A1 5/2013 Bosworth et al.

(56) References Cited

U.S. PATENT DOCUMENTS

2013/0132836 A1 5/2013 Ortiz
2013/0132908 A1 5/2013 Lee et al.
2013/0144979 A1 6/2013 Kansal et al.
2013/0145286 A1 6/2013 Feng et al.
2013/0147837 A1 6/2013 Stroila
2013/0151993 A1 6/2013 Mayya et al.
2013/0157684 A1 6/2013 Moser
2013/0159110 A1 6/2013 Rajaram et al.
2013/0159919 A1 6/2013 Leydon
2013/0169822 A1 7/2013 Zhu et al.
2013/0173380 A1 7/2013 Akbari et al.
2013/0173729 A1 7/2013 Starenky et al.
2013/0182133 A1 7/2013 Tanabe
2013/0185131 A1 7/2013 Sinha et al.
2013/0191198 A1 7/2013 Carlson et al.
2013/0194301 A1 8/2013 Robbins et al.
2013/0198176 A1 8/2013 Kim
2013/0210518 A1 8/2013 Barclay et al.
2013/0218965 A1 8/2013 Abrol et al.
2013/0218968 A1 8/2013 Mcevilly et al.
2013/0222323 A1 8/2013 Mckenzie
2013/0227476 A1 8/2013 Frey
2013/0232194 A1 9/2013 Knapp et al.
2013/0243273 A1 9/2013 Yamaguchi et al.
2013/0254227 A1 9/2013 Shim et al.
2013/0263031 A1 10/2013 Oshiro et al.
2013/0263056 A1 10/2013 Son et al.
2013/0265450 A1 10/2013 Barnes, Jr.
2013/0267253 A1 10/2013 Case et al.
2013/0275505 A1 10/2013 Gauglitz et al.
2013/0283167 A1 10/2013 Xu
2013/0290337 A1 10/2013 Lansford et al.
2013/0290443 A1 10/2013 Collins et al.
2013/0304243 A1 11/2013 Iseli
2013/0304527 A1 11/2013 Santos, III
2013/0304646 A1 11/2013 De Geer
2013/0311255 A1 11/2013 Cummins et al.
2013/0325964 A1 12/2013 Berberat
2013/0344896 A1 12/2013 Kirmse et al.
2013/0346172 A1 12/2013 Wu
2013/0346869 A1 12/2013 Asver et al.
2013/0346877 A1 12/2013 Borovoy et al.
2014/0003739 A1 1/2014 S V et al.
2014/0006129 A1 1/2014 Heath
2014/0006142 A1* 1/2014 Gaudet .............. G06Q 30/0246
705/14.45
2014/0011538 A1 1/2014 Mulcahy et al.
2014/0013243 A1 1/2014 Flynn, III et al.
2014/0019264 A1 1/2014 Wachman et al.
2014/0028589 A1 1/2014 Reilly
2014/0029034 A1 1/2014 Toriyama
2014/0032682 A1* 1/2014 Prado .................... H04L 51/214
709/213
2014/0040712 A1 2/2014 Chang et al.
2014/0043204 A1 2/2014 Basnayake et al.
2014/0043355 A1 2/2014 Kim et al.
2014/0045433 A1 2/2014 Kim
2014/0045530 A1 2/2014 Gordon et al.
2014/0047016 A1 2/2014 Rao
2014/0047045 A1 2/2014 Baldwin et al.
2014/0047074 A1 2/2014 Chung et al.
2014/0047335 A1 2/2014 Lewis et al.
2014/0049652 A1 2/2014 Moon et al.
2014/0052281 A1 2/2014 Eronen et al.
2014/0052485 A1 2/2014 Shidfar
2014/0052633 A1 2/2014 Gandhi
2014/0057660 A1 2/2014 Wager
2014/0059479 A1 2/2014 Hamburg et al.
2014/0068692 A1 3/2014 Archibong et al.
2014/0072274 A1* 3/2014 Nitta ...................... H04N 5/772
386/230
2014/0082651 A1 3/2014 Sharifi
2014/0086562 A1 3/2014 Lassman et al.
2014/0089264 A1 3/2014 Talagala et al.
2014/0089314 A1 3/2014 Iizuka et al.
2014/0089801 A1 3/2014 Agrawal
2014/0092130 A1 4/2014 Anderson et al.
2014/0095296 A1 4/2014 Angell et al.
2014/0096029 A1 4/2014 Schultz
2014/0114565 A1 4/2014 Aziz et al.
2014/0118390 A1 5/2014 Ioffe et al.
2014/0122502 A1 5/2014 Kalmes et al.
2014/0122658 A1 5/2014 Haeger et al.
2014/0122787 A1 5/2014 Shalvi et al.
2014/0129627 A1 5/2014 Baldwin et al.
2014/0129953 A1 5/2014 Spiegel
2014/0129981 A1 5/2014 Soderberg
2014/0132594 A1 5/2014 Gharpure et al.
2014/0136985 A1 5/2014 Albir et al.
2014/0143143 A1 5/2014 Fasoli et al.
2014/0149519 A1 5/2014 Redfern et al.
2014/0153902 A1 6/2014 Pearson et al.
2014/0155102 A1 6/2014 Cooper et al.
2014/0156410 A1 6/2014 Wuersch et al.
2014/0164118 A1 6/2014 Polachi
2014/0164979 A1 6/2014 Deeter et al.
2014/0171036 A1 6/2014 Simmons
2014/0172542 A1 6/2014 Poncz et al.
2014/0172877 A1 6/2014 Rubinstein et al.
2014/0173424 A1 6/2014 Hogeg et al.
2014/0173457 A1 6/2014 Wang et al.
2014/0180829 A1 6/2014 Umeda
2014/0188815 A1 7/2014 Mentz et al.
2014/0189592 A1 7/2014 Benchenaa et al.
2014/0189937 A1 7/2014 Pietrzak et al.
2014/0201527 A1* 7/2014 Krivorot ............. G06F 21/6209
713/168
2014/0207679 A1 7/2014 Cho
2014/0207860 A1 7/2014 Wang et al.
2014/0214471 A1 7/2014 Schreiner, III
2014/0222564 A1 8/2014 Kranendonk et al.
2014/0222913 A1 8/2014 Cathcart et al.
2014/0245166 A1 8/2014 Morton
2014/0250465 A1 9/2014 Mulholland et al.
2014/0255001 A1 9/2014 Malagón et al.
2014/0258405 A1 9/2014 Perkin
2014/0265359 A1 9/2014 Cheng et al.
2014/0266703 A1 9/2014 Dalley, Jr. et al.
2014/0279040 A1 9/2014 Kuboyama
2014/0279061 A1 9/2014 Elimeliah et al.
2014/0279128 A1 9/2014 Sagebin
2014/0279436 A1 9/2014 Dorsey et al.
2014/0279540 A1 9/2014 Jackson
2014/0280140 A1 9/2014 Ling et al.
2014/0280537 A1 9/2014 Pridmore et al.
2014/0281847 A1 9/2014 Marra et al.
2014/0282096 A1 9/2014 Rubinstein et al.
2014/0286566 A1 9/2014 Rhoads
2014/0287779 A1 9/2014 O'keefe et al.
2014/0289157 A1 9/2014 Kenna, III et al.
2014/0289597 A1 9/2014 Kim
2014/0289603 A1 9/2014 Subrahmanya et al.
2014/0289833 A1 9/2014 Briceno
2014/0292375 A1 10/2014 Angelini et al.
2014/0298210 A1 10/2014 Park et al.
2014/0304622 A1 10/2014 Jorasch et al.
2014/0306986 A1 10/2014 Gottesman et al.
2014/0317302 A1 10/2014 Naik
2014/0320662 A1 10/2014 Mcnamee et al.
2014/0324627 A1 10/2014 Haver et al.
2014/0324629 A1 10/2014 Jacobs
2014/0325383 A1 10/2014 Brown et al.
2014/0325569 A1 10/2014 Suzuki et al.
2014/0331188 A1 11/2014 Sandstrom et al.
2014/0337123 A1 11/2014 Nuernberg et al.
2014/0344698 A1 11/2014 Hohteri et al.
2014/0355905 A1 12/2014 Lipton et al.
2014/0359024 A1 12/2014 Spiegel
2014/0359032 A1 12/2014 Spiegel et al.
2014/0359656 A1 12/2014 Banica et al.
2014/0372844 A1* 12/2014 Zumkhawala ........ G06F 17/211
715/204
2014/0372850 A1 12/2014 Campbell et al.
2014/0379683 A1 12/2014 Bazaz

(56) References Cited

U.S. PATENT DOCUMENTS

2015/0007342 A1* 1/2015 Thorpe .................. G06F 21/10 726/26
2015/0012603 A1* 1/2015 Saito .................... H04L 51/216 709/206
2015/0013016 A1 1/2015 Kanter et al.
2015/0015680 A1 1/2015 Wang et al.
2015/0020086 A1 1/2015 Chen et al.
2015/0040011 A1 2/2015 Chun
2015/0042572 A1 2/2015 Lombardi et al.
2015/0043033 A1 2/2015 Sugimoto
2015/0046278 A1 2/2015 Pei et al.
2015/0055197 A1 2/2015 Romanoff et al.
2015/0058916 A1 2/2015 Rostami-hesarsorkh et al.
2015/0058957 A1 2/2015 Halliday et al.
2015/0063724 A1 3/2015 Ikeda et al.
2015/0071619 A1 3/2015 Brough
2015/0081630 A1 3/2015 Linsalata et al.
2015/0087263 A1 3/2015 Branscomb et al.
2015/0088622 A1 3/2015 Ganschow et al.
2015/0094106 A1 4/2015 Grossman et al.
2015/0095020 A1 4/2015 Leydon
2015/0096042 A1 4/2015 Mizrachi
2015/0103097 A1 4/2015 Li
2015/0113441 A1 4/2015 Felt et al.
2015/0116529 A1 4/2015 Wu et al.
2015/0120293 A1 4/2015 Wohlert et al.
2015/0127643 A1 5/2015 Cohen et al.
2015/0127754 A1 5/2015 Clark et al.
2015/0130178 A1 5/2015 Clements
2015/0134318 A1 5/2015 Cuthbert et al.
2015/0142753 A1 5/2015 Soon-Shiong
2015/0154650 A1 6/2015 Umeda
2015/0161178 A1 6/2015 B Doiu
2015/0161822 A1 6/2015 Basu
2015/0169827 A1 6/2015 Laborde
2015/0172534 A1 6/2015 Miyakawa et al.
2015/0177937 A1 6/2015 Poletto et al.
2015/0178260 A1 6/2015 Brunson
2015/0185990 A1 7/2015 Thompson
2015/0186217 A1 7/2015 Eslami Sarab
2015/0186497 A1 7/2015 Patton et al.
2015/0188869 A1 7/2015 Gilad et al.
2015/0193685 A1* 7/2015 Srinivasan ......... G06Q 30/0201 706/11
2015/0199082 A1 7/2015 Scholler et al.
2015/0206349 A1 7/2015 Rosenthal et al.
2015/0220606 A1 8/2015 Ito et al.
2015/0222814 A1 8/2015 Li et al.
2015/0227602 A1 8/2015 Ramu et al.
2015/0237472 A1 8/2015 Alsina et al.
2015/0237473 A1 8/2015 Koepke
2015/0242525 A1 8/2015 Perlegos
2015/0248683 A1 9/2015 Walkingshaw
2015/0254704 A1 9/2015 Kothe et al.
2015/0261917 A1 9/2015 Smith
2015/0262208 A1 9/2015 Bjontegard
2015/0269624 A1 9/2015 Cheng et al.
2015/0271779 A1 9/2015 Alavudin
2015/0287072 A1 10/2015 Golden et al.
2015/0294367 A1 10/2015 Oberbrunner et al.
2015/0295875 A1 10/2015 El Daher
2015/0312184 A1 10/2015 Langholz et al.
2015/0325268 A1 11/2015 Berger et al.
2015/0326510 A1* 11/2015 Tomlinson ............. H04L 51/04 709/206
2015/0331881 A1 11/2015 Myles
2015/0332310 A1 11/2015 Cui et al.
2015/0332317 A1 11/2015 Cui et al.
2015/0332325 A1 11/2015 Sharma et al.
2015/0332329 A1 11/2015 Luo et al.
2015/0334347 A1 11/2015 Kang et al.
2015/0339303 A1 11/2015 Perlegos
2015/0341447 A1 11/2015 Patil et al.
2015/0341747 A1 11/2015 Barrand et al.
2015/0350136 A1 12/2015 Flynn, III et al.
2015/0350266 A1 12/2015 O'brien
2015/0356190 A1 12/2015 Rotem et al.
2015/0356615 A1 12/2015 Hagen et al.
2015/0358806 A1 12/2015 Salqvist
2015/0365795 A1 12/2015 Allen et al.
2015/0367233 A1 12/2015 Hicks et al.
2015/0370320 A1 12/2015 Connor
2015/0378502 A1 12/2015 Hu et al.
2015/0381682 A1 12/2015 Rao et al.
2015/0381688 A1 12/2015 Jenkins et al.
2016/0000020 A1* 1/2016 Sugimoto ................ A01G 9/02 709/219
2016/0006927 A1 1/2016 Sehn
2016/0014063 A1 1/2016 Hogeg et al.
2016/0019592 A1 1/2016 Muttineni et al.
2016/0034253 A1 2/2016 Bang et al.
2016/0034712 A1 2/2016 Patton et al.
2016/0034786 A1 2/2016 Suri et al.
2016/0048369 A1 2/2016 Zenoff
2016/0050704 A1 2/2016 von Sneidern et al.
2016/0065530 A1 3/2016 Prado et al.
2016/0065625 A1* 3/2016 Ouyang .............. H04L 65/4038 715/753
2016/0085773 A1 3/2016 Chang et al.
2016/0085863 A1 3/2016 Allen et al.
2016/0085994 A1 3/2016 Pereira
2016/0086670 A1 3/2016 Gross et al.
2016/0092561 A1 3/2016 Liu et al.
2016/0092962 A1 3/2016 Wasserman et al.
2016/0098742 A1 4/2016 Minicucci et al.
2016/0099901 A1 4/2016 Allen et al.
2016/0105387 A1 4/2016 Jackson
2016/0119272 A1 4/2016 Rubinstein et al.
2016/0127772 A1 5/2016 Tsiridis et al.
2016/0134941 A1* 5/2016 Selvaraj ........... H04N 21/26283 725/40
2016/0139748 A1 5/2016 Iwaizumi et al.
2016/0149843 A1 5/2016 Spicer et al.
2016/0180887 A1 6/2016 Sehn
2016/0182422 A1 6/2016 Sehn et al.
2016/0182875 A1 6/2016 Sehn
2016/0196584 A1 7/2016 Franklin et al.
2016/0210657 A1 7/2016 Chittilappilly et al.
2016/0219402 A1 7/2016 Zimerman et al.
2016/0234023 A1 8/2016 Mozer et al.
2016/0234556 A1 8/2016 Berridge
2016/0239248 A1 8/2016 Sehn
2016/0239457 A1 8/2016 Gross et al.
2016/0247537 A1 8/2016 Ricciardi
2016/0253833 A1 9/2016 Lew
2016/0253912 A1 9/2016 Heilman et al.
2016/0274705 A1 9/2016 Kapadia et al.
2016/0277419 A1 9/2016 Allen et al.
2016/0286244 A1 9/2016 Chang et al.
2016/0292735 A1 10/2016 Kim
2016/0321708 A1 11/2016 Sehn
2016/0345035 A1 11/2016 Han et al.
2016/0352659 A1 12/2016 Krishnamoorth
2016/0359957 A1 12/2016 Laliberte
2016/0359987 A1 12/2016 Laliberte
2016/0364668 A1 12/2016 Young et al.
2017/0006094 A1 1/2017 Abou Mahmoud et al.
2017/0026786 A1 1/2017 Barron et al.
2017/0061308 A1 3/2017 Chen et al.
2017/0070870 A1 3/2017 Brooks et al.
2017/0078760 A1 3/2017 Christoph et al.
2017/0091795 A1 3/2017 Mansour et al.
2017/0111617 A1 4/2017 Kuwahara et al.
2017/0123487 A1 5/2017 Hazra et al.
2017/0127233 A1 5/2017 Liang et al.
2017/0132647 A1 5/2017 Bostick et al.
2017/0134821 A1 5/2017 D'amelio et al.
2017/0149717 A1 5/2017 Sehn
2017/0161382 A1 6/2017 Ouimet et al.
2017/0164161 A1 6/2017 Gupta et al.
2017/0185256 A1 6/2017 Bennett
2017/0186038 A1 6/2017 Glover et al.
2017/0222962 A1 8/2017 Gauglitz et al.
2017/0230315 A1 8/2017 Zubas et al.

(56) References Cited

U.S. PATENT DOCUMENTS

2017/0263029 A1 9/2017 Yan et al.
2017/0277684 A1 9/2017 Dharmarajan Mary
2017/0277685 A1 9/2017 Takumi
2017/0287006 A1 10/2017 Azmoodeh et al.
2017/0295250 A1 10/2017 Samaranayake et al.
2017/0310888 A1 10/2017 Wright et al.
2017/0329481 A1 11/2017 Stoop et al.
2017/0339521 A1 11/2017 Colonna et al.
2017/0351910 A1 12/2017 Elwazer et al.
2017/0359686 A1 12/2017 Colonna et al.
2017/0374003 A1 12/2017 Allen et al.
2017/0374508 A1 12/2017 Davis et al.
2018/0013975 A1 1/2018 Tang
2018/0091644 A1* 3/2018 Li .................... H04M 1/72457
2018/0103002 A1 4/2018 Sehn
2018/0121957 A1 5/2018 Cornwall et al.
2018/0131663 A1 5/2018 Halliday et al.
2018/0139241 A1 5/2018 Jacobsen et al.
2018/0158370 A1 6/2018 Pryor
2018/0189835 A1 7/2018 Deluca et al.
2018/0225687 A1 8/2018 Ahmed et al.
2018/0278562 A1 9/2018 Tang
2018/0279016 A1 9/2018 Tang
2018/0301169 A1 10/2018 Ricciardi
2018/0316575 A1 11/2018 Son et al.
2019/0097812 A1 3/2019 Toth
2019/0146219 A1 5/2019 Rodriguez, II
2019/0237106 A1 8/2019 Sehn
2019/0342699 A1 11/2019 Sehn et al.
2019/0372991 A1 12/2019 Allen et al.
2020/0057590 A1 2/2020 Sehn
2020/0105304 A1 4/2020 Sehn
2020/0112531 A1 4/2020 Tang
2020/0193053 A1 6/2020 Murphy et al.
2020/0213804 A1 7/2020 Sehn et al.
2020/0288270 A1 9/2020 Allen et al.
2020/0329336 A1 10/2020 Sehn et al.
2020/0411058 A1 12/2020 Sehn
2021/0006526 A1 1/2021 Allen et al.
2021/0006527 A1 1/2021 Allen et al.
2021/0006528 A1 1/2021 Allen et al.
2021/0011612 A1 1/2021 Dancie et al.
2021/0014238 A1 1/2021 Allen et al.
2021/0074016 A1 3/2021 Li et al.
2021/0166732 A1 6/2021 Shaburova et al.
2021/0174034 A1 6/2021 Retek et al.
2021/0241529 A1 8/2021 Cowburn et al.
2021/0273903 A1 9/2021 Allen et al.
2021/0303075 A1 9/2021 Cowburn et al.
2021/0303077 A1 9/2021 Anvaripour et al.
2021/0303140 A1 9/2021 Mourkogiannis
2021/0342473 A1 11/2021 Murphy et al.
2021/0382564 A1 12/2021 Blachly et al.
2021/0397000 A1 12/2021 Rodriguez, II
2021/0405761 A1 12/2021 Canberk
2022/0121332 A1 4/2022 Allen et al.
2022/0130425 A1 4/2022 Sehn
2022/0188539 A1 6/2022 Chan et al.
2022/0206588 A1 6/2022 Canberk et al.
2022/0276817 A1 9/2022 Sehn
2022/0300730 A1 9/2022 Eirinberg et al.
2022/0300731 A1 9/2022 Eirinberg et al.
2022/0301231 A1 9/2022 Eirinberg et al.
2022/0326781 A1 10/2022 Hwang et al.
2022/0334649 A1 10/2022 Hwang et al.
2022/0375174 A1 11/2022 Arya et al.
2023/0171261 A1 6/2023 Allen et al.
2023/0418537 A1 12/2023 Sehn
2024/0098096 A1 3/2024 Allen et al.
2024/0161155 A1 5/2024 Fletcher
2025/0094107 A1 3/2025 Sehn
2025/0133088 A1 4/2025 Allen et al.

FOREIGN PATENT DOCUMENTS

CA 2910158 C 6/2019
CA 3027981 3/2023
CA 3158965 11/2025
CN 101635763 A 1/2010
CN 101981987 A 2/2011
CN 102118419 7/2011
CN 102238107 A 11/2011
CN 102572575 A 7/2012
CN 102710537 A 10/2012
CN 102930107 A 2/2013
CN 103020303 A 4/2013
CN 103095768 A 5/2013
CN 103200238 A 7/2013
CN 103248761 A 8/2013
CN 103297936 9/2013
CN 103391368 A 11/2013
CN 103699662 A 4/2014
CN 105760466 A 7/2016
CN 103049761 B 8/2016
CN 106663264 A 5/2017
CN 107004225 A 8/2017
CN 107111828 A 8/2017
CN 107251006 A 10/2017
CN 107637099 A 1/2018
CN 107710772 A 2/2018
CN 106663264 B 5/2019
CN 110163663 A 8/2019
CN 110249359 A 9/2019
CN 110462616 A 11/2019
CN 107004225 B 1/2021
CN 112669166 A 4/2021
CN 112669166 B 6/2024
EP 2051480 A1 4/2009
EP 2151797 A1 2/2010
EP 3234794 B1 5/2020
EP 3707693 A1 9/2020
EP 4172726 A1 5/2023
EP 4172730 A1 5/2023
GB 2399928 A 9/2004
IT MI20040519 6/2004
JP 2012104106 A 5/2012
KR 19990073076 A 10/1999
KR 20010078417 8/2001
KR 20020009093 2/2002
KR 20060043137 A 5/2006
KR 1020060038872 A 5/2006
KR 20070121728 A 12/2007
KR 1020080006729 A 1/2008
KR 1020080017854 A 2/2008
KR 20080028962 A 4/2008
KR 20110037654 A 4/2011
KR 20110094208 A 8/2011
KR 20120121452 A 11/2012
KR 20120125381 A 11/2012
KR 1020120140404 A 12/2012
KR 20130061724 A 6/2013
KR 20140066278 A 6/2014
KR 1020140066795 A 6/2014
KR 20140091130 A 7/2014
KR 1020140115413 A 10/2014
KR 10-1822920 1/2018
KR 101869473 6/2018
KR 101933840 B1 12/2018
KR 101983523 B1 5/2019
KR 102017508 B1 8/2019
KR 102021727 B1 9/2019
KR 102035405 B1 10/2019
KR 10205792 B1 12/2019
KR 102051788 B1 12/2019
KR 102077441 B1 2/2020
KR 102094065 B1 3/2020
KR 102111446 B1 5/2020
KR 102301618 B1 9/2021
KR 102475132 B1 12/2022
KR 20220158824 A 12/2022
KR 102654071 B1 3/2024
WO WO-1996024213 A1 8/1996

(56) References Cited

FOREIGN PATENT DOCUMENTS

WO WO-1999063453 A1 12/1999
WO WO-2000058882 A1 10/2000
WO WO-2001029642 A1 4/2001
WO WO-2001050703 A3 7/2001
WO WO-2006118755 A2 11/2006
WO WO-2007092668 A2 8/2007
WO WO-2009043020 A2 4/2009
WO WO-2011040821 A1 4/2011
WO WO-2011119407 A1 9/2011
WO WO-2012000107 A1 1/2012
WO WO-2013006584 A1 1/2013
WO WO-2013008238 A1 1/2013
WO WO-2013008251 A2 1/2013
WO WO-2013045753 A1 4/2013
WO WO-2013058897 A1 4/2013
WO WO-2013126784 A2 8/2013
WO WO-2014006129 A1 1/2014
WO WO-2014031562 A1 2/2014
WO WO-2014031899 A1 2/2014
WO WO-2014068573 A1 5/2014
WO WO-2014093668 A1 6/2014
WO WO-2014115136 A1 7/2014
WO WO-2014172388 A1 10/2014
WO WO-2014194262 A2 12/2014
WO WO-2015192026 A1 12/2015
WO WVO-2016007285 A1 1/2016
WO WO-2016044424 A1 3/2016
WO WO-2016054562 A1 4/2016
WO WO-2016065131 A1 4/2016
WO WO-2016100318 A2 6/2016
WO WO-2016100318 A3 6/2016
WO WO-2016100342 A1 6/2016
WO WO-2016/112299 A1 7/2016
WO WO-2016123381 A1 8/2016
WO WO-2016149594 A1 9/2016
WO WO-2016168591 A1 10/2016
WO WO-2016179166 A1 11/2016
WO WO-2016179235 A1 11/2016
WO WO-2016202890 A1 12/2016
WO WO-2017106529 A1 6/2017
WO WO-2017176739 A1 10/2017
WO WO-2017176992 A1 10/2017
WO WO-2018005644 A1 1/2018
WO WO-2018144931 A1 8/2018
WO WO-2018183119 A1 10/2018
WO WO-2019094618 A1 5/2019
WO WO-202205687 A1 1/2022
WO WO-202205693 A1 1/2022
WO WO-2022060549 A2 3/2022
WO WO-2022066578 A1 3/2022
WO WO-2022060549 A3 4/2022
WO WO-2022132381 A1 6/2022
WO WO-2022146678 A1 7/2022
WO WO-2022198182 A1 9/2022
WO WO-2022216784 A1 10/2022
WO WO-2022225761 A1 10/2022
WO WO-2022245765 A1 11/2022

OTHER PUBLICATIONS

US 10,425,370 B2, 09/2019, Allen et al. (withdrawn)
US 10,484,394 B2, 11/2019, Allen et al. (withdrawn)
US 10,503,924 B1, 12/2019, Murphy et al. (withdrawn)
US 10,542,011 B2, 01/2020, Allen et al. (withdrawn)
"U.S. Appl. No. 14/612,692, Response filed May 3, 2017 to Non Final Office Action mailed Jan. 3, 2017", 18 pgs.
"U.S. Appl. No. 14/634,417, Advisory Action mailed Mar. 14, 2017", 3 pgs.
"U.S. Appl. No. 14/634,417, Final Office Action mailed Jan. 31, 2017", 27 pgs.
"U.S. Appl. No. 14/634,417, Response filed Mar. 2, 2017 to Final Office Action mailed Jan. 31, 2017", 23 pgs.
"U.S. Appl. No. 14/967,472, Final Office Action mailed Mar. 10, 2017", 15 pgs.
"U.S. Appl. No. 15/208,460, Notice of Allowance mailed Feb. 27, 2017", 8 pgs.
"U.S. Appl. No. 15/224,312, Preliminary Amendment filed Feb. 1, 2017", 11 pgs.
"U.S. Appl. No. 15/224,343, Preliminary Amendment filed Jan. 31, 2017", 10 pgs.
"U.S. Appl. No. 15/224,355, Preliminary Amendment filed Apr. 3, 2017", 12 pgs.
"U.S. Appl. No. 15/224,372, Preliminary Amendment filed May 5, 2017", 10 pgs.
"U.S. Appl. No. 15/224,359, Preliminary Amendment filed Apr. 19, 2017", 8 pgs.
"U.S. Appl. No. 15/416,846, Preliminary Amendment filed Feb. 18, 2017", 10 pgs.
"Canadian Application Serial No. 2,910,158, Response filed Apr. 11, 2017 to Office Action mailed Dec. 15, 2016", 21 pgs.
"How Snaps Are Stored and Deleted", Snapchat, [Online]. Retrieved from the Internet: <URL: https://web.archive.org/web/20130607042322/http://blog.snapchat.com/post/50060403002/how-snaps-are-stored-and-deleted, (May 9, 2013), 2 pgs.
"International Application Serial No. PCT/US2015/053811, International Preliminary Report on Patentability mailed Apr. 13, 2017", 9 pgs.
"International Application Serial No. PCT/US2015/056884, International Preliminary Report on Patentability mailed May 4, 2017", 8 pgs.
Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.
Shein, Esther, "Ephemeral Data", Communications of the ACM vol. 56 | No. 9, (Sep. 2013), 20-22.
"U.S. Appl. No. 14/304,855, Corrected Notice of Allowance mailed Jun. 26, 2015", 8 pgs.
"U.S. Appl. No. 14/304,855, Final Office Action mailed Feb. 18, 2015", 10 pgs.
"U.S. Appl. No. 14/304,855, Non Final Office Action mailed Mar. 18, 2015", 9 pgs.
"U.S. Appl. No. 14/304,855, Non Final Office Action mailed Oct. 22, 2014", 11 pgs.
"U.S. Appl. No. 14/304,855, Notice of Allowance mailed Jun. 1, 2015", 11 pgs.
"U.S. Appl. No. 14/304,855, Response filed Feb. 25, 2015 to Final Office Action mailed Feb. 18, 2015", 5 pgs.
"U.S. Appl. No. 14/304,855, Response filed Apr. 1, 2015 to Non Final Office Action mailed Mar. 18, 2015", 4 pgs.
"U.S. Appl. No. 14/304,855, Response filed Nov. 7, 2014 to Non Final Office Action mailed Oct. 22, 2014", 5 pgs.
"U.S. Appl. No. 14/505,478, Advisory Action mailed Apr. 14, 2015", 3 pgs.
"U.S. Appl. No. 14/505,478, Corrected Notice of Allowance mailed May 18, 2016", 2 pgs.
"U.S. Appl. No. 14/505,478, Corrected Notice of Allowance mailed Jul. 22, 2016", 2 pgs.
"U.S. Appl. No. 14/505,478, Final Office Action mailed Mar. 17, 2015", 16 pgs.
"U.S. Appl. No. 14/505,478, Non Final Office Action mailed Jan. 27, 2015", 13 pgs.
"U.S. Appl. No. 14/505,478, Non Final Office Action mailed Sep. 4, 2015", 19 pgs.
"U.S. Appl. No. 14/505,478, Notice of Allowance mailed Apr. 28, 2016", 11 pgs.
"U.S. Appl. No. 14/505,478, Notice of Allowance mailed Aug. 26, 2016". 11 pgs.
"U.S. Appl. No. 14/505,478, Response filed Jan. 30, 2015 to Non Final Office Action mailed Jan. 27, 2015", 10 pgs.
"U.S. Appl. No. 14/505,478, Response filed Mar. 4, 2016 to Non Final Office Action mailed Sep. 4, 2015", 12 pgs.
"U.S. Appl. No. 14/505,478, Response filed Apr. 1, 2015 to Final Office Action mailed Mar. 17, 2015", 6 pgs.
"U.S. Appl. No. 14/506,478, Response filed Aug. 17, 2015 to Advisory Action mailed Apr. 14, 2015", 10 pgs.
"U.S. Appl. No. 14/523,728, Non Final Office Action mailed Dec. 12, 2014", 10 pgs.

(56) References Cited

OTHER PUBLICATIONS

"U.S. Appl. No. 14/523,728, Notice of Allowance mailed Mar. 24, 2015", 8 pgs.
"U.S. Appl. No. 14/523,728, Notice of Allowance mailed Apr. 15, 2015", 8 pgs.
"U.S. Appl. No. 14/523,728, Notice of Allowance mailed Jun. 5, 2015", 8 pgs.
"U.S. Appl. No. 14/523,728, Response filed Aug. 25, 2014 to Non Final Office Action mailed Jan. 16, 2015", 5 pgs.
"U.S. Appl. No. 14/529,064, Final Office Action mailed Aug. 11, 2015", 23 pgs.
"U.S. Appl. No. 14/529,064, Non Final Office Action mailed Mar. 12, 2015", 20 pgs.
"U.S. Appl. No. 14/529,064, Non Final Office Action mailed Apr. 18, 2016", 21 pgs.
"U.S. Appl. No. 14/529,064, Response filed Feb. 5, 2015 to Restriction Requirement mailed Feb. 2, 2015", 6 pgs.
"U.S. Appl. No. 14/529,064, Response filed Mar. 26, 2015 to Non Final Office Action mailed Mar. 12, 2015", 8 pgs.
"U.S. Appl. No. 14/529,064, Restriction Requirement mailed Feb. 2, 2015", 5 pgs.
"U.S. Appl. No. 14/529,064, Response filed Oct. 12, 2015 to Final Office Action mailed Aug. 11, 2015", 19 pgs.
"U.S. Appl. No. 14/578,258, Examiner Interview Summary mailed Nov. 25, 2015", 3 pgs.
"U.S. Appl. No. 14/578,258, Non Final Office Action mailed Jun. 10, 2015", 12 pgs.
"U.S. Appl. No. 14/578,258, Notice of Allowance mailed Feb. 26, 2016", 5 pgs.
"U.S. Appl. No. 14/578,258, Response filed Dec. 10, 2015 to Non Final Office Action mailed Jun. 10, 2015", 11 pgs.
"U.S. Appl. No. 14/578,271, Final Office Action mailed Dec. 3, 2015", 15 pgs.
"U.S. Appl. No. 14/578,271, Non Final Office Action mailed Aug. 7, 2015", 12 pgs.
"U.S. Appl. No. 14/578,271, Notice of Allowance mailed Dec. 7, 2016", 7 pgs.
"U.S. Appl. No. 14/578,271, Response filed Feb. 9, 2016 to Final Office Action mailed Dec. 3, 2015", 10 pgs.
"U.S. Appl. No. 14/578,271, Response filed Jun. 19, 2015 to Restriction Requirement mailed Apr. 23, 2015", 6 pgs.
"U.S. Appl. No. 14/578,271, Response filed Oct. 28, 2015 to Non Final Office Action mailed Aug. 7, 2015", 9 pgs.
"U.S. Appl. No. 14/578,271, Restriction Requirement mailed Apr. 23, 2015", 8 pgs.
"U.S. Appl. No. 14/612,692, Examiner Interview Summary mailed Jan. 29, 2016", 5 pgs.
"U.S. Appl. No. 14/612,692, Examiner Interview Summary mailed Jul. 6, 2016", 4 pgs.
"U.S. Appl. No. 14/612,692, Examiner Interview Summary mailed Aug. 14, 2015", 3 pgs.
"U.S. Appl. No. 14/612,692, Examiner Interview Summary mailed Sep. 8, 2016", 3 pgs.
"U.S. Appl. No. 14/612,692, Final Office Action mailed Aug. 15, 2016", 18 pgs.
"U.S. Appl. No. 14/612,692, Final Office Action mailed Nov. 23, 2015", 15 pgs.
"U.S. Appl. No. 14/612,692, Non Final Office Action mailed Jan. 3, 2017", 17 pgs.
"U.S. Appl. No. 14/612,692, Non Final Office Action mailed Mar. 28, 2016", 15 pgs.
"U.S. Appl. No. 14/612,692, Non Final Office Action mailed Jul. 20, 2015", 25 pgs.
"U.S. Appl. No. 14/612,692, Response filed Feb. 23, 2016 to Final Office Action mailed Nov. 23, 2015", 10 pgs.
"U.S. Appl. No. 14/612,692, Response filed Nov. 14, 2016 to Final Office Action mailed Aug. 15, 2016", 15 pgs.
"U.S. Appl. No. 14/612,692, Response filed Jun. 28, 2016 to Non Final Office Action mailed Mar. 28, 2016", 14 pgs.
"U.S. Appl. No. 14/612,692 Response filed Oct. 19, 2015 to Non Final Office Action mailed Jul. 20, 2015", 11 pgs.
"U.S. Appl. No. 14/634,417, Non Final Office Action mailed Aug. 30, 2016", 23 pgs.
"U.S. Appl. No. 14/634,417, Response filed Nov. 30, 2016 to Non Final Office Action mailed Aug. 30, 2016", 18 pgs.
"U.S. Appl. No. 14/704,212, Non Final Office Action mailed Dec. 4, 2015", 17 pgs.
"U.S. Appl. No. 14/704,212, Response filed Mar. 4, 2016 to Non Final Office Action mailed Dec. 4, 2015", 11 pgs.
"U.S. Appl. No. 14/738,069, Non Final Office Action mailed Mar. 21, 2016", 12 pgs.
"U.S. Appl. No. 14/738,069, Notice of Allowance mailed Aug. 17, 2016", 6 pgs.
"U.S. Appl. No. 14/738,069, Response filed Jun. 10, 16 to Non Final Office Action mailed Mar. 21, 2016", 10 pgs.
"U.S. Appl. No. 14/808,283, Notice of Allowance mailed Apr. 12, 2016", 9 pgs.
"U.S. Appl. No. 14/808,283, Notice of Allowance mailed Jul. 14, 2016", 8 pgs.
"U.S. Appl. No. 14/808,283, Preliminary Amendment filed Jul. 24, 2015", 8 pgs.
"U.S. Appl. No. 14/967,472, Non Final Office Action mailed Sep. 8, 2016", 11 pgs.
"U.S. Appl. No. 14/967,472, Preliminary Amendment filed Dec. 15, 2015", 6 pgs.
"U.S. Appl. No. 14/967,472, Response filed Dec. 5, 2016 to Non Final Office Action mailed Sep. 8, 2016", 11 pgs.
"U.S. Appl. No. 15/137,608, Preliminary Amendment filed Apr. 26, 2016", 6 pgs.
"U.S. Appl. No. 15/152,975, Non Final Office Action mailed Jan. 12, 2017", 36 pgs.
"U.S. Appl. No. 15/152,975, Preliminary Amendment filed May 19, 2016", 8 pgs.
"U.S. Appl. No. 15/208,460, Notice of Allowance mailed Dec. 30, 2016", 9 pgs.
"U.S. Appl. No. 15/208,460, Supplemental Preliminary Amendment filed Jul. 18, 2016", 8 pgs.
"U.S. Appl. No. 15/298,806, Preliminary Amendment filed Oct. 21, 2016", 8 pgs.
"Canadian Application Serial No. 2,894,332, Office Action mailed Aug. 16, 2016", 4 pgs.
"Canadian Application Serial No. 2,910,158, Office Action mailed Dec. 15, 2016", 5 pgs.
"International Application Serial No. PCT/EP2008/063682, International Search Report mailed Nov. 24, 2008", 3 pgs.
"International Application Serial No. PCT/US2015/035591, International Search Report mailed Aug. 11, 2015", 5 pgs.
"International Application Serial No. PCT/US2015/035591, International Written Opinion mailed Aug. 11, 2015", 5 pgs.
"International Application Serial No. PCT/US2015/053811, International Search Report mailed Nov. 23, 2015", 5 pgs.
"International Application Serial No. PCT/US2015/053811, Written Opinion mailed Nov. 23, 2015", 8 pgs.
"International Application Serial No. PCT/US2015/056884, International Search Report mailed Dec. 22, 2015", 5 pgs.
"International Application Serial No. PCT/US2015/056884, Written Opinion mailed Dec. 22, 2015", 6 pgs.
"International Application Serial No. PCT/US2015/065785, International Search Report mailed Jul. 21, 2016", 5 pgs.
"International Application Serial No. PCT/US2015/065785, Written Opinion mailed Jul. 21, 2016", 5 pgs.
"International Application Serial No. PCT/US2015/065821, International Search Report mailed Mar. 3, 2016", 2 pgs.
"International Application Serial No. PCT/US2015/065821, Written Opinion mailed Mar. 3, 2016", 3 pgs.
"International Application Serial No. PCT/US2016/023085, International Search Report mailed Jun. 17, 2016", 5 pgs.
"International Application Serial No. PCT/US2016/023085, Written Opinion mailed Jun. 17, 2016", 6 pgs.
"iVisit Mobile Getting Started", IVISIT, (Dec. 4, 2013), 1-16.

(56) References Cited

OTHER PUBLICATIONS

"PearlEyes by Red Giant", © 2002-2015 Red Giant LLC, [Online]. Retrieved from the Internet: <URL: http://www.redgiant.com/products/pluraleyes/, (Accessed Nov. 11, 2015), 5 pgs.
Castelluccia, Claude, et al., "EphPub: Toward robust Ephemeral Publishing", Network Protocols (ICNP), 2011 19th IEEE International Conference on, IEEE, (Oct. 17, 2011), 18 pgs.
Clarke, Tangier, "Automatically syncing multiple clips and lots of audio like PluralEyes possible?", [Online]. Retrieved from the Internet: <URL: https://forums.creativecow.net/thread/344/20553, (May 21, 2013), 8 pgs.
Melanson, Mike, "This text message will self destruct in 60 seconds", readwrite.com, [Online]. Retrieved from the Internet: <http://readwrite.com/2011/02/11/this_text_message_will_selfdestruct_in_60_seconds>, (Feb. 18, 2015).
Sawers, Paul, "Snapchat for ios lets you send photos to friends and set how long they're visible for", http ://thenextweb.com/apps/2012/05/07/ snapchat-for-ios-lets-you-send-photos-to-f riends-and-set-how-long-theyre-visible-for, (May 2012), 1-3 pgs.
Sawers, Paul, "Snapchatfor iOS Lets You Send Photos to Friends and Set How long They're Visible for", [Online]. Retrieved from the Internet: <http://thenextweb.com/apps/2012/05/07/Snapchat-for-ios-lets-you-send-photos-to-friends-and-set-how-long-theyre-visiblefor/#!xCjrp>,, (May 7, 2012), 1-5.
Trice, Andrew, "My Favorite New Feature: Multi-Clip Syno in Premiere Pro CC", [Online]. Retrieved from the Internet: <URL: http://www.tricedesigns.com/2013/06/18/my-favorite-new-feature-multi-cam-synch-in-premiere-pro-co/, (Jun. 18, 2013), 5 pgs.
U.S. Appl. No. 14/723,400 U.S. Pat. No. 9,396,354, filed May 27, 2015, Apparatus and Method for Automated Privacy Protection in Distributed Images.
U.S. Appl. No. 15/212,095 U.S. Pat. No. 9,785,796, filed Jul. 15, 2016, Apparatus and Method for Automated Privacy Protection in Distributed Images.
U.S. Appl. No. 15/729,582, filed Oct. 10, 2017, Apparatus and Method for Automated Privacy Protection in Distributed Images..
"Android Getting Started Guide", Voxer Business, [Online]. Retrieved from the Internet: <https://voxer.com/assets/AndroidGuide.pdf>, (Feb. 1, 2014), 18 pgs.
"U.S. Appl. No. 14/612,692, Non Final Office Action mailed Jan. 9, 2018", 19 pgs.
"U.S. Appl. No. 14/723,400, Final Office Action mailed Jan. 4, 2016", 14 pgs.
"U.S. Appl. No. 14/723,400, Non Final Office Action mailed Jul. 20, 2015", 14 pgs.
"U.S. Appl. No. 14/723,400, Notice of Allowance mailed Mar. 28, 2016", 12 pgs.
"U.S. Appl. No. 14/723,400, Notice of Non Compliant Amendment mailed Sep. 21, 2015", 2 pgs.
"U.S. Appl. No. 14/723,400, Notice of Non Compliant Amendment mailed Nov. 10, 2015". 2 pgs.
"U.S. Appl. No. 14/723,400, Response filed Jan. 29, 2016 to Final Office Action mailed Jan. 4, 2016", 8 pgs.
"U.S. Appl. No. 14/723,400, Response filed Aug. 13, 2015 to Non Final Office Action mailed Jul. 20, 2015", 7 pgs.
"U.S. Appl. No. 14/723,400, Response filed Sep. 23, 2015 to Notice of Non Compliant Amendment mailed Sep. 21, 2015", 5 pgs.
"U.S. Appl. No. 14/723,400, Response filed Nov. 19, 2015 to Notice of Non Compliant Amendment mailed Nov. 10, 2015", 5 pgs.
"U.S. Appl. No. 14/967,472, Final Office Action mailed Jan. 12, 2018", 17 pgs.
"U.S. Appl. No. 15/152,975, Non Final Office Action mailed Jan. 10, 2018", 18 pgs.
"U.S. Appl. No. 15/212,095, Final Office Action mailed Mar. 14, 2017", 9 pgs.
"U.S. Appl. No. 15/212,095, Non Final Office Action mailed Feb. 2, 2017", 8 pgs.
"U.S. Appl. No. 15/212,095, Notice of Allowance mailed Jun. 1, 2017", 8 pgs.
"U.S. Appl. No. 15/212,095, Notice of Allowance mailed Sep. 8, 2017", 2 pgs.
"U.S. Appl. No. 15/212,095, Response filed Feb. 28, 2017 to Non Final Office Action mailed Feb. 2, 2017", 2 pgs.
"U.S. Appl. No. 15/212,095, Response filed May 15, 2017 to Final Office Action mailed Mar. 14, 2017", 2 pgs.
"U.S. Appl. No. 15/224,359, Response filed Jan. 22, 2018 to Non Final Office Action mailed Jul. 20, 2017", 13 pgs.
"U.S. Appl. No. 15/224,372, Response filed Jan. 8, 2017 to Non Final Office Action mailed Aug. 7, 2017", 22 pgs.
"U.S. Appl. No. 15/224,377, Final Office Action mailed Jan. 2, 2018", 29 pgs.
"U.S. Appl. No. 15/224,377, Response filed Dec. 6, 2017 to Non Final Office Action mailed Aug. 4, 2017", 22 pgs.
"U.S. Appl. No. 15/224,383, Preliminary Amendment filed May 9, 2017", 13 pgs.
"U.S. Appl. No. 15/224,383, Response filed Jan. 3, 2018 to Non Final Office Action mailed Aug. 30, 2017", 25 pgs.
"U.S. Appl. No. 15/298,806, Advisory Action mailed Jan. 29, 2018", 4 pgs.
"U.S. Appl. No. 15/298,806, Examiner Interview Summary mailed Jan. 12, 2018", 3 pgs.
"U.S. Appl. No. 15/298,806, Response filed Jan. 9, 2018 to Final Office Action mailed Oct. 24, 2017", 17 pgs.
"European Application Serial No. 14804343.3, Extended European Search Report mailed Sep. 29, 2016", 12 pgs.
"International Application Serial No. PCT/US2014/040346, International Search Report mailed Mar. 23, 2015", 2 pgs.
"International Application Serial No. PCT/US2014/040346, Written Opinion mailed Mar. 23, 2015", 6 pgs.
"International Application Serial No. PCT/US2015/037251, International Search Report mailed Sep. 29, 2015", 2 pgs.
"International Application Serial No. PCT/US2015/037251, Written Opinion mailed Sep. 29, 2015", 4 pgs.
Fajman, "An Extensible Message Format for Message Disposition Notifications", Request for Comments: 2298, National Institutes of Health, (Mar. 1998), 28 pgs.
"U.S. Appl. No. 14/578,271, Corrected Notice of Allowance mailed Oct. 30, 2017", 2 pgs.
"U.S. Appl. No. 14/578,271, Notice of Allowability mailed Nov. 29, 2017", 3 pgs.
"U.S. Appl. No. 14/578,271, Notice of Allowance mailed Aug. 1, 2017", 5 pgs.
"U.S. Appl. No. 14/612,692, Examiner Interview Summary mailed Nov. 13, 2017", 13 pgs.
"U.S. Appl. No. 14/612,692, Final Office Action mailed Aug. 25, 2017", 18 pgs.
"U.S. Appl. No. 14/612,692, Response Filed Nov. 22, 2017 to Final Office Action mailed Aug. 25, 2017", 11 pgs.
"U.S. Appl. No. 14/634,417, Examiner Interview Summary mailed Aug. 7, 2017", 3 pgs.
"U.S. Appl. No. 14/634,417, Non Final Office Action mailed Jun. 8, 2017", 17 pgs.
"U.S. Appl. No. 14/634,417, Notice of Allowance mailed Oct. 25, 2017", 9 pgs.
"U.S. Appl. No. 14/634,417, Response filed Sep. 21, 2017 to Non Final Office Action mailed Jun. 8, 2017", 16 pgs.
"U.S. Appl. No. 14/967,472, Response filed Jun. 7, 2017 to Final Office Action mailed Mar. 10, 2017", 12 pgs.
"U.S. Appl. No. 15/074,029, Non Final Office Action mailed Nov. 30, 2017", 16 pgs.
"U.S. Appl. No. 15/152,975, Examiner Interview Summary mailed Nov. 13, 2017", 13 pgs.
"U.S. Appl. No. 15/152,975, Final Office Action mailed Jun. 30, 2017", 17 pgs.
"U.S. Appl. No. 15/152,975, Response filed Jun. 12, 2017 to Non Final Office Action mailed Jan. 12, 2017", 13 pgs.
"U.S. Appl. No. 15/152,975, Response filed Nov. 30, 2017 to Final Office Action mailed Jun. 30, 2017", 9 pgs.
"U.S. Appl. No. 15/224,312, Non Final Office Action mailed Oct. 11, 2017", 29 pgs.
"U.S. Appl. No. 15/224,343, Non Final Office Action mailed Oct. 4, 2017", 26 pgs.

(56) References Cited

OTHER PUBLICATIONS

"U.S. Appl. No. 15/224,355, Examiner Interview Summary mailed Oct. 25, 2017", 3 pgs.
"U.S. Appl. No. 15/224,355, Non Final Office Action mailed Sep. 6, 2017", 30 pgs.
"U.S. Appl. No. 15/224,359, Non Final Office Action mailed Jul. 20, 2017", 33 pgs.
"U.S. Appl. No. 15/224,372, Non Final Office Action mailed Aug. 7, 2017", 40 pgs.
"U.S. Appl. No. 15/224,377, Non Final Office Action mailed Aug. 4, 2017", 41 pgs.
"U.S. Appl. No. 15/224,383, Examiner Interview Summary mailed Oct. 25, 2017", 3 pgs.
"U.S. Appl. No. 15/224,383, Non Final Office Action mailed Aug. 30, 2017", 26 pgs.
"U.S. Appl. No. 15/298,806, Final Office Action mailed Oct. 24, 2017", 15 pgs.
"U.S. Appl. No. 15/298,806, Non Final Office Action mailed Jun. 12, 2017", 26 pgs.
"U.S. Appl. No. 15/298,806, Response filed Sep. 12, 2017 to Non Final Office Action mailed Jun. 12, 2017", 12 pgs.
"U.S. Appl. No. 15/416,846, Notice of Allowance mailed Jul. 19, 2017", 9 pgs.
"U.S. Appl. No. 15/702,511, Preliminary Amendment filed Sep. 15, 2017", 13 pgs.
"U.S. Appl. No. 15/787,467, Preliminary Amendment filed Oct. 26, 2017", 11 pgs.
"Canadian Application Serial No. 2,894,332, Response filed Jan. 24, 2017 to Office Action mailed Aug. 16, 2016", 15 pgs.
"European Application Serial No. 15782165.3, Response filed Oct. 17, 2017 to Communication pursuant to Rules 161(1) and 162 EPC mailed May 10, 2017", 15 pgs.
"European Application Serial No. 15870874.3, Extended European Search Report mailed Nov. 29, 2017" 7 pgs.
"International Application Serial No. PCT/US2015/065785, International Preliminary Report on Patentability mailed Jun. 29, 2017", 7 pgs.
"International Application Serial No. PCT/US2015/065821, International Preliminary Report on Patentability mailed Jun. 29, 2017", 5 pgs.
"International Application Serial No. PCT/US2016/023085, International Preliminary Report on Patentability mailed Sep. 28, 2017", 8 pgs.
U.S. Appl. No. 15/702,511, filed Sep. 12, 2017, Ephemeral Gallery of Ephemeral Messages.
U.S. Appl. No. 15/787,467, filed Oct. 18, 2017, Prioritization of Messages Within a Message Collection.
"U.S. Appl. No. 14/967,472, Response filed Mar. 16, 2018 Non Final Office Action mailed Jan. 12, 2018", 13 pgs.
"U.S. Appl. No. 15/074,029, Response filed Feb. 28, 2018 to Non Final Office Action mailed Nov. 30, 2017", 12 pgs.
"U.S. Appl. No. 15/224,312, Final Office Action mailed Apr. 20, 2018", 22 pgs.
"U.S. Appl. No. 15/224,343, Final Office Action mailed Apr. 19, 2018", 20 pgs.
"U.S. Appl. No. 15/224,343, Response filed Mar. 5, 2018 to Non Final Office Action mailed Oct. 4, 2017", 23 pgs.
"U.S. Appl. No. 15/224,355, Final Office Action mailed Apr. 24, 2018".
"U.S. Appl. No. 15/224,355, Response filed Mar. 6, 2018 to Non Final Office Action mailed Sep. 6, 2017", 25 pgs.
"U.S. Appl. No. 15/224,359, Final Office Action mailed Apr. 2, 2018", 18 pgs.
"U.S. Appl. No. 15/224,372, Final Office Action mailed Apr. 3, 2018", 18 pgs.
"U.S. Appl. No. 15/224,383, Final Office Action mailed Feb. 14, 2018", 25 pgs.
"U.S. Appl. No. 15/787,467, Non Final Office Action mailed Apr. 18, 2018", 17 pgs.
"U.S. Appl. No. 14/612,692, Examiner Interview Summary mailed May 14, 2018", 3 pgs.
"U.S. Appl. No. 14/612,692, Notice of Allowance mailed Jul. 5, 2018", 11 pgs.
"U.S. Appl. No. 14/612,692, Response Filed May 9, 2018 to Non Final Office Action mailed Jan. 9, 2018", 15 pgs.
"U.S. Appl. No. 14/634,417, Notice of Allowance mailed May 22, 2018", 9 pgs.
"U.S. Appl. No. 14/967,472, Final Office Action mailed Jun. 25, 2018", 14 pgs.
"U.S. Appl. No. 14/967,472, Response filed Sep. 21, 2018 to Final Office Action mailed Jun. 25, 2018", 11 pgs.
"U.S. Appl. No. 15/074,029, Advisory Action mailed Oct. 11, 2018", 3 pgs.
"U.S. Appl. No. 15/074,029, Final Office Action mailed Jun. 28, 2018", 22 pgs.
"U.S. Appl. No. 15/074,029, Response filed Aug. 28, 2018 to Final Office Action mailed Jun. 28, 2018", 21 pgs.
"U.S. Appl. No. 15/137,608, Non Final Office Action mailed Nov. 2, 2018", 10 pgs.
"U.S. Appl. No. 15/152,975, Examiner Interview Summary mailed May 14, 2018", 3 pgs.
"U.S. Appl. No. 15/152,975, Final Office Action mailed Jul. 2, 2018", 19 pgs.
"U.S. Appl. No. 15/152,975, Non Final Office Action mailed Sep. 28, 2018", 28 pgs.
"U.S. Appl. No. 15/152,975, Response Filed May 10, 2018 to Non Final Office Action mailed Jan. 10, 2018", 13 pgs.
"U.S. Appl. No. 15/152,975, Response filed Sep. 19, 2018 to Final Office Action mailed Jul. 2, 2018", 14 pgs.
"U.S. Appl. No. 15/224,312, Non Final Office Action mailed Oct. 22, 2018", 15 pgs.
"U.S. Appl. No. 15/224,312, Response filed Aug. 20, 2018 to Final Office Action mailed Apr. 20, 2018", 16 pgs.
"U.S. Appl. No. 15/224,343, Non Final Office Action mailed Sep. 4, 2018", 20 pgs.
"U.S. Appl. No. 15/224,343, Response filed Jul. 19, 2018 to Final Office Action mailed Apr. 19, 2018", 16 pgs.
"U.S. Appl. No. 15/224,355, Response filed Sep. 24, 2018 to Final Office Action mailed Apr. 24, 2018", 19 pgs.
"U.S. Appl. No. 15/224,359, Non Final Office Action mailed Sep. 28, 2018", 15 pgs.
"U.S. Appl. No. 15/224,359, Response filed Sep. 4, 2018 to Final Office Action mailed Apr. 2, 2018", 14 pgs.
"U.S. Appl. No. 15/224,372, Non Final Office Action mailed Sep. 14, 2018", 20 pgs.
"U.S. Appl. No. 15/224,372, Response filed Aug. 3, 2018 to Final Office Action mailed Apr. 3, 2018", 14 pgs.
"U.S. Appl. No. 15/224,377, Non Final Office Action mailed Jun. 15, 2018", 19 pgs.
"U.S. Appl. No. 15/224,383, Examiner Interview Summary mailed Aug. 15, 2018", 4 pgs.
"U.S. Appl. No. 15/224,383, Non Final Office Action mailed Jul. 5, 2018", 19 pgs.
"U.S. Appl. No. 15/224,383, Response filed Jun. 14, 2018 to Final Office Action mailed Feb. 14, 2018", 14 pgs.
"U.S. Appl. No. 15/224,383, Response Filed Dec. 5, 2018 to Non Final Office Action mailed Jul. 5, 2018", 16 pgs.
"U.S. Appl. No. 15/298,806, Examiner Interview Summary mailed Aug. 13, 2018", 3 pgs.
"U.S. Appl. No. 15/298,806, Non Final Office Action mailed May 17, 2018", 16 pgs.
"U.S. Appl. No. 15/298,806, Notice of Allowance mailed Sep. 19, 2018", 5 pgs.
"U.S. Appl. No. 15/298,806, Response filed Aug. 10, 2018 to Non Final Office Action mailed May 17, 2018", 15 pgs.
"U.S. Appl. No. 15/702,511, Notice of Allowance mailed Oct. 26, 2018", 7 pgs.
"U.S. Appl. No. 15/729,582, Final Office Action mailed Dec. 13, 2018", 14 pgs.
"U.S. Appl. No. 15/729,582, Non Final Office Action mailed May 25, 2018", 14 pgs.

(56) References Cited

OTHER PUBLICATIONS

"U.S. Appl. No. 15/787,467, Corrected Notice of Allowability mailed Sep. 24, 2018", 2 pgs.
"U.S. Appl. No. 15/787,467, Notice of Allowance mailed Aug. 31, 2018", 8 pgs.
"U.S. Appl. No. 15/787,467, Response filed Jul. 18, 2018 to Non Final Office Action mailed Apr. 18, 2018", 12 pgs.
"U.S. Appl. No. 15/946,990, Non Final Office Action mailed Dec. 3, 2018", 10 pgs.
"U.S. Appl. No. 16/000,657, Preliminary Amendment filed Jun. 6, 2018", 8 pgs.
"Canadian Application Serial No. 2,894,332, Request for Reinstatement filed Jun. 11, 2018", w/ Amended Claims, 17 pgs.
"Canadian Application Serial No. 2,910,158, Office Action mailed Jun. 6, 2018", 5 pgs.
"European Application Serial No. 15782165.3, Communication Pursuant to Article 94(3) EPC mailed Sep. 14, 2018", 7 pgs.
Chen, Datong, et al., "Protecting Personal Identification in Video", Protecting Privacy in Video Surveillance, Springer-Verlag London Ltd., (2009), 115-128.
Vaas, Lisa, "StealthText, Should You Choose to Accept It", URL: http://www.eweek.com/print/c/a/MessagingandCollaboration/StealthTextShouldYouChoosetoAcceptIt, (Dec. 13, 2005), 2 pgs.
"U.S. Appl. No. 14/634,417, Corrected Notice of Allowability mailed Mar. 11, 2019", 3 pgs.
"U.S. Appl. No. 14/634,417, Corrected Notice of Allowability mailed Mar. 20, 2019", 3 pgs.
"U.S. Appl. No. 14/967,472, Corrected Notice of Allowability mailed Mar. 18, 2019", 3 pgs.
"U.S. Appl. No. 14/967,472, Corrected Notice of Allowability mailed Apr. 24, 2019", 3 pgs.
"U.S. Appl. No. 14/967,472, Notice of Allowance mailed Jan. 24, 2019", 6 pgs.
"U.S. Appl. No. 15/074,029, Non Final Office Action mailed Jan. 23, 2019", 19 pgs.
"U.S. Appl. No. 15/074,029, Response filed Apr. 23, 2019 to Non Final Office Action mailed Jan. 23, 2019", 15 pgs.
"U.S. Appl. No. 15/137,608, Amendment and Response filed Jan. 25, 2019 to Non Final Office Action mailed Nov. 2, 2018", 13 pgs.
"U.S. Appl. No. 15/137,608, Final Office Action mailed May 13, 2019", 10 pgs.
"U.S. Appl. No. 15/152,975, Examiner Interview Summary mailed Feb. 4, 2019", 7 pgs.
"U.S. Appl. No. 15/152,975, Notice of Allowance malled May 17, 2019", 13 pgs.
"U.S. Appl. No. 15/152,975, Response filed Jan. 28, 2019 to Non Final Office Action maied Sep. 28, 2018", 17 pgs.
"U.S. Appl. No. 15/224,312, Final Office Action mailed Apr. 11, 2019", 15 pgs.
"U.S. Appl. No. 15/224,312, Response filed Feb. 22, 2019 to Non Final Office Action mailed Oct. 22, 2018", 14 pgs.
"U.S. Appl. No. 15/224,343, Amendment and Response filed Feb. 4, 2019 to Non Final Office Action mailed Sep. 4, 2018", 18 pgs.
"U.S. Appl. No. 15/224,343, Final Office Action mailed Mar. 22, 2019", 17 pgs.
"U.S. Appl. No. 15/224,355, Non Final Office Action mailed Dec. 20, 2018", 14 pgs.
"U.S. Appl. No. 15/224,355, Response filed May 20, 2019 to Non Final Office Action mailed Dec. 20, 2018", 13 pgs.
"U.S. Appl. No. 15/224,359, Final Office Action mailed Apr. 11, 2019", 15 pgs.
"U.S. Appl. No. 15/224,359, Response filed Feb. 28, 2019 to Non Final Office Action mailed Aug. 28, 2018", 16 pgs.
"U.S. Appl. No. 15/224,372, Final Office Action mailed Mar. 6, 2019", 17 pgs.
"U.S. Appl. No. 15/224,372, Resonse filed Jan. 16, 2019 to Non Final Office Action mailed Sep. 14, 2018", 18 pgs.
"U.S. Appl. No. 15/224,377, Examiner Interview Summary mailed Mar. 4, 2019", 5 pgs.
"U.S. Appl. No. 15/224,377, Final Office Action mailed Feb. 6, 2019", 14 pgs.
"U.S. Appl. No. 15/224,383, Final Office Action mailed Jan. 14, 2019", 15 pgs.
"U.S. Appl. No. 15/224,383, Response filed May 14, 2019 to Final Office Action mailed Jan. 24, 2019", 15 pgs.
"U.S. Appl. No. 15/702,511, Notice of Allowance mailed Mar. 26, 2019", 7 pgs.
"U.S. Appl. No. 15/729,582, Response filed May 13, 2019 to Final Office Action mailed Dec. 13, 2018", 9 pgs.
"U.S. Appl. No. 15/946,990, Final Office Action mailed May 9, 2019", 11 pgs.
"U.S. Appl. No. 15/946,990, Response filed Feb. 20, 2019 to Non Final Office Action maled Dec. 3, 2018", 11 pgs.
"U.S. Appl. No. 16/204,886, Non Final Office Action mailed Jan. 4, 2019", 8 pgs.
"U.S. Appl. No. 16/204,886, Notice of Allowance mailed May 15, 2019", 9 pgs.
"U.S. Appl. No. 16/204,886, Response filed Apr. 2, 2019 to Non Final Office Action mailed Jan. 4, 2019", 8 pgs.
"Canadian Application Serial No. 2,910,158, Response filed Dec. 6, 2018 to Office Action mailed Jun. 6, 2018", w/ English Claims, 18 pgs.
"European Application Serial No. 15782165.3, Response filed Jan. 24, 2019 to Communication Pursuant to Article 94(3) EPC mailed Sep. 14, 2018", w/ English Claims, 56 pgs.
U.S. Appl. No. 16/529,461, filed Aug. 1, 2019, Multichannel System.
U.S. Appl. No. 16/541,919, filed Aug. 15, 2019, Geo-Fence Authorization Provisioning.
U.S. Appl. No. 16/376,598, filed Apr. 5, 2019, Gallery of Videos Set to an Audio Time Line.
U.S. Appl. No. 16/703,526, filed Dec. 4, 2019, Routing Messages By Message Parameter.
U.S. Appl. No. 16/662,956, filed Oct. 24, 2019, Gallery of Messages From Individuals with a Shared Interest.
U.S. Appl. No. 16/511,834, filed Jul. 15, 2019, Prioritization of Messages Within a Message Collection.
U.S. Appl. No. 16/709,092, filed Dec. 10, 2019, Prioritization of Messages Within a Message Collection.
U.S. Appl. No. 16/667,814, filed Oct. 29, 2019, Apparatus and Method for Automated Privacy Protection in Distributed Images.
"U.S. Appl. No. 15/074,029, Corrected Notice of Allowability mailed Feb. 5, 2020", 4 pgs.
"U.S. Appl. No. 15/074,029, Corrected Notice of Allowability mailed Aug. 20, 2019", 10 pgs.
"U.S. Appl. No. 15/074,029, Notice of Allowance mailed Jun. 19, 2019", 14 pgs.
"U.S. Appl. No. 15/137,608, Corrected Notice of Allowability mailed Oct. 2, 2019", 3 pgs.
"U.S. Appl. No. 15/137,608, Notice of Allowance mailed Aug. 8, 2019", 7 pgs.
"U.S. Appl. No. 15/137,608, Response filed Jul. 12, 2019 to Final Office Action mailed May 13, 2019", 10 pgs.
"U.S. Appl. No. 15/224,312, Advisory Action mailed Aug. 27, 2019", 3 pgs.
"U.S. Appl. No. 15/224,312, Non Final Office Action mailed Dec. 16, 2019", 14 pgs.
"U.S. Appl. No. 15/224,312, Response filed Oct. 11, 2019 to Advisory Action mailed Aug. 27, 2019", 17 pgs.
"U.S. Appl. No. 15/224,312, Response filed Aug. 12, 2019 to Final Office Action mailed Apr. 11, 2019", 14 pgs.
"U.S. Appl. No. 15/224,343, Non Final Office Action mailed Nov. 12, 2019", 16 pgs.
"U.S. Appl. No. 15/224,343, Response filed Aug. 22, 2019 to Final Office Action mailed Mar. 22, 2019", 16 pgs.
"U.S. Appl. No. 15/224,355, Final Office Action mailed Aug. 9, 2019", 15 pgs.
"U.S. Appl. No. 15/224,355, Non Final Office Action mailed Jan. 22, 2020", 13 pgs.
"U.S. Appl. No. 15/224,355, Response filed Nov. 11, 2019 to Final Office Action mailed Aug. 9, 2019", 14 pgs.

(56) References Cited

OTHER PUBLICATIONS

"U.S. Appl. No. 15/224,359, Non Final Office Action mailed Dec. 10, 2019", 12 pgs.
"U.S. Appl. No. 15/224,359, Response filed Sep. 11, 2019 to Final Office Action mailed Apr. 11, 2019", 18 pgs.
"U.S. Appl. No. 15/224,372, Non Final Office Action mailed Oct. 16, 2019", 14 pgs.
"U.S. Appl. No. 15/224,372, Response filed Jul. 8, 2019 to Final Office Action mailed Mar. 6, 2019", 14 pgs.
"U.S. Appl. No. 15/224,377, Non Final Office Action mailed Oct. 15, 2019", 12 pgs.
"U.S. Appl. No. 15/224,377, Response filed Jun. 6, 2019 to Final Office Action mailed Feb. 6, 2019", 10 pgs.
"U.S. Appl. No. 15/224,383, Non-Final Office Action mailed Sep. 23, 2019", 13 pgs.
"U.S. Appl. No. 15/224,383, Response filed Jan. 23, 2020 to Non Final Office Action mailed Sep. 23, 2019", 14 pgs.
"U.S. Appl. No. 15/702,511, 312 Amendment filed Jun. 26, 2019", 11 pgs.
"U.S. Appl. No. 15/702,511, Notice of Allowability mailed Sep. 30, 2019", 2 pgs.
"U.S. Appl. No. 15/702,511, PTO Response to Rule 312 Communication mailed Aug. 13, 2019", 2 pgs.
"U.S. Appl. No. 15/729,582, Corrected Notice of Allowability mailed Oct. 2, 2019", 3 pgs.
"U.S. Appl. No. 15/729,582, Corrected Notice of Allowability mailed Oct. 30, 2019", 3 pgs.
"U.S. Appl. No. 15/729,582, Notice of Allowance mailed Jul. 22, 2019", 9 pgs.
"U.S. Appl. No. 15/946,990, Notice of Allowance mailed Sep. 24, 2019", 5 pgs.
"U.S. Appl. No. 15/946,990, Response filed Jul. 9, 2019 to Final Office Action mailed May 9, 2019", 12 pgs.
"U.S. Appl. No. 15/947,350, Non Final Office Action mailed Dec. 13, 2019", 20 pgs.
"U.S. Appl. No. 16/204,886, Corrected Notice of Allowability mailed Jul. 15, 2019", 2 pgs.
"U.S. Appl. No. 16/204,886, Corrected Notice of Allowability mailed Aug. 6, 2019", 2 pgs.
"U.S. Appl. No. 16/204,886, Corrected Notice of Allowability mailed Sep. 10, 2019", 2 pgs.
"U.S. Appl. No. 16/219,577, Non Final Office Action mailed Oct. 29, 2019", 7 pgs.
"U.S. Appl. No. 16/219,577, Response filed Oct. 3, 2019 to Restriction Requirement mailed Aug. 7, 2019", 6 pgs.
"U.S. Appl. No. 16/219,577, Response filed Dec. 5, 2019 to Non Final Office Action mailed Oct. 29, 2019", 6 pgs.
"U.S. Appl. No. 16/219,577, Restriction Requirement mailed Aug. 7, 2019", 6 pgs.
"U.S. Appl. No. 16/376,598, Non Final Office Action mailed Jul. 25, 2019", 7 pgs.
"U.S. Appl. No. 16/376,598, Notice of Allowability mailed Jan. 23, 2020", 2 pgs.
"U.S. Appl. No. 16/376,598, Notice of Allowance mailed Oct. 18, 2019", 5 pgs.
"U.S. Appl. No. 16/376,598, Response filed Oct. 7, 2019 to Non-Final Office Action mailed Jul. 25, 2019", 2 pgs.
"U.S. Appl. No. 16/511,834, Corrected Notice of Allowability mailed Jan. 27, 2020", 2 pgs.
"U.S. Appl. No. 16/511,834, Non-Final Office Action mailed Aug. 20, 2019", 11 pgs.
"U.S. Appl. No. 16/511,834, Notice of Allowance mailed Oct. 23, 2019", 8 pgs.
"U.S. Appl. No. 16/511,834, Response filed Oct. 7, 2019 to Non-Final Office Action mailed Aug. 20, 2019", 3 pgs.
"U.S. Appl. No. 16/662,956, Preliminary Amendment filed Oct. 24, 2019", 8 pgs.
"Canadian Application Serial No. 3,027,981, Office Action mailed Dec. 5, 2019", 4 pgs.
"European Application Serial No. 15782165.3, Response filed Jan. 10, 2020 to Summons to Attend Oral Proceedings mailed Sep. 18, 2019", 18 pgs.
"European Application Serial No. 15782165.3, Summons to Attend Oral Proceedings mailed Sep. 18, 2019", 6 pgs.
Wagner, Kurt, "Snapchat Rolls Out Group-Sharing Feature for Concerts, Live Events", Mashable, [Online] Retrieved from the Internet on Sep. 12, 2019: <URL: https://mashable.com/2014/06/17/snapchat-our-story/?europe=true>, (Jun. 17, 2014), 16 pgs.
U.S. Appl. No. 17/035,575, filed Sep. 28, 2020, Geo-Fence Authorization Provisioning.
U.S. Appl. No. 16/933,205, filed Jul. 20, 2020, Ephemeral Message Collection UI Indicia.
U.S. Appl. No. 16/933,279, filed Jul. 20, 2020, Display Duration Assignment for Ephemeral Messages.
U.S. Appl. No. 16/933,366, filed Jul. 20, 2020, Automated Management of Ephemeral Message Collections.
U.S. Appl. No. 17/023,175, filed Sep. 16, 2020, Routing Messages By Message Parameter.
U.S. Appl. No. 16/841,817, filed Apr. 7, 2020, Geo-Location Based Event Gallery.
U.S. Appl. No. 16/911,854, filed Jun. 25, 2020, Prioritization of Messages Within a Message Collection.
"U.S. Appl. No. 15/224,312, Response filed Oct. 1, 2020 to Final Office Action mailed May 1, 2020", 18 pgs.
"U.S. Appl. No. 15/224,343, Notice of Allowance mailed Jul. 29, 2020", 7 pgs.
"U.S. Appl. No. 15/224,355, Response filed Sep. 1, 2020 to Final Office Action mailed May 1, 2020", 16 pgs.
"U.S. Appl. No. 15/224,359, Response filed Sep. 1, 2020 to Final Office Action mailed May 1, 2020", 13 pgs.
"U.S. Appl. No. 15/224,377, Response filed Sep. 8, 2020 to Final Office Action mailed May 5, 2020", 15 pgs.
"U.S. Appl. No. 15/947,350, Examiner Interview Summary mailed Jul. 20, 2020", 4 pgs.
"U.S. Appl. No. 15/947,350, Non Final Office Action malled Sep. 28, 2020", 13 pgs.
"U.S. Appl. No. 15/947,350, Response filed Sep. 4, 2020 to Final Office Action mailed May 4, 2020", 12 pgs.
"U.S. Appl. No. 16/000,657, Examiner Interview Summary mailed Sep. 25, 2020", 3 pgs.
"U.S. Appl. No. 16/000,657, Final Office Action mailed Jul. 27, 2020", 17 pgs.
"U.S. Appl. No. 16/000,657, Response filed Jul. 6, 2020 to Non Final Office Action mailed Mar. 6, 2020", 13 pgs.
"U.S. Appl. No. 16/000,657, Response filed Sep. 28, 2020 to Final Office Action mailed Jul. 27, 2020", 12 pgs.
"U.S. Appl. No. 16/529,461, Examiner Interview Summary mailed Jul. 31, 2020", 3 pgs.
"U.S. Appl. No. 16/529,461, Response filed Jul. 29, 2020 to Non Final Office Action mailed May 21, 2020", 11 pgs.
"U.S. Appl. No. 16/541,919, Notice of Allowance mailed Jun. 30, 2020", 8 pgs.
"U.S. Appl. No. 16/667,814, Non Final Office Action mailed Aug. 17, 2020", 6 pgs.
"U.S. Appl. No. 16/703,526, Corrected Notice of Allowability mailed Sep. 2, 2020", 2 pgs.
"U.S. Appl. No. 16/703,526, Notice of Allowance mailed Jun. 19, 2020", 10 pgs.
"U.S. Appl. No. 16/703,526, Supplemental Notice of Allowability mailed Aug. 10, 2020", 2 pgs.
"U.S. Appl. No. 16/709,092, Corrected Notice of Allowability mailed Jul. 22, 2020", 2 pgs.
"Canadian Application Serial No. 2,962,822, Office Action mailed Jul. 20, 2020", 5 pgs.
"Chinese Application Serial No. 201580065266.7, Response filed Jul. 17, 2020 Office Action mailed Mar. 19, 2020", w/ English Claims, 11 pgs.
"Korean Application Serial No. 10-2017-7012120, Notice of Preliminary Rejection mailed Jun. 17, 2020", w/ English Translation, 8 pgs.

(56) References Cited

OTHER PUBLICATIONS

"Korean Application Serial No. 10-2017-7012120, Response filed Sep. 3, 2020 to Notice of Preliminary Rejection mailed Jun. 17, 2020", w/ English Claims, 22 pgs.
"U.S. Appl. No. 15/224,383, Notice of Allowance mailed Feb. 27, 2020", 7 pgs.
"U.S. Appl. No. 15/224,343, Response filed Mar. 2, 2020 to Non Final Office Action mailed Nov. 12, 2019", 17 pgs.
"U.S. Appl. No. 16/000,657, Non Final Office Action mailed Mar. 6, 2020", 30 pgs.
"Surprise!", [Online] Retrieved from the Internet: URL: https: www.snap.com en-US news post surprise, (Oct. 3, 2013), 1 pg.
"European Application Serial No. 15782165.3, Decision to Refuse a European Patent Application mailed Mar. 19, 2020", 23 pgs.
"Canadian Application Serial No. 3,027,981, Response filed Mar. 31, 2020 to Office Action mailed Dec. 5, 2019", 12 pgs.
"U.S. Appl. No. 15/224,343, Final Office Action mailed Apr. 7, 2020", 16 pgs.
"U.S. Appl. No. 16/709,092, Notice of Allowance mailed Apr. 9, 2020", 9 pgs.
"U.S. Appl. No. 15/224,359, Response filed Apr. 10, 2020 to Non Final Office Action mailed Dec. 10, 2019", 11 pgs.
"U.S. Appl. No. 15/947,350, Response filed Apr. 13, 2020 to Non Final Office Action mailed Dec. 13, 2019", 12 pgs.
"U.S. Appl. No. 16/541,919, Non Final Office Action mailed Apr. 14, 2020", 18 pgs.
"U.S. Appl. No. 15/224,377, Response filed Apr. 15, 2020 to Non Final Office Action mailed Oct. 15, 2019", 13 pgs.
"U.S. Appl. No. 15/224,312, Response filed Apr. 16, 2020 to Non Final Office Action mailed Dec. 16, 2019", 14 pgs.
"U.S. Appl. No. 15/224,372, Response filed Apr. 16, 2020 to Non Final Office Action mailed Oct. 16, 2019", 14 pgs.
"U.S. Appl. No. 16/667,814, Preliminary Amendment filed Apr. 20, 2020", 6 pgs.
"U.S. Appl. No. 15/224,355, Response filed Apr. 22, 2020 to Non Final Office Action mailed Jan. 22, 2020", 13 pgs.
"U.S. Appl. No. 15/224,312, Final Office Action mailed May 1, 2020", 18 pgs.
"U.S. Appl. No. 15/224,355, Final Office Action mailed May 1, 2020", 15 pgs.
"U.S. Appl. No. 15/224,359, Final Office Action mailed May 1, 2020", 13 pgs.
"U.S. Appl. No. 15/947,350, Final Office Action mailed May 4, 2020", 12 pgs.
"U.S. Appl. No. 15/224,372, Final Office Action mailed May 4, 2020", 15 pgs.
"U.S. Appl. No. 15/224,377, Final Office Action mailed May 5, 2020", 15 pgs.
"Chinese Application Serial No. 201580065266.7, Office Action mailed Mar. 19, 2020", w English translation, 15 pgs.
"U.S. Appl. No. 16/529,461, Non Final Office Action mailed May 21, 2020", 19 pgs.
"U.S. Appl. No. 16/709,092, Corrected Notice of Allowability mailed Jun. 1, 2020", 2 pgs.
"U.S. Appl. No. 15/224,343, Response filed Jun. 3, 2020 to Final Office Action mailed Apr. 7, 2020", 12 pgs.
"U.S. Appl. No. 16/000,657, Examiner Interview Summary mailed Jun. 12, 2020", 4 pgs.
"U.S. Appl. No. 16/541,919, Response filed Jun. 12, 2020 to Non Final Office Action mailed Apr. 14, 2020", 8 pgs.
Buscemi, Scott, "Snapchat introduces 'Stories', a narrative built with snaps", [Online] Retrieved from the Internet: URL: https: 9to5mac.com 2013 10 03 snapchat-introduces-stories-a-narrative-built-with-snaps , (Oct. 3, 2013), 2 pgs.
Etherington, Darrell, "Snapchat Gets Its Own Timeline With Snapchat Stories, 24-Hour Photo and Video Tales", [Online] Retrieved from the Internet: URL: https: techcrunch.com 2013 10 03 snapchat-gets-its-own-timeline-with-snapchat-stories-24-hour-photo-video-tales , (Oct. 3, 2013), 2 pgs.
Hamburger, Ellis, "Snapchat's next big thing: 'Stories' that don't just disappear", [Online] Retrieved from the Internet: URL: https: www.theverge.com 2013 10 3 4791934 snapchats-next-big-thing-stories-that-dont-just-disappear, (Oct. 3, 2013), 5 pgs.
Rossignol, Joe, "How to screenshot Snapchat without sending notification", [Online] Retrieved from the Internet: URL: https: www.idownloadblog.com author joerossignol , (May 3, 2014), 16 pgs.
"A Whole New Story", Snap, Inc., [Online] Retrieved from the Internet: <URL: https://www.snap.com/en-US/news/>, (2017), 13 pgs.
"Adding photos to your listing", eBay, [Online] Retrieved from the Internet: <URL; http://pages.ebay.com/help/sell/pictures.html>, (accessed May 24, 2017), 4 pgs.
"U.S. Appl. No. 14/494,226, Examiner Interview Summary mailed Oct. 27, 2016", 3 pgs.
"U.S. Appl. No. 14/494,226, Final Office Action mailed Mar. 7, 2017", 34 pgs.
"U.S. Appl. No. 14/494,226, Non Final Office Action mailed Sep. 12, 2016", 32 pgs.
"U.S. Appl. No. 14/494,226, Response filed Jul. 7, 2017 to Final Office Action mailed Mar. 7, 2017", 13 pgs.
"U.S. Appl. No. 14/494,226, Response filed Dec. 12, 2016 to Non Final Office Action mailed Sep. 12, 2016", 16 pgs.
"U.S. Appl. No. 14/510,016, Advisory Action mailed Nov. 30, 2017", 7 pgs.
"U.S. Appl. No. 14/510,016, Final Office Action mailed May 22, 2018", 36 pgs.
"U.S. Appl. No. 14/510,016, Final Office Action mailed Sep. 7, 2018", 34 pgs.
"U.S. Appl. No. 14/510,016, Final Office Action mailed Sep. 8, 2017", 21 pgs.
"U.S. Appl. No. 14/510,016, Non Final Office Action mailed Feb. 7, 2018", 36 pgs.
"U.S. Appl. No. 14/510,016, Non Final Office Action mailed Apr. 21, 2017", 55 pgs.
"U.S. Appl. No. 14/510,016, Response filed Jan. 8, 2017 to Final Office Action mailed Sep. 8, 2017", 22 pgs.
"U.S. Appl. No. 14/510,016, Response Filed May 7, 2018 to Non Final Office Action mailed Feb. 7, 2018", 13 pgs.
"U.S. Appl. No. 14/510,016, Response Filed Jul. 21, 2017 to Non Final Office Action mailed Apr. 21, 2017", 21 pgs.
"U.S. Appl. No. 14/510,016, Response filed Aug. 23, 2018 to Final Office Action mailed May 22, 2018", 16 pgs.
"U.S. Appl. No. 14/510,016, Response filed Nov. 8, 2017 to Final Office Action mailed Sep. 8, 2017", 24 pgs.
"U.S. Appl. No. 14/529,064, Final Office Action mailed Aug. 24, 2016", 23 pgs.
"U.S. Appl. No. 14/529,064, Non Final Office Action mailed Apr. 6, 2017", 25 pgs.
"U.S. Appl. No. 14/529,064, Response filed Jul. 18, 2016 to Non Final Office Action mailed Apr. 18, 2016", 20 pgs.
"U.S. Appl. No. 14/539,391, Notice of Allowance mailed Mar. 5, 2015", 17 pgs.
"U.S. Appl. No. 14/548,590, Advisory Action mailed Nov. 18, 2016", 3 pgs.
"U.S. Appl. No. 14/548,590, Final Office Action mailed Jul. 5, 2016", 16 pgs.
"U.S. Appl. No. 14/548,590, Final Office Action mailed Sep. 16, 2015", 15 pgs.
"U.S. Appl. No. 14/548,590, Non Final Office Action mailed Jan. 9, 2017", 14 pgs.
"U.S. Appl. No. 14/548,590, Non Final Office Action mailed Feb. 11, 2016", 16 pgs.
"U.S. Appl. No. 14/548,590, Non Final Office Action mailed Apr. 20, 2015", 14 pgs.
"U.S. Appl. No. 14/548,590, Response filed May 10, 2016 to Non Final Office Action mailed Feb. 11, 2016", 14 pgs.
"U.S. Appl. No. 14/548,590, Response filed Nov. 7, 2016 to Final Office Action mailed Jul. 5, 2016", 14 pgs.
"U.S. Appl. No. 14/548,590, Response filed Dec. 16, 2015 to Final Office Action mailed Sep. 16, 2015", 13 pgs.

(56) References Cited

OTHER PUBLICATIONS

"U.S. Appl. No. 14/548,590, Response filed Jun. 16, 2015 to Non Final Office Action mailed Apr. 20, 2015", 19 pgs.
"U.S. Appl. No. 14/682,259, Notice of Allowance mailed Jul. 27, 2015", 17 pgs.
"U.S. Appl. No. 14/704,212, Final Office Action mailed Jun. 17, 2016", 12 pgs.
"U.S. Appl. No. 14/704,212, Non Final Office Action mailed Jun. 16, 2017", 13 pgs.
"U.S. Appl. No. 14/704,212, Non Final Office Action malled Nov. 25, 2016", 13 pgs.
"U.S. Appl. No. 14/704,212, Response filed Feb. 27, 2017 to Non Final Office Action mailed Nov. 25, 2016", 14 pgs.
"U.S. Appl. No. 14/704,212, Response filed Oct. 17, 2016 to Final Office Action mailed Jun. 17, 2016", 12 pgs.
"U.S. Appl. No. 14/841,987, Notice of Allowance mailed Mar. 29, 2017", 17 pgs.
"U.S. Appl. No. 14/974,321, Non Final Office Action mailed Jun. 29, 2017", 36 pgs.
"U.S. Appl. No. 15/224,312, Appeal Brief filed Feb. 14, 2022", 23 pgs.
"U.S. Appl. No. 15/224,312, Appeal Decision mailed Apr. 5, 2023", 21 pgs.
"U.S. Appl. No. 15/224,312, Examiner's Answer to Appeal Brief mailed May 27, 2022", 12 pgs.
"U.S. Appl. No. 15/224,312, Final Office Action malled May 12, 2021", 21 pgs.
"U.S. Appl. No. 15/224,312, Non Final Office Action mailed Nov. 9, 2020", 18 pgs.
"U.S. Appl. No. 15/224,312, Response filed Apr. 9, 2021 to Non Final Office Action mailed Nov. 9, 2020", 17 pgs.
"U.S. Appl. No. 15/224,343, Notice of Allowance mailed Nov. 16, 2020", 7 pgs.
"U.S. Appl. No. 15/224,355, 312 Amendment filed Sep. 15, 2022", 8 pgs.
"U.S. Appl. No. 15/224,355, Corrected Notice of Allowability mailed Feb. 9, 2022", 3 pgs.
"U.S. Appl. No. 15/224,355, Corrected Notice of Allowability mailed Nov. 18, 2021", 3 pgs.
"U.S. Appl. No. 15/224,355, Corrected Notice of Allowance mailed Jun. 27, 2022", 3 pgs.
"U.S. Appl. No. 15/224,355, Notice of Allowability mailed Jul. 21, 2021", 13 pgs.
"U.S. Appl. No. 15/224,355, Notice of Allowance mailed Jun. 15, 2022", 9 pgs.
"U.S. Appl. No. 15/224,355, Notice of Allowance mailed Jul. 13, 2021", 16 pgs.
"U.S. Appl. No. 15/224,355, Notice of Allowance mailed Nov. 3, 2021", 10 pgs.
"U.S. Appl. No. 15/224,355, PTO Response to Rule 312 Communication mailed Oct. 28, 2022", 2 pgs.
"U.S. Appl. No. 15/224,359, Notice of Allowance mailed Nov. 3, 2020", 15 pgs.
"U.S. Appl. No. 15/224,372, Notice of Allowance mailed Jan. 12, 2021", 8 pgs.
"U.S. Appl. No. 15/224,372, Response filed Oct. 5, 2020 to Final Office Action mailed May 4, 2020", 17 pgs.
"U.S. Appl. No. 15/224,377, 312 Amendment filed Jan. 7, 2022", 8pgs.
"U.S. Appl. No. 15/224,377, Corrected Notice of Allowability mailed Jan. 18, 2022", 2 pgs.
"U.S. Appl. No. 15/224,377, Corrected Notice of Allowability mailed Apr. 14, 2022", 2 pgs.
"U.S. Appl. No. 15/224,377, Corrected Notice of Allowability mailed May 17, 2022", 2 pgs.
"U.S. Appl. No. 15/224,377, Corrected Notice of Allowability mailed Oct. 26, 2021", 2 pgs.
"U.S. Appl. No. 15/224,377, Final Office Action mailed Apr. 14, 2021", 14 pgs.
"U.S. Appl. No. 15/224,377, Non Final Office Action mailed Oct. 30, 2020", 15 pgs.
"U.S. Appl. No. 15/224,377, Notice of Allowance mailed Mar. 30, 2022", 8 pgs.
"U.S. Appl. No. 15/224,377, Notice of Allowance mailed Oct. 13, 2021", 14 pgs.
"U.S. Appl. No. 15/224,377, PTO Response to Rule 312 Communication mailed Jan. 18, 2022", 1 pg.
"U.S. Appl. No. 15/224,377, Response filed Mar. 30, 2021 to Non Final Office Action mailed Oct. 30, 2020", 14 pgs.
"U.S. Appl. No. 15/224,377, Response filed Sep. 14, 2021 to Final Office Action mailed Apr. 14, 2021", 13 pgs.
"U.S. Appl. No. 15/947,350, Appeal Brief filed Dec. 8, 2021", 23 pgs.
"U.S. Appl. No. 15/947,350, Appeal Decision mailed Apr. 5, 2023", 13 pgs.
"U.S. Appl. No. 15/947,350, Examiner's Answer mailed Feb. 4, 2022", 8 pgs.
"U.S. Appl. No. 15/947,350, Examiner's Answer mailed Feb. 8, 2022", 8 pgs.
"U.S. Appl. No. 15/947,350, Final Office Action mailed Apr. 8, 2021", 13 pgs.
"U.S. Appl. No. 15/947,350, Response filed Mar. 1, 2021 to Non Final Office Action mailed Sep. 28, 2020", 12 pgs.
"U.S. Appl. No. 16/000,657, 312 Amendment filed Apr. 30, 2021", 8pgs.
"U.S. Appl. No. 16/000,657, Advisory Action mailed Oct. 19, 2020", 3pgs.
"U.S. Appl. No. 16/000,657, Notice of Allowance mailed Feb. 4, 2021", 8 pgs.
"U.S. Appl. No. 16/000,657, PTO Response to Rule 312 Communication mailed May 11, 2021", 3 pgs.
"U.S. Appl. No. 16/212,313, Examiner Interview Summary mailed Jun. 1, 2022", 2 pgs.
"U.S. Appl. No. 16/212,313, Final Office Action mailed Feb. 10, 2022", 22 pgs.
"U.S. Appl. No. 16/212,313, Final Office Action mailed May 27, 2021", 19 pgs.
"U.S. Appl. No. 16/212,313, Final Office Action mailed Jun. 22, 2020", 20 pgs.
"U.S. Appl. No. 16/212,313, Final Office Action mailed Sep. 3, 2021", 22 pgs.
"U.S. Appl. No. 16/212,313, Final Office Action mailed Nov. 2, 2022", 6 pgs.
"U.S. Appl. No. 16/212,313, Non Final Office Action mailed Feb. 4, 2020", 20 pgs.
"U.S. Appl. No. 16/212,313, Non Final Office Action mailed Apr. 10, 2023", 23 pgs.
"U.S. Appl. No. 16/212,313, Non Final Office Action mailed Jun. 9, 2022", 22 pgs.
"U.S. Appl. No. 16/212,313, Non Final Office Action mailed Aug. 30, 2019", 18 pgs.
"U.S. Appl. No. 16/212,313, Non Final Office Action mailed Dec. 8, 2020", 18 pgs.
"U.S. Appl. No. 16/212,313, Preliminary Amendment filed Dec. 12, 2018", 6 pgs.
"U.S. Appl. No. 16/212,313, Response filed Feb. 3, 2022 to Final Office Action mailed Sep. 3, 2021", 14 pgs.
"U.S. Appl. No. 16/212,313, Response filed Apr. 3, 2023 to Final Office Action mailed Nov. 2, 2022", 12 pgs.
"U.S. Appl. No. 16/212,313, Response filed May 4, 2020 to Non Final Office Action mailed Feb. 4, 2020", 12 pgs.
"U.S. Appl. No. 16/212,313, Response filed May 10, 2021 to Non Final Office Action mailed Dec. 8, 2020", 9 pgs.
"U.S. Appl. No. 16/212,313, Response filed May 31, 2022 to Final Office Action mailed Feb. 10, 2022", 11 pgs.
"U.S. Appl. No. 16/212,313, Response filed Aug. 27, 2021 to Final Office Action mailed May 27, 2021", 13 pgs.
"U.S. Appl. No. 16/212,313, Response filed Oct. 11, 2022 to Non Final Office Action mailed Jun. 9, 2022", 10 pgs.
"U.S. Appl. No. 16/212,313, Response filed Dec. 2, 2019 to Non Final Office Action mailed Aug. 30, 2019", 11 pgs.

(56) References Cited

OTHER PUBLICATIONS

"U.S. Appl. No. 16/529,461, Advisory Action mailed Jan. 8, 2021", 4 pgs.
"U.S. Appl. No. 16/529,461, Final Office Action mailed Oct. 20, 2020", 24 pgs.
"U.S. Appl. No. 16/529,461, Non Final Office Action mailed Feb. 22, 2021", 27 pgs.
"U.S. Appl. No. 16/529,461, Notice of Allowance mailed Jun. 23, 2021", 9 pgs.
"U.S. Appl. No. 16/529,461, Notice of Allowance mailed Oct. 1, 2021", 8 pgs.
"U.S. Appl. No. 16/529,461, Response filled Apr. 29, 2021 to Non Final Office Action mailed Feb. 22, 2021", 12 pgs.
"U.S. Appl. No. 16/529,461, Response filed Dec. 18, 2020 to Final Office Action mailed Oct. 20, 2020", 10 pgs.
"U.S. Appl. No. 16/541,919, Notice of Allowance mailed Oct. 15, 2020", 8 pgs.
"U.S. Appl. No. 16/662,956, Final Office Action mailed Mar. 29, 2021", 17 pgs.
"U.S. Appl. No. 16/662,956, Final Office Action mailed Oct. 27, 2021", 15 pgs.
"U.S. Appl. No. 16/662,956, Non Final Office Action mailed Jul. 21, 2021", 12 pgs.
"U.S. Appl. No. 16/662,956, Non Final Office Action mailed Oct. 6, 2020", 13 pgs.
"U.S. Appl. No. 16/662,956, Notice of Allowance mailed Feb. 25, 2022", 12 pgs.
"U.S. Appl. No. 16/662,956, Response filed Jan. 25, 2022 to Final Office Action mailed Oct. 27, 2021", 12 pgs.
"U.S. Appl. No. 16/662,956, Response filed Jun. 24, 2021 to Final Office Action malled Mar. 29, 2021", 10 pgs.
"U.S. Appl. No. 16/662,956, Response filed Oct. 5, 2021 to Non Final Office Action mailed Jul. 21, 2021", 10 pgs.
"U.S. Appl. No. 16/662,956, Response filed Dec. 2, 2020 to Non Final Office Action mailed Oct. 6, 2020", 11 pgs.
"U.S. Appl. No. 16/662,956, Supplemental Notice of Allowability mailed May 31, 2022", 5 pgs.
"U.S. Appl. No. 16/667,814, Corrected Notice of Allowability mailed Mar. 2, 2021", 2 pgs.
"U.S. Appl. No. 16/667,814, Corrected Notice of Allowability mailed Dec. 23, 2020", 2 pgs.
"U.S. Appl. No. 16/667,814, Notice of Allowance mailed Nov. 23, 2020", 8 pgs.
"U.S. Appl. No. 16/667,814, Response filed Oct. 29, 2020 to Non Final Office Action mailed Aug. 17, 2020", 7 pgs.
"U.S. Appl. No. 16/841,817, Corrected Notice of Allowability mailed Mar. 23, 2022", 2 pgs.
"U.S. Appl. No. 16/841,817, Corrected Notice of Allowability mailed Sep. 16, 2021", 2 pgs.
"U.S. Appl. No. 16/841,817, Corrected Notice of Allowability mailed Dec. 30, 2021", 2 pgs.
"U.S. Appl. No. 16/841,817, Non Final Office Action mailed May 26, 2021", 7 pgs.
"U.S. Appl. No. 16/841,817, Notice of Allowance mailed Sep. 3, 2021", 7 pgs.
"U.S. Appl. No. 16/841,817, Notice of Allowance mailed Dec. 16, 2021", 8 pgs.
"U.S. Appl. No. 16/841,817, Response filed Aug. 26, 2021 to Non Final Office Action mailed May 26, 2021", 6 pgs.
"U.S. Appl. No. 16/911,854, Corrected Notice of Allowability mailed Sep. 16, 2021", 2 pgs.
"U.S. Appl. No. 16/911,854, Corrected Notice of Allowability mailed Oct. 6, 2021", 2 pgs.
"U.S. Appl. No. 16/911,854, Non Final Office Action mailed Mar. 3, 2021", 12 pgs.
"U.S. Appl. No. 16/911,854, Notice of Allowance mailed Jun. 17, 2021", 8 pgs.
"U.S. Appl. No. 16/911,854, Response filed May 28, 2021 to Non Final Office Action mailed Mar. 3, 2021", 8 pgs.
"U.S. Appl. No. 16/933,205, Final Office Action mailed Jan. 18, 2023", 21 pgs.
"U.S. Appl. No. 16/933,205, Final Office Action mailed Nov. 29, 2021", 21 pgs.
"U.S. Appl. No. 16/933,205, Non Final Office Action mailed Apr. 16, 2021", 39 pgs.
"U.S. Appl. No. 16/933,205, Non Final Office Action mailed May 25, 2023", 20 pgs.
"U.S. Appl. No. 16/933,205, Response filed Feb. 23, 2023 to Final Office Action mailed Jan. 18, 2023", 13 pgs.
"U.S. Appl. No. 16/933,205, Response filed Apr. 5, 2022 to Final Office Action mailed Nov. 29, 2021", 13 pgs.
"U.S. Appl. No. 16/933,205, Response filed Oct. 18, 2021 to Non Final Office Action mailed Apr. 16, 2021", 13 pgs.
"U.S. Appl. No. 16/933,279, Non Final Office Action mailed Mar. 25, 2021", 41 pgs.
"U.S. Appl. No. 16/933,279, Response filed Aug. 25, 2021 to Non Final Office Action mailed Mar. 25, 2021", 14 pgs.
"U.S. Appl. No. 16/933,366, Decision on Pre-Appeal Brief Request mailed Apr. 14, 2023", 2 pgs.
"U.S. Appl. No. 16/933,366, Final Office Action mailed Oct. 21, 2021", 18 pgs.
"U.S. Appl. No. 16/933,366, Final Office Action mailed Dec. 29, 2022", 21 pgs.
"U.S. Appl. No. 16/933,366, Non Final Office Action mailed Apr. 27, 2021", 39 pgs.
"U.S. Appl. No. 16/933,366, Non Final Office Action mailed May 18, 2023", 21 pgs.
"U.S. Appl. No. 16/933,366, Non Final Office Action mailed Jul. 25, 2022", 19 pgs.
"U.S. Appl. No. 16/933,366, Pre-Appeal Brief Request filed Mar. 29, 2023", 4 pgs.
"U.S. Appl. No. 16/933,366, Response filed Mar. 18, 2022 to Final Office Action mailed Oct. 21, 2021", 12 pgs.
"U.S. Appl. No. 16/933,366, Response filed Aug. 27, 2021 to Non Final Office Action mailed Apr. 27, 2021", 16 pgs.
"U.S. Appl. No. 16/933,366, Response filed Nov. 23, 2022 to Non Final Office Action mailed Jul. 25, 2022", 12 pgs.
"U.S. Appl. No. 17/023,175, Non Final Office Action mailed Jun. 8, 2021", 8 pgs.
"U.S. Appl. No. 17/023,175, Notice of Allowance mailed Oct. 5, 2021", 7 pgs.
"U.S. Appl. No. 17/023,175, Response filed Sep. 8, 2021 to Non Final Office Action mailed Jun. 8, 2021", 6 pgs.
"U.S. Appl. No. 17/023,175, Supplemental Notice of Allowability mailed Jan. 20, 2022", 2 pgs.
"U.S. Appl. No. 17/035,575, Corrected Notice of Allowability mailed Mar. 8, 2023", 4 pgs.
"U.S. Appl. No. 17/035,575, Non Final Office Action mailed May 26, 2022", 31 pgs.
"U.S. Appl. No. 17/035,575, Notice of Allowance mailed Oct. 17, 2022", 8 pgs.
"U.S. Appl. No. 17/035,575, Response filed Aug. 25, 2022 to Non Final Office Action mailed May 26, 2022", 12 pgs.
"U.S. Appl. No. 17/234,012, Final Office Action mailed May 24, 2023", 13 pgs.
"U.S. Appl. No. 17/234,012, Non Final Office Action mailed Feb. 8, 2023", 15 pgs.
"U.S. Appl. No. 17/234,012, Preliminary Amendment filed Sep. 28, 2022", 6 pgs.
"U.S. Appl. No. 17/234,012, Response filed May 8, 2023 to Non Final Office Action mailed Feb. 8, 2023", 8 pgs.
"U.S. Appl. No. 17/323,702, Final Office Action malled Mar. 10, 2023", 17 pgs.
"U.S. Appl. No. 17/323,702, Non Final Office Action malled Sep. 21, 2022", 36 pgs.
"U.S. Appl. No. 17/323,702, Response filed Jan. 23, 2023 to Non Final Office Action mailed Sep. 21, 2022", 14 pgs.
"U.S. Appl. No. 17/567,397, Non Final Office Action mailed Jan. 30, 2023", 33 pgs.
"U.S. Appl. No. 17/567,397, Non Final Office Action mailed Aug. 22, 2022", 32 pgs.

(56) References Cited

OTHER PUBLICATIONS

"U.S. Appl. No. 17/567,397, Response filed Apr. 27, 2023 to Non Final Office Action mailed Jan. 30, 2023", 10 pgs.
"U.S. Appl. No. 17/567,397, Response filed Nov. 9, 2022 to Non Final Office Action mailed Aug. 22, 2022", 10 pgs.
"U.S. Appl. No. 17/647,511, Final Office Action mailed Dec. 8, 2022", 17 pgs.
"U.S. Appl. No. 17/647,511, Non Final Office Action mailed Sep. 22, 2022", 12 pgs.
"U.S. Appl. No. 17/647,511, Notice of Allowance mailed May 25, 2023", 6 pgs.
"U.S. Appl. No. 17/647,511, Response filed Oct. 28, 2022 to Non Final Office Action mailed Sep. 22, 2022", 8 pgs.
"U.S. Appl. No. 17/647,511, Response filed Dec. 15, 2022 to Final Office Action mailed Dec. 8, 2022", 12 pgs.
"U.S. Appl. No. 17/663,739, Non Final Office Action mailed Feb. 15, 2023", 17 pgs.
"U.S. Appl. No. 17/663,739, Response filed May 5, 2023 to Non Final Office Action mailed Feb. 15, 2023", 9 pgs.
"U.S. Appl. No. 17/683,725, Non Final Office Action mailed Aug. 26, 2022", 19 pgs.
"BlogStomp", StompSoftware, [Online] Retrieved from the Internet: <URL: http://stompsoftware.com/blogstomp>, (accessed May 24, 2017), 12 pgs.
"Canadian Application Serial No. 2,962,822, Examiner's Rule 86(2) Report mailed Dec. 30, 2022", 4 pgs.
"Canadian Application Serial No. 2,962,822, Office Action mailed Feb. 18, 2021", 6 pgs.
"Canadian Application Serial No. 2,962,822, Office Action mailed Jul. 22, 2021", 4 pgs.
"Canadian Application Serial No. 2,962,822, Office Action mailed Dec. 23, 2021", 4 pgs.
"Canadian Application Serial No. 2,962,822, Response filed Jan. 14, 2021 to Office Action mailed Jul. 20, 2020", 3 pgs.
"Canadian Application Serial No. 2,962,822, Response filed Jun. 16, 2021 to Office Action mailed Feb. 18, 2021", 11 pgs.
"Canadian Application Serial No. 2,962,822, Response Filed Apr. 22, 2022 to Office Action mailed Dec. 23, 2021", 6 pgs.
"Canadian Application Serial No. 2,962,822, Voluntary Amendment Filed Oct. 13, 2022", 21 pgs.
"Canadian Application Serial No. 3,027,981, Non-Final Office Action mailed Jan. 28, 2022", 3 pgs.
"Canadian Application Serial No. 3,027,981, Office Action mailed Oct. 2, 2020", 5 pgs.
"Canadian Application Serial No. 3,027,981, Response filed Feb. 2, 2021 to Office Action mailed Oct. 2, 2020", 15 pgs.
"Canadian Application Serial No. 3,027,981, Response filed May 16, 2022 to Office Action mailed Jan. 28, 2022", 18 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (IOS/Android): Give Pictures a Sense of Place", TechPP, [Online] Retrieved from the Internet: <URL: http://techpp.com/2013/02/15/instaplace-app-review>, (2013), 13 pgs.
"European Application Serial No. 15733026.7, Communication Pursuant to Article 94(3) EPC mailed Jul. 28, 2017", 6 pgs.
"European Application Serial No. 15870861.0, Response filed Aug. 9, 2017 to Communication Pursuant to Rules 161(2) and 162 EPC mailed Aug. 4, 2017", 10 pgs.
"European Application Serial No. 15870874.3, Communication Pursuant to Article 94(3) EPC mailed Feb. 22, 2021", 5 pgs.
"InstaPlace Photo App Tell the Whole Story", [Online] Retrieved from the Internet: <URL; youtu.be/uF_gFkg1hBM>. (Nov. 8, 2013), 113 pgs., 1:02 min.
"International Application Serial No. PCT/US2015/035591, International Preliminary Report on Patentability mailed Dec. 22, 2016", 7 pgs.
"International Application Serial No. PCT/US2015/050424, International Search Report mailed Dec. 4, 2015", 2 pgs.
"International Application Serial No. PCT/US2015/050424, Written Opinion mailed Dec. 4, 2015", 10 pgs.
"International Application Serial No. PCT/US2016/066976, International Search Report mailed May 17, 2017", 7 pgs.
"International Application Serial No. PCT/US2016/066976, Invitation to Pay Add'l Fees and Partial Search Rpt mailed Mar. 6, 2017", 8 pgs.
"International Application Serial No. PCT/US2016/066976, Written Opinion mailed May 17, 2017", 7 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Korean Application Serial No. 10-2017-7001104, Response filed Jul. 25, 2017 to Office Action mailed Jun. 26, 2017", w/ Translation of Claims, 20 pgs.
"Korean Application Serial No. 10-2017-7012120, Notice of Preliminary Rejection mailed Dec. 8, 2020", w/ English Translation, 5 pgs.
"Korean Application Serial No. 10-2017-7012120, Response filed Feb. 8, 2021 to Notice of Preliminary Rejection mailed Dec. 8, 2020", w/ English Claims, 18 pgs.
"Korean Application Serial No. 10-2021-7028720, Notice of Preliminary Rejection mailed Jun. 29, 2022", w/ English Translation, 6 pgs.
"Korean Application Serial No. 10-2021-7028720, Notice of Preliminary Rejection mailed Nov. 12, 2021", w/ English Translation, 10 pgs.
"Korean Application Serial No. 10-2021-7028720, Response filed May 10, 2022 to Office Action mailed Nov. 12, 2021", w/ English Translation, 21 pgs.
"Korean Application Serial No. 10-2021-7028720, Response filed Aug. 17, 2022 to Notice of Preliminary Rejection mailed Jun. 29, 2022", w/ English Claims, 18 pgs.
"Korean Office Action Application Serial No. 10-2017-7001104, Office Action mailed Jun. 26. 2017", w/ English Translation, 12 pgs.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Microsoft Computer Dictionary", 5th ed., (2002), 3 pgs.
"Random House Webster's College Dictionary", 2nd Random House Edition, (1999), 3 pgs.
"Starbucks Cup Magic", [Online] Retrieved from the Internet: <URL: https://www.youtube.com/watch?v=RWwQXI9RGOw>, (Nov. 8, 2011), 87 pgs.; 00:47 min.
"Starbucks Cup Magic for Valentine's Day", [Online] Retrieved from the Internet: <URL:https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
"To Err is Human. To Self Destruct Messages, There is iDeiete for iOS", The Apple Google, [Online]. Retrieved from the Internet on Mar. 21, 2018: <http://theapplegoogle.com/2013/04/err-human-destruct-messages-idelete-ios/>, (2013), 2 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011) 10 pgs.
Janthong, Isaranu, "Instaplace ready on Android Google Play store", Android App Review Thailand, [Online] Retrieved from the Internet: <URL: https://www.android-free-app-review.com/2013/01/instaplace-android-google-play-store.html>, (Jan. 23, 2013), 9 pgs.
Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

(56) References Cited

OTHER PUBLICATIONS

Macleod, Duncan, "Starbucks Cup Magic Lets Merry", [Online] Retrieved from the Internet: <URL; https://theinspirationroom.com/daily/2011/starbucks-cup-magic>, (Nov. 12, 2011), 8 pgs.
Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe=.nv58YXpkV>, (Dec. 22, 2013), 13 pgs.
Panzarino, Matthew, "Snapchat Adds Filters, A Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.
"Korean Application Serial No. 10-2022-7042399, Notice of Preliminary Rejection mailed May 23, 2023", w/ English translation, 9 pgs.
"U.S. Appl. No. 18/162,404, Non Final Office Action mailed Jun. 5, 2023", 29 pgs.
"Canadian Application Serial No. 3,158,965, Examiners Rule 86(2) Report mailed Jun. 5, 2023", 6 pgs.
"U.S. Appl. No. 17/663,739, Notice of Allowance mailed Jun. 22, 2023", 7 pgs.
"U.S. Appl. No. 17/567,397, Final Office Action mailed Jul. 3, 2023", 35 pgs.
"U.S. Appl. No. 15/947,350, Notice of Allowance mailed Jul. 7, 2023", 8 pgs.
"Chinese Application Serial No. 202110010215.1, Office Action mailed Apr. 22, 2023", w/ English Translation, 13 pgs.
"U.S. Appl. No. 17/663,739, Supplemental Notice of Allowability mailed Jul. 12, 2023", 4 pgs.
U.S. Appl. No. 17/567,397, filed Jan. 3, 2022, Multichannel System.
U.S. Appl. No. 18/162,404, filed Jan. 31, 2023, Geo-Fence Authorization Provisioning.
U.S. Appl. No. 18/521,752, filed Nov. 28, 2023, Geo-Fence Author Provisioning.
U.S. Appl. No. 13/973,770 U.S. Pat. No. 8,914,752, filed Aug. 22, 2013, Apparatus and Method for Accelerated Display of Ephemeral Messages.
U.S. Appl. No. 14/510,016, filed Oct. 8, 2014, Apparatus and Method for Accelerated Display of Ephemeral Messages.
U.S. Appl. No. 16/212,313, filed Dec. 6, 2018, Apparatus and Method for Accelerated Display of Ephemeral Messages.
U.S. Appl. No. 17/647,511 U.S. Pat. No. 11,783,862, filed Jan. 10, 2022, Routing Messages By Message Parameter.
U.S. Appl. No. 17/663,739 U.S. Pat. No. 11,803,345, filed May 17, 2022, Gallery of Messages From Individuals With a Shared Interest.
U.S. Appl. No. 18/464,013, filed Sep. 8, 2023, Gallery of Messages From Individuals With a Shared Interest.
"U.S. Appl. No. 15/224,312, Corrected Notice of Allowability mailed Sep. 6, 2023", 2 pgs.
"U.S. Appl. No. 15/224,312, Corrected Notice of Allowability mailed Nov. 20, 2023", 2 pgs.
"U.S. Appl. No. 15/224,312, Notice of Allowance mailed Aug. 16, 2023", 8 pgs.
"U.S. Appl. No. 16/212,313, Final Office Action mailed Oct. 4, 2023", 23 pgs.
"U.S. Appl. No. 16/212,313, Response filed Sep. 11, 2023 to Non Final Office Action mailed Apr. 10, 2023", 12 pgs.
"U.S. Appl. No. 16/933,205, Final Office Action mailed Dec. 18, 2023", 21 pgs.
"U.S. Appl. No. 16/933,205, Response filed Oct. 25, 2023 to Non Final Office Action mailed May 25, 2023", 13 pgs.
"U.S. Appl. No. 16/933,279, Final Office Action mailed Jul. 31, 2023", 17 pgs.
"U.S. Appl. No. 16/933,279, Response filed Oct. 26, 2023 to Final Office Action mailed Jul. 31, 2023", 12 pgs.
"U.S. Appl. No. 16/933,366, Final Office Action mailed Oct. 13, 2023", 24 pgs.
"U.S. Appl. No. 16/933,366, Response filed Sep. 18, 2023 to Non Final Office Action mailed May 18, 2023", 15 pgs.
"U.S. Appl. No. 17/234,012, Corrected Notice of Allowability mailed Dec. 21, 2023", 2 pgs.
"U.S. Appl. No. 17/234,012, Non Final Office Action mailed Aug. 24, 2023", 14 pgs.
"U.S. Appl. No. 17/234,012, Notice of Allowance mailed Dec. 13, 2023", 8 pgs.
"U.S. Appl. No. 17/234,012, Response filed Aug. 17, 2023 to Final Office Action mailed May 24, 2023", 8 pgs.
"U.S. Appl. No. 17/234,012, Response filed Nov. 21, 2023 to Non Final Office Action mailed Aug. 24, 2023", 8 pgs.
"U.S. Appl. No. 17/323,702, Non Final Office Action mailed Nov. 27, 2023", 18 pgs.
"U.S. Appl. No. 17/323,702, Response filed Aug. 10, 2023 to Final Office Action mailed Mar. 10, 2023", 13 pgs.
"U.S. Appl. No. 17/567,397, Response filed Aug. 30, 2023 to Final Office Action mailed Jul. 3, 2023", 12 pgs.
"U.S. Appl. No. 17/647,511, Supplemental Notice of Allowability mailed Sep. 7, 2023", 3 pgs.
"U.S. Appl. No. 18/162,404, Notice of Allowance mailed Oct. 2, 2023", 11 pgs.
"U.S. Appl. No. 18/162,404, Response filed Aug. 22, 2023 to Non Final Office Action mailed Jun. 5, 2023", 11 pgs.
"U.S. Appl. No. 18/464,013, Preliminary Amendment filed Sep. 8, 2023", (3 pgs).
"Canadian Application Serial No. 2,962,822, Office Action mailed Jul. 28, 2023", 4 pgs.
"Chinese Application Serial No. 202110010215.1, Response filed Nov. 7, 2023 to Office Action mailed Apr. 22, 2023", w/ English claims, 13 pgs.
"Chinese Application Serial No. 202110010215.1, Voluntary Amendment mailed Jan. 3, 2024", w/ English Claims, 10 pgs.
"Korean Application Serial No. 10-2022-7042399, Response filed Oct. 19, 2023 to Notice of Preliminary Rejection mailed May 23, 2023", w/ English claims, 27 pgs.
"U.S. Appl. No. 14/494,226, Appeal Brief filed Mar. 1, 2019 in response to Final Office Action mailed Jun. 1, 2018", 29 pgs.
"U.S. Appl. No. 14/494,226, Examiner Interview Summary mailed Dec. 20, 2017", 2 pgs.
"U.S. Appl. No. 14/494,226, Final Office Action mailed Jun. 1, 2018", 33 pgs.
"U.S. Appl. No. 14/494,226, Non Final Office Action mailed Sep. 7, 2017", 36 pgs.
"U.S. Appl. No. 14/494,226, Response filed Jan. 8, 2018 to Non Final Office Action mailed Sep. 7, 2017", 15 pgs.
"U.S. Appl. No. 14/529,064, Examiner Interview Summary mailed May 23, 2016", 3 pgs.
"U.S. Appl. No. 14/529,064, Examiner Interview Summary mailed Nov. 17, 2016", 3 pgs.
"U.S. Appl. No. 14/529,064, Final Office Action mailed Jan. 25, 2018", 39 pgs.
"U.S. Appl. No. 14/529,064, Non Final Office Action mailed Jul. 13, 2018", 38 pgs.
"U.S. Appl. No. 14/529,064, Response filed May 25, 2018 to Final Office Action mailed Jan. 25, 2018", 20 pgs.
"U.S. Appl. No. 14/529,064, Response filed Sep. 6, 2017 to Non Final Office Action mailed Apr. 6, 2017", 24 pgs.
"U.S. Appl. No. 14/529,064, Response filed Sep. 6, 2017 to Non Final Office Action mailed Apr. 6, 2017", 19 pgs.
"U.S. Appl. No. 14/529,064, Response filed Dec. 21, 2016 to Final Office Action mailed Aug. 24, 2016", 17 pgs.
"U.S. Appl. No. 14/548,590, Advisory Action mailed Apr. 19, 2018", 2 pgs.
"U.S. Appl. No. 14/548,590, Appeal Brief Filed Apr. 20, 2018", 28 pgs.
"U.S. Appl. No. 14/548,590, Appeal Decision mailed Mar. 26, 2020", 13 pgs.

(56) References Cited

OTHER PUBLICATIONS

"U.S. Appl. No. 14/548,590, Final Office Action mailed Jul. 18, 2017", 20 pgs.
"U.S. Appl. No. 14/548,590, Response filed May 9, 2017 to Non Final Office Action mailed Jan. 9, 2017", 17 pgs.
"U.S. Appl. No. 14/594,410, Non Final Office Action mailed Jan. 4, 2016", 10 pgs.
"U.S. Appl. No. 14/594,410, Notice of Allowance mailed Aug. 2, 2016", 5 pgs.
"U.S. Appl. No. 14/594,410, Notice of Allowance mailed Dec. 15, 2016", 6 pgs.
"U.S. Appl. No. 14/594,410, Response filed Jul. 1, 2016 to Non Final Office Action mailed Jan. 4, 2016", 10 pgs.
"U.S. Appl. No. 14/704,212, Non Final Office Action mailed Mar. 12, 2018", 7 pgs.
"U.S. Appl. No. 14/704,212, Notice of Allowance mailed Jul. 2, 2018", 7 pgs.
"U.S. Appl. No. 14/704,212, Response Filed Jun. 12, 2018 to Non Final Office Action mailed Mar. 12, 2018", 9 pgs.
"U.S. Appl. No. 14/841,987, Notice of Allowance mailed Aug. 7, 2017", 8 pgs.
"U.S. Appl. No. 14/974,321, Corrected Notice of Allowability mailed Feb. 13, 2019", 6 pgs.
"U.S. Appl. No. 14/974,321, Corrected Notice of Allowability mailed Apr. 19, 2019", 6 pgs.
"U.S. Appl. No. 14/974,321, Corrected Notice of Allowability mailed Jun. 12, 2019", 6 pgs.
"U.S. Appl. No. 14/974,321, Examiner Interview Summary mailed Dec. 5, 2017", 3 pgs.
"U.S. Appl. No. 14/974,321, Final Office Action mailed Oct. 26, 2017", 16 pgs.
"U.S. Appl. No. 14/974,321, Non Final Office Action mailed May 31, 2018", 14 pgs.
"U.S. Appl. No. 14/974,321, Notice of Allowance mailed Jan. 3, 2019", 9 pgs.
"U.S. Appl. No. 14/974,321, Response filed Aug. 30, 2018 to Non Final Office Action mailed May 31, 2018", 14 pgs.
"U.S. Appl. No. 14/974,321, Response filed Sep. 27, 2017 to Non Final Office Action mailed Jun. 29, 2017", 13 pgs.
"U.S. Appl. No. 15/424,184, Examiner Interview Summary mailed Jan. 10, 2019", 3 pgs.
"U.S. Appl. No. 15/424,184, Examiner Interview Summary mailed Jul. 30, 2019", 2 pgs.
"U.S. Appl. No. 15/424,184, Final Office Action mailed Jan. 29, 2019", 14 pgs.
"U.S. Appl. No. 15/424,184, Final Office Action mailed Mar. 9, 2020", 19 pgs.
"U.S. Appl. No. 15/424,184, Final Office Action mailed Sep. 9, 2019", 13 pgs.
"U.S. Appl. No. 15/424,184, Non Final Office Action mailed May 21, 2019", 16 pgs.
"U.S. Appl. No. 15/424,184, Non Final Office Action mailed Nov. 30, 2018", 22 pgs.
"U.S. Appl. No. 15/424,184, Non Final Office Action mailed Dec. 2, 2019", 16 pgs.
"U.S. Appl. No. 15/424,184, Response filed Mar. 2, 2020 to Non Final Office Action mailed Dec. 2, 2019", 11 pgs.
"U.S. Appl. No. 15/424,184, Response filed Aug. 21, 2019 to Non Final Office Action mailed May 21, 2019", 12 pgs.
"U.S. Appl. No. 15/424,184, Response filed Sep. 11, 2019 to Final Office Action mailed Sep. 9, 2019", 12 pgs.
"U.S. Appl. No. 15/424,184, Response filed Apr. 29, 2019 to Final Office Action mailed Jan. 29, 2019", 11 pgs.
"U.S. Appl. No. 15/424,184, Response filed Jan. 4, 2019 to Non Final Office Action mailed Nov. 30, 2018", 17 pgsl.
"U.S. Appl. No. 15/470,004, Examiner Interview Summary mailed Sep. 12, 2019", 3 pgs.
"U.S. Appl. No. 15/470,004, Final Office Action mailed May 20, 2019", 9 pgs.
"U.S. Appl. No. 15/470,004, Non Final Office Action mailed Jan. 31, 2019", 9 pgs.
"U.S. Appl. No. 15/470,004, Notice of Allowance mailed Oct. 22, 2019", 10 pgs.
"U.S. Appl. No. 15/470,004, Response filed Apr. 29, 2019 to Non Final Office Action mailed Jan. 31, 2019", 12 pgs.
"U.S. Appl. No. 15/470,004, Response filed Sep. 9, 2019 to Final Office Action mailed May 20, 2019", 13 pgs.
"U.S. Appl. No. 15/470,025, Final Office Action mailed May 20, 2019", 10 pgs.
"U.S. Appl. No. 15/470,025, Non Final Office Action mailed Jan. 30, 2019", 10 pgs.
"U.S. Appl. No. 15/470,025, Notice of Allowance mailed Oct. 22, 2019", 10 pgs.
"U.S. Appl. No. 15/470,025, Response filed Apr. 24, 2019 to Non Final Office Action mailed Jan. 30, 2019", 13 pgs.
"U.S. Appl. No. 15/470,025, Response filed Sep. 12, 2019 to Final Office Action mailed May 20, 2019", 14 pgs.
"U.S. Appl. No. 15/474,821, Advisory Action mailed Dec. 19, 2019", 3 pgs.
"U.S. Appl. No. 15/474,821, Final Office Action mailed Sep. 3, 2019", 19 pgs.
"U.S. Appl. No. 15/474,821, Non Final Office Action mailed Jan. 25, 2019", 17 pgs.
"U.S. Appl. No. 15/474,821, Response filed Apr. 25, 2019 to Non Final Office Action mailed Jan. 25, 2019", 16 pgs.
"U.S. Appl. No. 15/474,821, Response filed on Dec. 2, 2019 to Final Office Action mailed Sep. 3, 2019", 10 pgs.
"U.S. Appl. No. 15/486,111, Corrected Notice of Allowance mailed Sep. 7, 2017", 3 pgs.
"U.S. Appl. No. 15/486,111, Non Final Office Action mailed May 9, 2017", 17 pgs.
"U.S. Appl. No. 15/486,111, Notice of Allowance mailed Aug. 30, 2017", 5 pgs.
"U.S. Appl. No. 15/486,111, Response filed Aug. 9, 2017 to Non Final Office Action mailed May 9, 2017", 11 pgs.
"U.S. Appl. No. 15/673,137, Final Office Action mailed Jan. 27, 2020", 11 pgs.
"U.S. Appl. No. 15/673,137, Final Office Action mailed May 16, 2019", 8 pgs.
"U.S. Appl. No. 15/673,137, Non Final Office Action mailed May 12, 2020", 14 pgs.
"U.S. Appl. No. 15/673,137, Non Final Office Action mailed Aug. 30, 2019", 10 pgs.
"U.S. Appl. No. 15/673,137, Non Final Office Action mailed Oct. 5, 2018", 7 pgs.
"U.S. Appl. No. 15/673,137, Response filed Jan. 31, 2019 to Non Final Office Action mailed Oct. 5, 2018", 10 pgs.
"U.S. Appl. No. 15/673,137, Response filed Apr. 6, 2020 to Final Office Action mailed Jan. 27, 2020", 14 pgs.
"U.S. Appl. No. 15/673,137, Response filed Jul. 8, 2020 to Non Final Office Action mailed May 12, 2020", 15 pgs.
"U.S. Appl. No. 15/673,137, Response filed Oct. 18, 2019 to Non-Final Office Action mailed Aug. 30, 2019", 12 pgs.
"U.S. Appl. No. 15/673,137, Response filed Aug. 1, 2019 to Final Office Action mailed May 16, 2019", 10 pgs.
"U.S. Appl. No. 15/835,100, Non Final Office Action mailed Jan. 23, 2018", 18 pgs.
"U.S. Appl. No. 15/835,100, Notice of Allowance mailed May 22, 2018", 5 pgs.
"U.S. Appl. No. 15/835,100, Response Filed Apr. 23, 2018 to Non Final Office Action mailed Jan. 23, 2018", 11 pgs.
"U.S. Appl. No. 15/837,935, Notice of Allowance malled Nov. 25, 2019", 18 pgs.
"U.S. Appl. No. 15/947,350, Notice of Allowance mailed Jul. 17, 2024", 15 pgs.
"U.S. Appl. No. 16/105,687, Non Final Office Action mailed Sep. 14, 2018", 11 pgs.
"U.S. Appl. No. 16/105,687, Notice of Allowance mailed Feb. 25, 2019", 8 pgs.
"U.S. Appl. No. 16/105,687, Response filed Dec. 14, 2018 to Non Final Office Action mailed Sep. 14, 2018", 12 pgs.

(56) References Cited

OTHER PUBLICATIONS

"U.S. Appl. No. 16/155,782, Final Office Action mailed Jan. 3, 2020", 14 pgs.
"U.S. Appl. No. 16/155,782, Non Final Office Action mailed May 14, 2020", 14 pgs.
"U.S. Appl. No. 16/155,782, Non Final Office Action mailed Jul. 10, 2019", 7 pgs.
"U.S. Appl. No. 16/155,782, Response filed Apr. 3, 2020 to Final Office Action mailed Jan. 3, 2020", 10 pgs.
"U.S. Appl. No. 16/155,782, Response filed Oct. 8, 2019 to Non-Final Office Action mailed Jul. 10, 2019", 10 pgs.
"U.S. Appl. No. 16/212,313, Examiner Interview Summary mailed Oct. 22, 2024".
"U.S. Appl. No. 16/212,313, Final Office Action mailed Sep. 6, 2024", 15 pgs.
"U.S. Appl. No. 16/212,313, Non Final Office Action mailed Mar. 11, 2024", 15 pgs.
"U.S. Appl. No. 16/212,313, Response filed Mar. 4, 2024 to Final Office Action mailed Oct. 4, 2023", 9 pgs.
"U.S. Appl. No. 16/212,313, Response filed Jul. 11, 2024 to Non Final Office Action mailed Mar. 11, 2024", 10 pgs.
"U.S. Appl. No. 16/428,210, Preliminary Amendment filed Aug. 8, 2019", 8 pgs.
"U.S. Appl. No. 16/808,101, Preliminary Amendment filed Mar. 10, 2020", 8 pgs.
"U.S. Appl. No. 16/933,205, 312 Amendment filed Oct. 7, 2024", 15 pgs.
"U.S. Appl. No. 16/933,205, Examiner Interview Summary mailed Apr. 4, 2024", 2 pgs.
"U.S. Appl. No. 16/933,205, Notice of Allowance mailed Jul. 11, 2024", 16 pgs.
"U.S. Appl. No. 16/933,205, Response filed Apr. 18, 2024 to Final Office Action mailed Dec. 18, 2023", 15 pgs.
"U.S. Appl. No. 16/933,279, Final Office Action mailed Nov. 7, 2024", 20 pgs.
"U.S. Appl. No. 16/933,279, Response filed Apr. 23, 2024 to Non Final Office Action mailed Jan. 23, 2024", 15 pgs.
"U.S. Appl. No. 16/933,366, 312 Amendment filed Aug. 15, 2024", 8pgs.
"U.S. Appl. No. 16/933,366, Corrected Notice of Allowability mailed Aug. 23, 2024", 2 pgs.
"U.S. Appl. No. 16/933,366, Corrected Notice of Allowability mailed Aug. 30, 2024", 2 pgs.
"U.S. Appl. No. 16/933,366, Notice of Allowance mailed May 15, 2024", 14 pgs.
"U.S. Appl. No. 16/933,366, PTO Response to Rule 312 Communication mailed Aug. 23, 2024", 1 page.
"U.S. Appl. No. 17/234,012, Corrected Notice of Allowability mailed Mar. 27, 2024", 2 pgs.
"U.S. Appl. No. 17/323,702, Examiner Interview Summary mailed Jun. 11, 2024", 2 pgs.
"U.S. Appl. No. 17/323,702, Final Office Action mailed May 2, 2024", 18 pgs.
"U.S. Appl. No. 17/323,702, Non Final Office Action mailed Nov. 6, 2024", 15 pgs.
"U.S. Appl. No. 17/323,702, Response filed Mar. 27, 2024 to Non Final Office Action mailed Nov. 27, 2023", 14 pgs.
"U.S. Appl. No. 17/323,702, Response filed Sep. 3, 2024 to Final Office Action mailed May 2, 2024", 14 pgs.
"U.S. Appl. No. 17/567,397, Final Office Action mailed May 23, 2024", 38 pgs.
"U.S. Appl. No. 17/567,397, Response filed May 7, 2024 to Non Final Office Action mailed Feb. 9, 2024", 12 pgs.
"U.S. Appl. No. 18/464,013, Final Office Action mailed May 9, 2024", 7 pgs.
"U.S. Appl. No. 18/464,013, Non Final Office Action mailed Mar. 27, 2024", 14 pgs.
"U.S. Appl. No. 18/464,013, Notice of Allowance mailed Jul. 26, 2024", 12 pgs.
"U.S. Appl. No. 18/464,013, Notice of Allowance mailed Nov. 14, 2024", 7 pgs.
"U.S. Appl. No. 18/464,013, Response filed Apr. 29, 2024 to Non Final Office Action mailed Mar. 27, 2024", 9 pgs.
"U.S. Appl. No. 18/464,013, Response filed Jun. 24, 2024 to Final Office Action mailed May 9, 2024", 6 pgs.
"U.S. Appl. No. 18/464,013, Supplemental Notice of Allowability mailed Aug. 16, 2024", 4 pgs.
"U.S. Appl. No. 18/464,013, Supplemental Notice of Allowability mailed Dec. 2, 2024", 2 pgs.
"U.S. Appl. No. 18/521,752, Examiner Interview Summary mailed Sep. 12, 2024", 2 pgs.
"U.S. Appl. No. 18/521,752, Non Final Office Action mailed Jul. 3, 2024", 30 pgs.
"U.S. Appl. No. 18/521,752, Notice of Allowance mailed Oct. 9, 2024", 11 pgs.
"U.S. Appl. No. 18/521,752, Response filed Sep. 10, 2024 to Non Final Office Action mailed Jul. 3, 2024", 10 pgs.
"Canadian Application Serial No. 2,962,822, Examiners Rule 86(2) Report mailed Sep. 18, 2024", 3 pgs.
"Canadian Application Serial No. 2,962,822, Response filed Jun. 14, 2024 to Examiner's Rule 86(2) Report mailed Feb. 14, 2024", 22 pgs.
"Canadian Application Serial No. 2,962,822, Response filed Oct. 9, 2024 to Examiners Rule 86(2) Report mailed Sep. 18, 2024", 24 pgs.
"Chinese Application Serial No. 201580031616.8, Office Action mailed Jul. 2, 2018", w/ English translation, 8 pgs.
"Chinese Application Serial No. 201580031616.8, Office Action mailed Oct. 9, 2017", w/ English Translation, 18 pgs.
"Chinese Application Serial No. 201580031616.8, Response filed Feb. 26, 2018 to Office Action mailed Oct. 9, 2017", w/ English Translation, 8 pgs.
"Chinese Application Serial No. 201580070593.1, Office Action mailed Apr. 8, 2020", w/ English Translation, 11 pgs.
"Chinese Application Serial No. 201580076228.1, Decision of Rejection mailed Jul. 9, 2019", w/ English Translation, 19 pgs.
"Chinese Application Serial No. 201580076228.1, Office Action mailed Feb. 12, 2019", w/ English Translation, 18 pgs.
"Chinese Application Serial No. 201580076228.1, Office Action mailed Jul. 19, 2018", w/ English translation, 19 pgs.
"Chinese Application Serial No. 201580076228.1, Response filed Apr. 11, 2019 to Office Action mailed Feb. 12, 2019", w/ English Claims, 12 pgs.
"Chinese Application Serial No. 201580076228.1, Response filed Oct. 11, 2019 to Decision of Rejection mailed Jul. 9, 2019", w/ English Claims, 13 pgs.
"Chinese Application Serial No. 201580076228.1, Response filed Nov. 26, 2018 to Office Action mailed Jul. 19, 2018", w/ English Claims, 16 pgs.
"Chinese Application Serial No. 201680027177.8, Office Action mailed Oct. 28, 2019", W/English Translation, 15 pgs.
"Chinese Application Serial No. 201680027177.8, Response filed Mar. 5, 2020 to Office Action mailed Oct. 28, 2019", w/ English Claims, 11 pgs.
"Chinese Application Serial No. 201680035076.5, Office Action mailed May 27, 2020", w/ English Translation, 28 pgs.
"Chinese Application Serial No. 201680035076.5, Office Action mailed Sep. 4, 2019", w/ English Translation, 16 pgs.
"Chinese Application Serial No. 201680035076.5, Response filed Jul. 9, 2020 to Office Action mailed May 27, 2020", w/ English Claims, 18 pgs.
"Chinese Application Serial No. 201680035076.5, Response filed Dec. 26, 2019 to Office Action mailed Sep. 4, 2019", w/ English Claims, 15 pgs.
"Connecting to Your Customers in the Triangle and Beyond", Newsobserver.com, (2013), 16 pgs.
"Demystifying Location Data Accuracy", Mobile Marketing Association, (Nov. 2015), 18 pgs.
"European Application Serial No. 15733026.7, Decision to Refuse a European Patent Application mailed Nov. 18, 2019", 20 pgs.

(56) References Cited

OTHER PUBLICATIONS

"European Application Serial No. 15733026.7, Response filed Jan. 30, 2018 to Communication Pursuant to Article 94(3) EPC mailed Jul. 28, 2017", w/ Amended Claims, 37 pgs.
"European Application Serial No. 15733026.7, Response filed Aug. 9, 2019 to Summons to Attend Oral Proceedings mailed Jan. 10, 2019", w/ English Claims, 19 pgs.
"European Application Serial No. 15733026.7, Summons to Attend Oral Proceedings mailed Jan. 10, 2019", 7 pgs.
"European Application Serial No. 15787854.7, Communication Pursuant to Article 94(3) EPC mailed Feb. 12, 2020", 7 pgs.
"European Application Serial No. 15787854.7, Response filed Dec. 11, 2017 to Communication Pursuant to Rules 161(1) and 162 EPC mailed Jun. 1, 2017", 16 pgs.
"European Application Serial No. 15870861.0, Communication Pursuant to Article 94(3) EPC mailed Jul. 12, 2018", 5 pgs.
"European Application Serial No. 15870861.0, Extended European Search Report mailed Jul. 3, 2018", 4 pgs.
"European Application Serial No. 15870861.0, Response filed May 31, 2019 to Summons to Attend Oral Proceedings mailed Dec. 21, 2018", w/ English Claims, 23 pgs.
"European Application Serial No. 15870861.0, Response filed Nov. 14, 2018 to Communication Pursuant to Article 94(3) EPC mailed Jul. 12, 2018", w/ English Claims, 27 pgs.
"European Application Serial No. 15870861.0, Summons to Attend Oral Proceedings mailed Dec. 21, 2018", 5 pgs.
"European Application Serial No. 16716090.2, Communication Pursuant to Article 94(3) EPC mailed Jan. 15, 2020", 6 pgs.
"European Application Serial No. 16716090.2, Response filed Apr. 15, 2020 to Communication Pursuant to Article 94(3) EPC mailed Jan. 15, 2020", 10 pgs.
"European Application Serial No. 16716090.2, Response filed May 21, 2018 to Communication pursuant to Rules 161(1) and 162 EPC mailed Nov. 10, 2017", w/ English Claims, 89 pgs.
"European Application Serial No. 16829020.3, Response filed Jan. 29, 2019 to Communication Pursuant to Rules 161(1) and 162 EPC mailed Jul. 25, 2018", w/ English Claims, 17 pgs.
"European Application Serial No. 18747246.9, Extended European Search Report mailed Nov. 7, 2019", 7 pgs.
"Geofencing and the event industry", Goodbarber Blog, [Online] Retrieved from the internet by the examiner on May 16, 2019: <URL: https://www.goodbarber.com/blog/geofencing-and-the-event-industry-a699/>, (Nov. 9, 2015), 7 pgs.
"IAB Platform Status Report: A Mobile Advertising Review", Interactive Advertising Bureau, (Jul. 2008), 24 pgs.
"International Application Serial No. PCT/US2016/066976, International Preliminary Report on Patentability mailed Jun. 28, 2018", 9 pgs.
"International Application Serial No. PCT/US2018/016723, International Preliminary Report on Patentability mailed Aug. 15, 2019", 19 pgs.
"International Application Serial No. PCT/US2018/016723, International Search Report mailed Apr. 5, 2018", 2 pgs.
"International Application Serial No. PCT/US2018/016723, Written Opinion mailed Apr. 5, 2018", 17 pgs.
"International Application Serial No. PCT/US2018/024093, International Preliminary Report on Patentability mailed Oct. 10, 2019", 7 pgs.
"International Application Serial No. PCT/US2018/024093, International Search Report mailed Jul. 19, 2018", 2 pgs.
"International Application Serial No. PCT/US2018/024093, Written Opinion mailed Jul. 19, 2018", 5 pgs.
"Korean Application Serial No. 10-2017-7014135, Final Office Action mailed Feb. 28, 2019", w/ English Translation, 7 pgs.
"Korean Application Serial No. 10-2017-7014135, Notice of Preliminary Rejection mailed Apr. 19, 2019", w/ English Translation, 14 pgs.
"Korean Application Serial No. 10-2017-7014135, Notice of Preliminary Rejection mailed Jul. 20, 2018", w/ English Translation, 13 pgs.
"Korean Application Serial No. 10-2017-7014135, Response filed Mar. 29, 2019 to Final Office Action mailed Feb. 28, 2019", w/ English Claims, 14 pgs.
"Korean Application Serial No. 10-2017-7014135, Response filed Jun. 19, 2019 to Notice of Preliminary Rejection mailed Apr. 19, 2019", w/ English Claims, 16 pgs.
"Korean Application Serial No. 10-2017-7014135, Response filed Sep. 17, 2018 to Notice of Preliminary Rejection mailed Jul. 20, 2018", w/ English Claims, 16 pgs.
"Korean Application Serial No. 10-2017-7020217, Final Office Action mailed Jan. 31, 2018", w/ English Translation, 10 pgs.
"Korean Application Serial No. 10-2017-7020217, Office Action mailed Sep. 15, 2017", w/ English Translation, 11 pgs.
"Korean Application Serial No. 10-2017-7020217, Response filed Feb. 23, 2018 to Final Office Action mailed Jan. 31, 2018", w/ English Translation, 13 pgs.
"Korean Application Serial No. 10-2017-7020217, Response filed Nov. 2, 2017 to Office Action mailed Sep. 15, 2017", w/ English Translation, 17 pgs.
"Korean Application Serial No. 10-2017-7029861, Notice of Preliminary Rejection mailed Jan. 17, 2019", w/ English Translation, 9 pgs.
"Korean Application Serial No. 10-2017-7029861, Response filed Mar. 15, 2019 to Notice of Preliminary Rejection mailed Jan. 17, 2019", w/ English Claims, 20 pgs.
"Korean Application Serial No. 10-2017-7035789, Notice of Preliminary Rejection mailed Nov. 12, 2018", w/ English Translation, 12 pgs.
"Korean Application Serial No. 10-2017-7035789, Response filed Jan. 10, 2019 to Notice of Preliminary Rejection mailed Nov. 12, 2018", w/ English Claims, 23 pgs.
"Korean Application Serial No. 10-2018-7002127, Notice of Preliminary Rejection mailed Apr. 10, 2018", w/ English Translation, 4 pgs.
"Korean Application Serial No. 10-2018-7002127, Response filed May 16, 2018 to Notice of Preliminary Rejection mailed Apr. 10, 2018", w/ English Claims, 14 pgs.
"Korean Application Serial No. 10-2018-7016881, Notice of Preliminary Rejection mailed Oct. 19, 2018", w/ English translation, 9 pgs.
"Korean Application Serial No. 10-2018-7016881, Response filed Nov. 30, 2018 to Notice of Preliminary Rejection mailed Oct. 19, 2018", w/ English Claims, 27 pgs.
"Korean Application Serial No. 10-2018-7037070, Notice of Final Rejection mailed Sep. 30, 2019", w/ English Translation, 5 pgs.
"Korean Application Serial No. 10-2018-7037070, Notice of Final Rejection mailed Nov. 25, 2019", w/ English Translation, 5 pgs.
"Korean Application Serial No. 10-2018-7037070, Notice of Preliminary Rejection mailed Mar. 20, 2019", w/ English Translation, 10 pgs.
"Korean Application Serial No. 10-2018-7037070, Response filed Oct. 23, 2019 to Notice of Final Rejection mailed Sep. 30, 2019", w/ English Claims, 16 pgs.
"Korean Application Serial No. 10-2018-7037070, Response filed May 14, 2019 to Notice of Preliminary Rejection mailed Mar. 20, 2019", w/ English Translation, 10 pgs.
"Korean Application Serial No. 10-2019-7030235, Final Office Action mailed May 20, 2020", w/ English Translation, 5 pgs.
"Korean Application Serial No. 10-2019-7030235, Notice of Preliminary Rejection mailed Nov. 28, 2019", w/ English Translation, 10 pgs.
"Korean Application Serial No. 10-2019-7030235, Response filed Jan. 28, 2020 to Notice of Preliminary Rejection mailed Nov. 28, 2019", w/ English Claims, 12 pgs.
"Korean Application Serial No. 10-2019-7030235, Response filed Jun. 22, 2020 to Final Office Action mailed May 20, 2020", w/ English Claims, 16 pgs.
"Korean Application Serial No. 10-2019-7036962, Notice of Preliminary Rejection mailed Jan. 3, 2020", w/ English Translation, 11 pgs.
"Korean Application Serial No. 10-2019-7036962, Response filed Feb. 17, 2020 to Notice of Preliminary Rejection mailed Jan. 3, 2020", w/ English Claims, 25 pgs.

(56) References Cited

OTHER PUBLICATIONS

"Korean Application Serial No. 10-2019-7038483, Notice of Preliminary Rejection mailed Jan. 31, 2020", w/ English translation, 4 pgs.
"Korean Application Serial No. 10-2019-7038483, Response filed Mar. 10, 2020 to Notice of Preliminary Rejection mailed Jan. 31, 2020", w/ English Claims, 19 pgs.
"Korean Application Serial No. 10-2020-7008140, Notice of Preliminary Rejection mailed Jun. 16, 2020", w/ English Translation, 7 pgs.
"Korean Application Serial No. 10-2024-7010656, Notice of Preliminary Rejection mailed Oct. 24, 2024", w/ English Translation, 9 pgs.
"Mobile Location User Cases and Case Studies", Interactive Advertising Bureau, (Mar. 2014), 25 pgs.
"WIPO; International Preliminary Report; WO201776739", (Sep. 10, 2018), 5 pgs.
"WIPO; Search Strategy; WO201776739", (Dec. 10, 2017), 6 pgs.
Carr, Dale, "Mobile Ad Targeting: A Labor of Love", Ad Week, [Online] Retrieved from the Internet on Feb. 11, 2019: <URL: https://www.adweek.com/digital/mobile-ad-targeting-a-labor-of-love/ >, (Feb. 12, 2016), 7 pgs.
Isaac, Mike, "New Mobile App Vyclone Aims to Remix Video From Every Angle", All Things D, The Wallstreet Journal, [Online] Retrieved from the Internet: <URL: https://allthingsd.com/20120718/new-mobile-app-vyclone-aims-to-remix-social-video-from-every-angle/>, (Jul. 18, 2012), 4 pgs.
Kumar, S, "Optimization Issues in Web and Mobile Advertising", Chapter 2—Pricing Models in Web Advertising, SpringerBriefs in Operations Management, (2016), 6 pgs.
Nadel, Ben, "Using Multiple Dropzones and Filed Inputs With a Single Plupload Instance",[Online]. Retrieved from thes Internet: <httpe://www.bennadel.com/blog/2564-using-multiple-dropzones-and-file-inputs-with-a-single-plupload-instance.htm>, (Dec. 14, 2013), 16 pgs.
Naylor, Joseph, "Geo-Precise Targeting: It's time to Get off the Fence", Be in the Know Blog, [Online] Retrieved from the internet by the examiner on May 16, 2019: <URL: http://blog.cmglocalcolutions.com/geo-precise-targeting-its-time-to-get-off-the-fence>, (May 15, 2015), 6 pgs.
Palmer, Alex, "Geofencing at events: how to reach potential customers live and on-site", Streetfight Mag, [Online] Retrieved form the internet by the examiner on May 16, 2019: <URL: http://streetfightmag.com/2015/08/20/geofencing-at-events-how-to-reach-potential-customers-live-and-on-site>, (Aug. 20, 2015), 6 pgs.
Peterson, Lisa, et al., "Location-Based Advertising", Peterson Mobility Solutions, (Dec. 2009), 39 pgs.
Quercia, Daniele, et al., "Mobile Phones and Outdoor Advertising: Measurable Advertising", IEEE Persuasive Computing, (2011), 9 pgs.
Simonite, Tom, "Mobile Data: A Gold Mine for Telcos", MIT Technology Review, (May 27, 2010), 6 pgs.
Virgillito, Dan, "Facebook Introduces Mobile Geo-Fencing With Local Awareness Ads", Adespresso, [Online] Retrieved from the internet by the examiner on May 16, 2019: <URL: https://adespresso.com/blog/facebook-local-business-ads-geo-fencing/>, (Oct. 8, 2014), 14 pgs.
U.S. Appl. No. 19/005,414, filed Dec. 30, 2024, Geo-Fence Authorization Provisioning.
U.S. Appl. No. 18/968,630, filed Dec. 4, 2024, Gallery of Messages From Individuals With a Shared Interest.
"U.S. Appl. No. 16/933,279, Examiner Interview Summary mailed Jul. 28, 2025", 2 pgs.
"U.S. Appl. No. 16/933,279, Non Final Office Action mailed May 2, 2025", 22 pgs.
"U.S. Appl. No. 16/933,279, Response filed Apr. 7, 2025 to Final Office Action mailed Nov. 7, 2024", 13 pgs.
"U.S. Appl. No. 16/933,279, Response filed Aug. 5, 2025 to Non Final Office Action mailed May 2, 2025", 15 pgs.
"U.S. Appl. No. 17/323,702, Examiner Interview Summary mailed Jul. 28, 2025", 2 pgs.
"U.S. Appl. No. 17/323,702, Final Office Action mailed Jun. 11, 2025", 15 pgs.
"U.S. Appl. No. 17/323,702, Response filed Apr. 7, 2025 to Non Final Office Action mailed Nov. 6, 2024", 12 pgs.
"U.S. Appl. No. 18/464,013, Corrected Notice of Allowability mailed Jan. 27, 2025", 2 pgs.
"Korean Application Serial No. 10-2024-7010656, Response filed Apr. 24, 2025 to Notice of Preliminary Rejection mailed Oct. 24, 2024", W/English Claims, 19 pgs.
"U.S. Appl. No. 16/933,279, Non Final Office Action mailed Jan. 23, 2024", 20 pgs.
"U.S. Appl. No. 15/947,350, Notice of Allowance mailed Jan. 25, 2024", 8 pgs.
"U.S. Appl. No. 17/567,397, Non Final Office Action mailed Feb. 9, 2024", 34 pgs.
"U.S. Appl. No. 16/933,366, Response filed Feb. 13, 2024 to Final Office Action mailed Oct. 13, 2023", 16 pgs.
"U.S. Appl. No. 15/947,350, Notice of Allowability mailed Feb. 14, 2024", 2 pgs.
"Canadian Application Serial No. 2,962,822, Examiner's Rule 86(2) Report mailed Feb. 14, 2024", 5 pgs.
"U.S. Appl. No. 16/933,366, Examiner Interview Summary mailed Feb. 26, 2024", 2 pgs.
U.S. Appl. No. 16/000,657, filed Jun. 5, 2018, Ephemeral Gallery of Ephemeral Messages With Opt-In Permanence.
U.S. Appl. No. 16/219,577, filed Dec. 13, 2018, Geo-Location Based Event Gallery.
U.S. Appl. No. 16/204,886, filed Nov. 29, 2018, Prioritizaiion of Messages Within a Message Collection.
"U.S. Appl. No. 15/729,582, Corrected Notice of Allowability mailed Dec. 18, 2019", 3 pgs.
"U.S. Appl. No. 16/219,577, Notice of Allowance mailed Jan. 15, 2020", 7 pgs.
"U.S. Appl. No. 16/933,279, Final Office Action mailed Oct. 16, 2025", 21 pgs.
"U.S. Appl. No. 17/323,702, Response filed Nov. 7, 2025 to Final Office Action mailed Jun. 11, 2025", 18 pgs.
"U.S. Appl. No. 17/323,702, Non Final Office Action mailed Dec. 16, 2025", 15 pgs.
"U.S. Appl. No. 16/933,279, Examiner Interview Summary mailed Jan. 29, 2026", 2 pgs.
"U.S. Appl. No. 16/933,279, Response filed Feb. 17, 2026 to Final Office Action mailed Oct. 16, 2025", 16 pgs.
"U.S. Appl. No. 18/968,630, Non Final Office Action mailed Apr. 15, 2026", 16 pgs.
"U.S. Appl. No. 16/933,279, Non Final Office Action mailed Apr. 21, 2026", 25 pgs.
"U.S. Appl. No. 17/323,702, Final Office Action mailed Jun. 29, 2026", 18 pgs.
"U.S. Appl. No. 17/323,702, Response filed May 18, 2026 to Non Final Office Action mailed Dec. 16, 2025", 22 pgs.
"U.S. Appl. No. 18/968,630, Response filed Jun. 30, 2026 to Non Final Office Action mailed Apr. 15, 2026", 9 pgs.
"U.S. Appl. No. 19/576,720, Notice of Allowance mailed Jun. 3, 2026", 10 pgs.

* cited by examiner

| 700 | 702 | 704 |
|---|---|---|
| Message_1 | 10 Seconds | 120 Minutes Left |
| Message_2 | 5 Seconds | 360 Minutes Left |
| Message_3 | 5 Seconds | 1200 Minutes Left |
| Message_4 | 10 Seconds | 1320 Minutes Left |

FIG. 7

GALLERY USER INTERFACE WITH LAST POSTED MESSAGE INDICATION

CLAIM OF PRIORITY

This application is a continuation and claims the benefit of priority of U.S. patent application Ser. No. 14/505,478, filed Oct. 2, 2014, which is hereby incorporated by reference herein in its entirety.

FIELD OF THE INVENTION

This invention relates generally to the display of computer network delivered ephemeral messages. More particularly, this invention relates to an ephemeral gallery of ephemeral messages.

BACKGROUND OF THE INVENTION

Messages (e.g., text, photo or video) delivered over computer networks are well known. However, one problem associated with such messages is that they require an affirmative act on the part of a user to delete or remove messages from their devices once the messages have been viewed or read. As a result, in some instances, users refrain from spontaneously sending many messages for fear of filling or cluttering a recipient's in-box.

In view of the foregoing, it would be desirable to maintain spontaneity and expand communicative content of messaging activity, while reducing the device management burdens imposed upon a message recipient.

SUMMARY OF THE INVENTION

A server has a processor and a memory storing instructions executed by the processor to maintain an ephemeral gallery of ephemeral messages. An ephemeral message is posted to the ephemeral gallery. The ephemeral message has an associated message duration parameter and a gallery participation parameter. An ephemeral message is removed from the ephemeral gallery in response to the identification of an expired gallery participation parameter.

BRIEF DESCRIPTION OF THE FIGURES

The invention is more fully appreciated in connection with the following detailed description taken in conjunction with the accompanying drawings, in which:

FIG. 7 illustrates an ephemeral gallery data structure associated with an embodiment of the invention.

Like reference numerals refer to corresponding parts throughout the several views of the drawings.

DETAILED DESCRIPTION OF THE INVENTION

Figure 1:
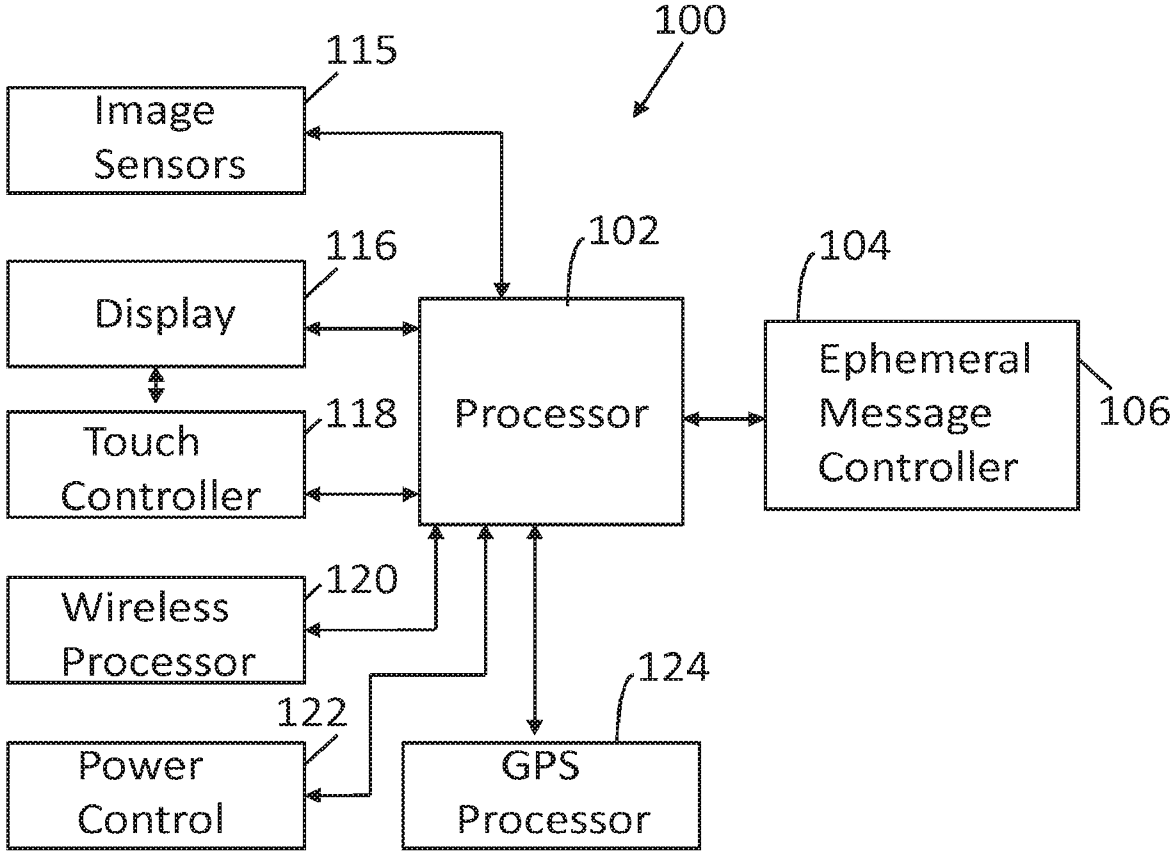
FIG. 1 illustrates components of an electronic device utilized in accordance with the invention.

FIG. 1 illustrates an electronic device 100. In one embodiment, the electronic device 100 is a smartphone with a processor 102 in communication with a memory 104. The processor 102 may be a central processing unit and/or a graphics processing unit. The memory 104 is a combination of flash memory and random access memory. The memory 104 stores an ephemeral message controller 106 to implement operations of the invention. The ephemeral message controller 106 may include executable instructions to access a server which coordinates operations disclosed herein. Alternately, the ephemeral message controller 106 may include executable instructions to coordinate some of the operations disclosed herein, while the server implements other operations.

An ephemeral message may be a text, an image, a video and the like. The display time for the ephemeral message is typically set by the message sender. However, the display time may be a default setting or a setting specified by the recipient. Regardless of the setting technique, the message is transitory (i.e., the message is deleted or otherwise made inaccessible after a certain period of time or after a certain action has been taken).

The processor 102 is also coupled to image sensors 115. The image sensors 115 may be known digital image sensors, such as charge coupled devices. The image sensors capture visual media, which is presented on display 116.

A touch controller 118 is connected to the display 116 and the processor 102. The touch controller 118 is responsive to haptic signals applied to the display 116. In one embodiment, the ephemeral message controller 106 monitors signals from the touch controller 118. If haptic contact is observed by the touch controller 118 in connection with indicia of an ephemeral gallery, then the ephemeral gallery is displayed to the user as a sequence of ephemeral messages.

The electronic device 100 may also include other components commonly associated with a smartphone, such as a wireless signal processor 120 to provide connectivity to a wireless network. A power control circuit 122 and a global positioning system processor 124 may also be utilized. While many of the components of FIG. 1 are known in the art, new functionality is achieved through the ephemeral message controller 106 operating in conjunction with a server.

Figure 2:
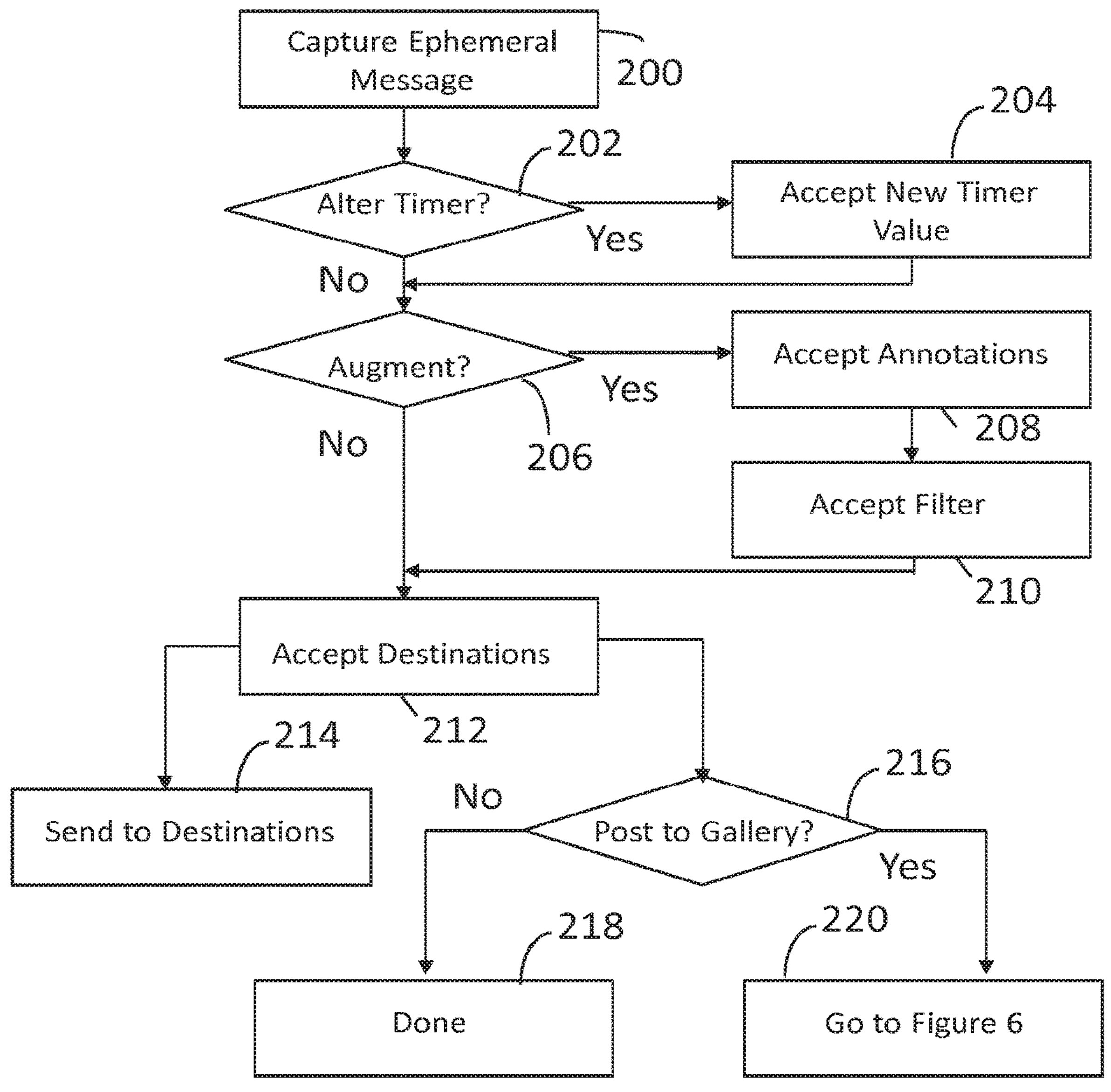
FIG. 2 illustrates processing operations associated with an embodiment of the invention.
Figure 3:
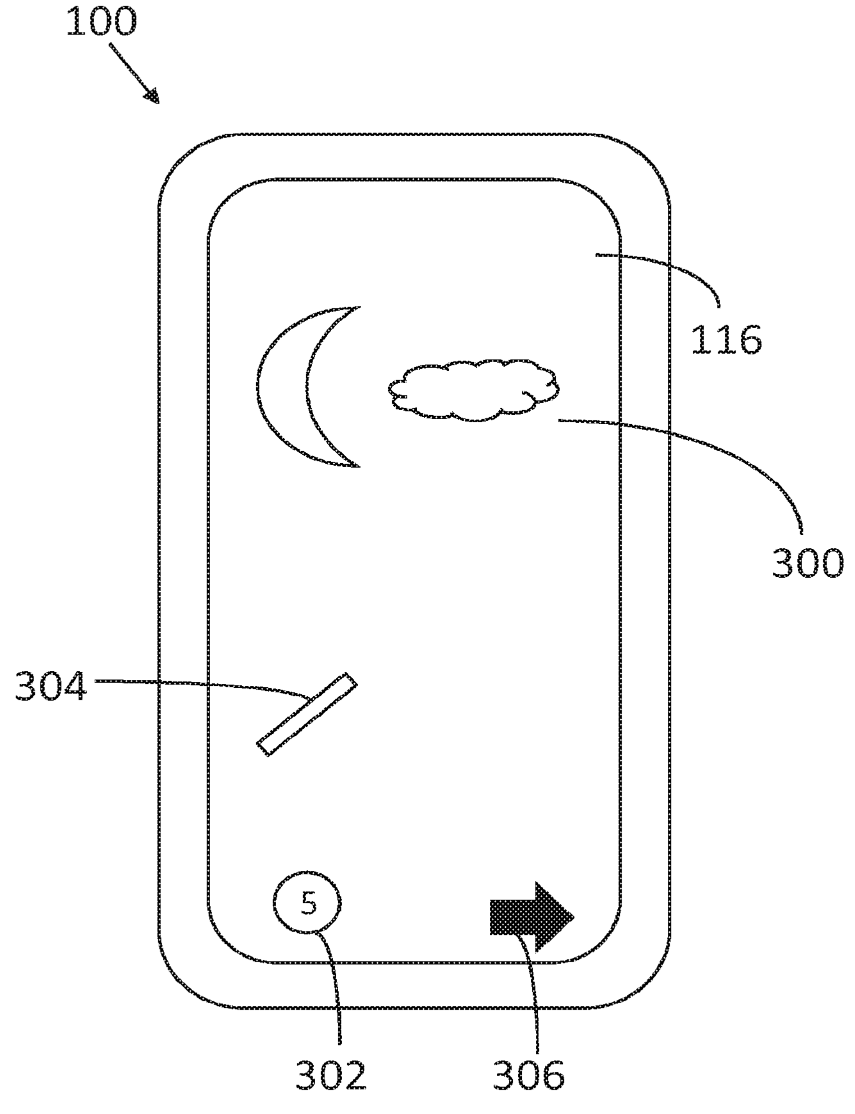
FIG. 3 illustrates an electronic device for capturing and augmenting an ephemeral message.

FIG. 2 illustrates processing operations associated with the ephemeral message controller 106. Initially, an ephemeral message is captured 200. FIG. 3 illustrates electronic device 100 and touch display 116 with a photograph 300 operative as an ephemeral message.

The next processing operation of FIG. 2 is to determine whether to alter a timer or a message duration parameter 202. FIG. 3 illustrates an example of indicia 302 of a message duration parameter. In this example, the indicia indicates a default of 5 seconds as the message duration parameter. If the indicia is engaged (e.g., through haptic contact), then a prompt may be supplied for a new message duration parameter (e.g., 10 seconds). Such activity (202—Yes) results in the acceptance of the new timer value 204. If a new timer value is specified or no alteration of a timer transpires (202—No) control proceeds to block 206. The user may be prompted to augment the ephemeral message. As shown in FIG. 3, a drawing tool 304 may be supplied to allow a user to add a hand drawn message. The drawing tool 304 may be manipulated by haptic contact to enter a message or annotation of visual media. Alternately or in addition, a keyboard may be used to type augment a message. For example, a tap on the touch display 116 may result in a keyboard being displayed, which allows a user to enter a typed message.

As shown in FIG. 2, annotations may be accepted 208 in this manner. Augmentation may also be in the form of photograph filters. That is, photograph filters may be accepted 210. For example, a first right-to-left swipe motion on the touch display 116 may drag a first filter on top of the photograph. A second right-to-left swipe motion on the touch display 116 may drag a second filter on top of the photograph. Filter processing of this type is described in commonly owned U.S. Ser. No. 14/325,270, filed Jul. 7, 2014, the contents of which are incorporated herein by reference.

Figure 4:
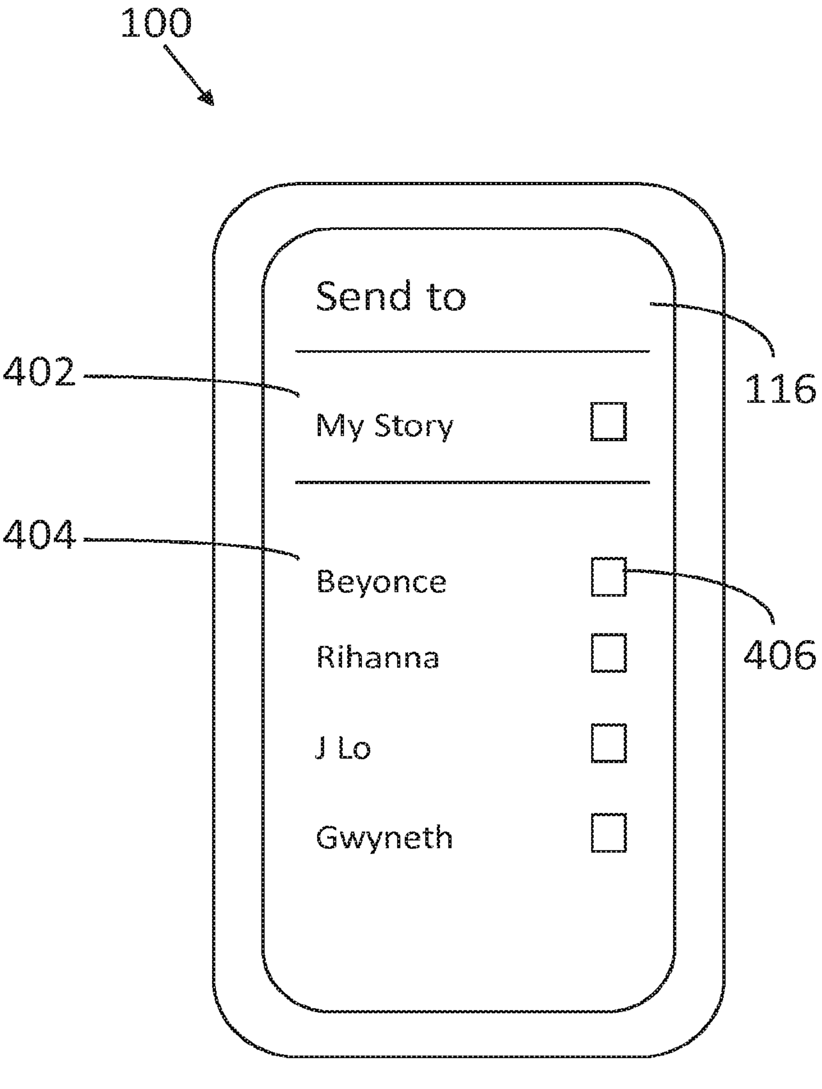
FIG. 4 illustrates an ephemeral message destination routing interface that may be used in accordance with an embodiment of the invention.

The next operation of FIG. 2 is to accept destinations 212. As more fully described below, a destination may be used to identify intended recipients of a message or a location or "gallery" where one or more messages may be accessed. FIG. 3 illustrates an icon 306 to invoke a destination list. Haptic contact on the icon may result in a destination list of the type shown in FIG. 4. FIG. 4 illustrates an electronic device 100 displaying a destination list. The destination list may include a destination of "My Story" 402, where "My Story" is a reference to an ephemeral gallery of ephemeral messages. The destination list may also include a friends or contacts section 404 listing various friends that may be ephemeral message recipients. Haptic contact with a box 406 associated with a listed individual or story places the corresponding individual or story on a destination list.

Figure 6:
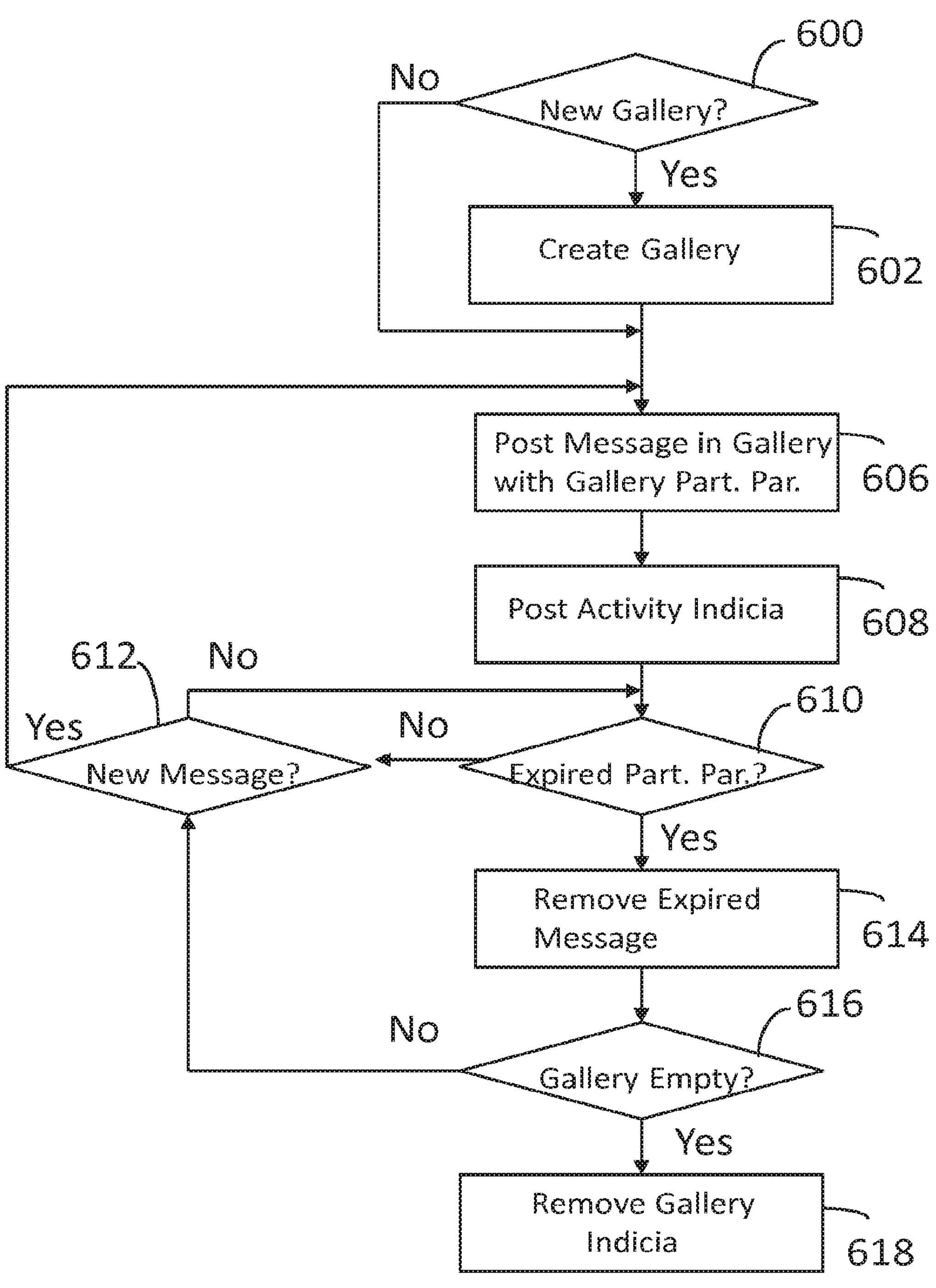
FIG. 6 illustrates ephemeral gallery processing operations associated with an embodiment of the invention.

Returning to FIG. 2, after the destination list is specified, the ephemeral message is sent to the specified destinations 214. For example, the ephemeral message is sent to friends selected from section 404, if any. A check is also made to determine whether the message should be posted to an ephemeral gallery 216. If not (216—No), processing is completed. If so (216—Yes), the processing of FIG. 6 is performed 220. Thus, it is possible to send a message to one or more friends and/or post to an ephemeral gallery.

Figure 5:
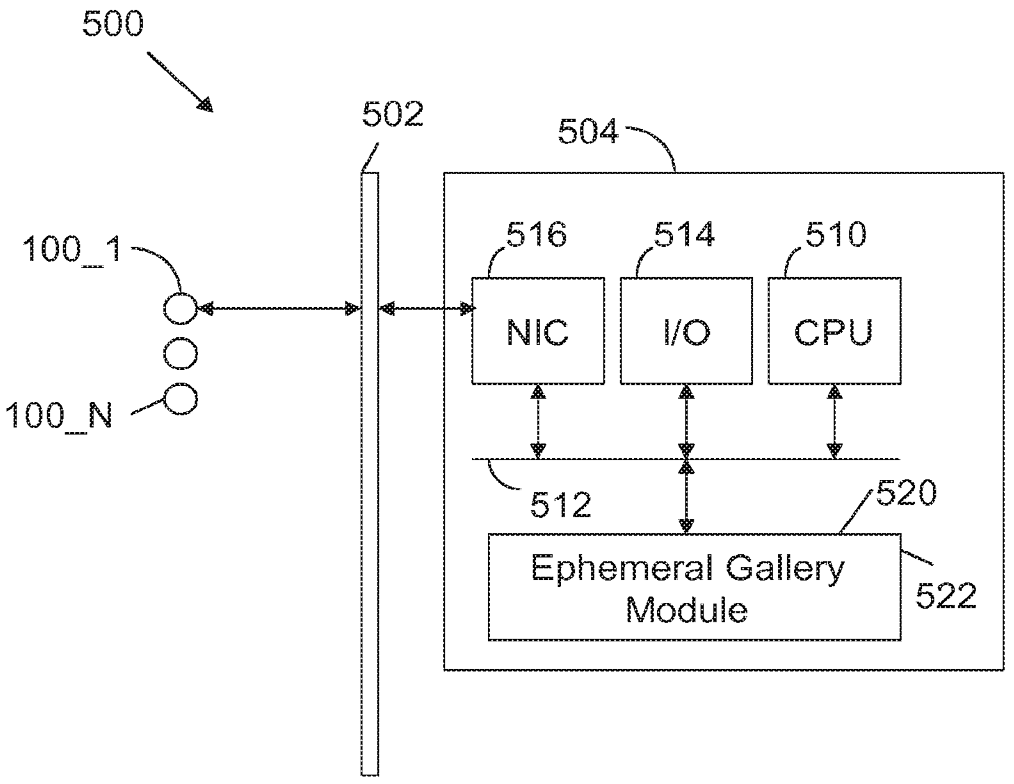
FIG. 5 illustrates a system to implement an embodiment of the invention.

FIG. 5 illustrates a system 500. The figure presents a simplified representation of a set of electronic devices 100_1 through 100_N, where each electronic device may be configured as the device of FIG. 1. Each electronic device is in communication with a network 502, which may be any combination of wireless and wired networks.

A server 504 is also connected to the network 502. The server 504 includes standard components, such as a central processing unit 510 connected to input/output devices 514 via a network 512. The input/output devices 514 may include a keyboard, mouse, display and the like. A network interface circuit 516 is also connected to the bus 512 to provide connectivity to network 502. A memory 520 is also connected to the bus 512. The memory 520 stores an ephemeral gallery module 522. The ephemeral gallery module 522 stores instructions executed by the central processing unit 510 to implement operations of the invention. For example, the ephemeral gallery module 522 may include instructions to coordinate the processing operations of FIG. 2. These operations may be controlled by the ephemeral gallery module 522 or they may be performed in conjunction with selective operations performed by the ephemeral message controller 106.

FIG. 6 illustrates ephemeral gallery module 522 operations performed in accordance with an embodiment of the invention. The first operation of FIG. 6 is to determine whether a new gallery is needed 600. As discussed in connection with FIG. 4, designating "My Story" 402 as a message recipient results in a post of an ephemeral message to an ephemeral gallery. If a gallery does not exist (600—Yes), then a new gallery is created 602. Alternately, if a gallery does exist and a user wants to create a new gallery, then the new gallery is created 602. The user may be supplied a prompt to indicate whether an existing gallery should be used or a new gallery should be designated.

The message is then posted in the gallery with a gallery participation parameter 606. The gallery participation parameter is an ephemeral period of time that the ephemeral message will continue to exist in the gallery. For example, a first ephemeral message posted to the gallery may have a default gallery participation parameter of 24 hours. In other instances, the gallery participation parameter may be set by a user. The gallery participation parameter value decreases with the passage of time. Thus, in this embodiment, an ephemeral message gallery subsists for as long as the gallery participation parameter of the last message posed to the gallery.

In another embodiment, a gallery timer may be assigned to a gallery by a user. The gallery timer may be used to establish a lifespan of an associated gallery and messages posted to this gallery subsist for no longer than the life of the gallery. Thus, in some embodiments, all messages posted to such a gallery will subsist for the duration of the life of the gallery (regardless of posting time). In other embodiments, messages may be submitted with a gallery participation parameter. In these embodiments, messages expire and become inaccessible at the earlier of the gallery participation parameter or the remaining life of the gallery.

The next processing operation of FIG. 6 is to post activity indicia 608. Examples of activity indicia are provided below. A check is then made to determine whether there is an expired participation parameter 610. If so (610—Yes), the ephemeral message associated with the expired participation parameter is removed from the ephemeral gallery 614. If as a result of this removed message the gallery is empty (616—Yes), then the ephemeral gallery terminates and indicia of the gallery is removed 618. If the gallery is not empty (616—No), a check is made for a new message 612. If a new message exists (612—Yes), then processing returns to block 604. If a new message does not exist (612—No), then processing returns to block 610. If an expired participation parameter does not exist (610—No), then a check is made once again for a new message 612.

FIG. 7 illustrates a data structure for an ephemeral message gallery. A first column 700 may have a list of messages. Another column 702 may have a list of message duration parameters for individual messages. Another column 704 may have a list of gallery participation parameters for individual messages. Observe in this example that the values in column 702 add up to 30 seconds. Thus, the ephemeral message gallery in this example has four messages that will take 30 seconds to display. Further observe that the oldest message (Message_1) is displayed first and will be removed in 120 minutes. In this example, the newest message (Message_4) will remain in the ephemeral gallery for 1320 minutes at which point the ephemeral gallery will expire, unless another message is posted. The arrival of a new message alters the gallery timer, but does not alter gallery participation parameters.

Figure 8:
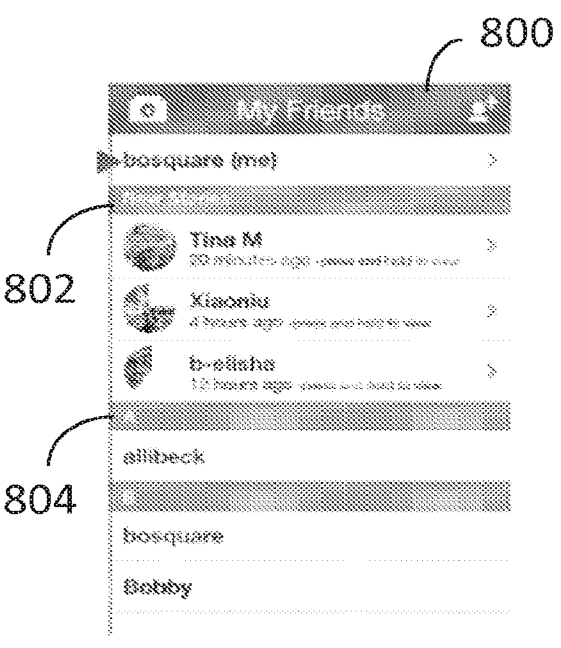
FIG. 8 illustrates ephemeral gallery indicia associated with an embodiment of the invention.

FIG. 8 illustrates an interface 800 with a section 802 that designates available ephemeral message galleries (stories) and a section 804 with a listing of friends (available destinations for an ephemeral message). Observe that section 802 has indicia of ephemeral message gallery activity. FIG. 8 provides example indicia of the time that the last message was posted to the ephemeral message gallery. FIG. 8 also provides example graphical indicia of the amount of time remaining for an ephemeral message gallery. Observe that the first entry was posted 20 minutes ago and therefore has a full circle indicative of the time remaining for that ephemeral message gallery. On the other hand, the third entry was posted 12 hours ago and has approximately half a circle to indicate the time remaining for that ephemeral message gallery. This example contemplates a 24 hour period for an ephemeral message gallery. Naturally, other time periods may be utilized in accordance with embodiments of the invention.

Figure 9:
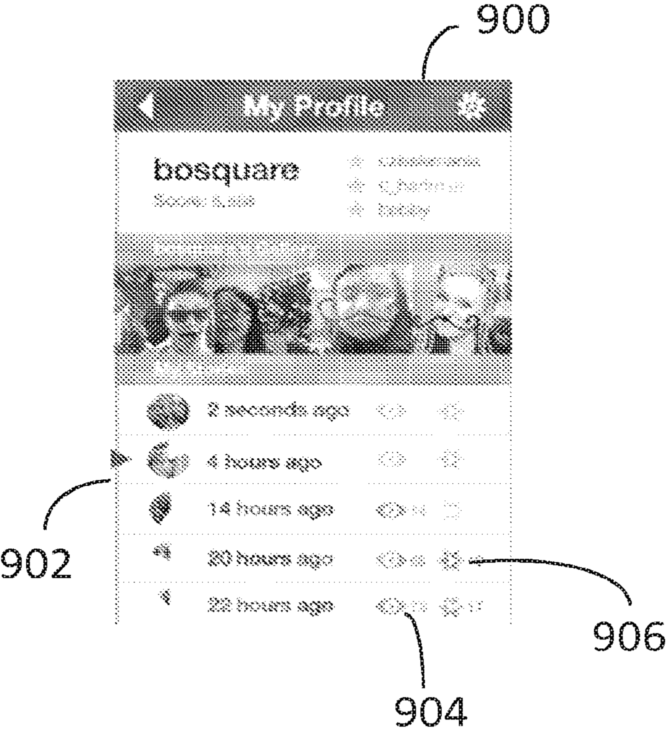
FIG. 9 illustrates ephemeral gallery indicia associated with another embodiment of the invention.

FIG. 9 illustrates an interface 900 with information on a user's stories. Individual stories 902 have indicia of the amount of time remaining. Indicia 904 of the number of ephemeral gallery views is also provided. Indicia 906 of screenshots taken of an ephemeral message is also provided. This information is significant since the intent of the message was that it be ephemeral. If a message recipient overrides this intent by taking a screen shot, then the message sender is advised.

Figure 10:
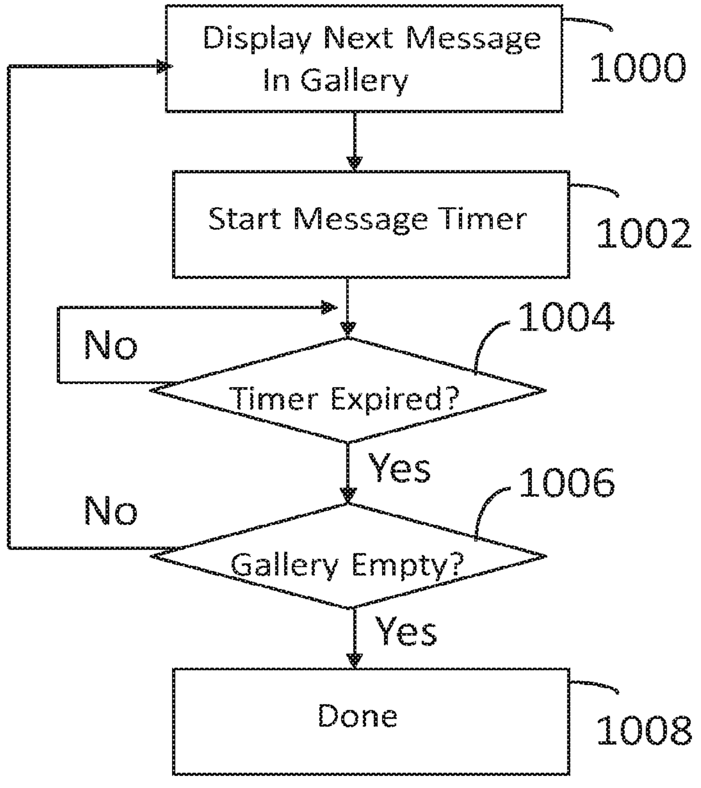
FIG. 10 illustrates operations performed in response to an ephemeral gallery view request.

FIG. 10 illustrates processing operations performed by the ephemeral gallery module 522 in response to a request for an ephemeral message gallery. As shown in FIG. 8, a user receives a list of 802 of available stories. Haptic contact with indicia of a story is operative as a request to view an ephemeral message gallery.

The first operation in FIG. 10 is to display the next message in the gallery 1000. In the example of FIG. 7, the oldest message is the first message to be displayed. A message timer is then started 1002. The message timer expires at the end of the message duration parameter for the displayed ephemeral message. In the example of FIG. 7, the first message (Message_1) is displayed for 10 seconds. Block 1004 checks for the timer to expire. Upon expiration of the timer (1004—Yes), a check is made to determine if the gallery is empty 1006. If so (1006—Yes), processing is completed 1008. If not (1006—No), processing returns to block 1000. This processing loop is repeated until the gallery is empty.

Figure 11:
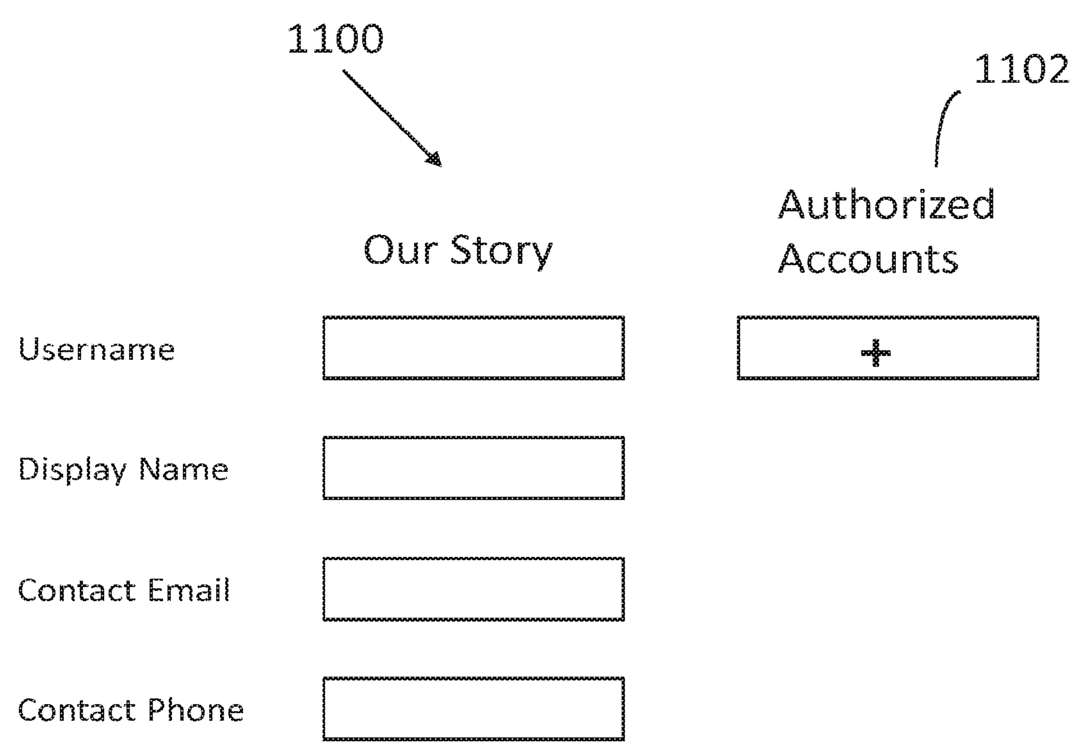
FIG. 11 illustrates an account administration interface to establish an ephemeral gallery that receives ephemeral messages from multiple users.

FIG. 11 illustrates an account administration interface 1100 to establish an ephemeral gallery that receives ephemeral messages from multiple users. Such a feature may be used to facilitate celebrity or organizational accounts where numerous authorized users are allowed to post on behalf of a single account. In one embodiment, a username, display name, contact email and contact phone are specified by an account administrator. An authorized accounts prompt 1102 allows the account administrator to add other users to the ephemeral gallery. For example, activation of the prompt 1102 may result in prompts for a username, display name, contact email and/or contact phone. Alternately, activation of the prompt 1102 may result in an interface of the type shown in FIG. 4 through which authorized accounts may be added.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method comprising:

maintaining a gallery comprising a plurality of ephemeral messages that respectively comprise visual media content including photographic or video material, each of the plurality of ephemeral messages having a respective posting time at which the ephemeral message was posted to the gallery, each ephemeral message having an associated ephemeral lifetime that begins at the respective posting time thereof and that ends upon expiration of a default period of time subsequent to the respective posting time thereof, a last posted ephemeral message being that one of the plurality of ephemeral messages whose posting time is most recent;

causing display on a user device of a user interface that enables viewing of the gallery on the user device the user interface including:

a plurality of gallery items representing a corresponding plurality of galleries, a particular one of the plurality of gallery items corresponding to said gallery; and a respective recency label displayed in visual association with each of the plurality of gallery items, each recency label displaying an immediately visible alpha-numerical representation of a time value indicative of a time elapsed since the posting time of the last posted ephemeral message in the associated gallery;

receiving user input indicating selection of the particular gallery item corresponding to said gallery;

responsive to selection of the particular gallery item, causing automated sequential display of the plurality of ephemeral message on the user device, the automated sequential display comprising displaying the respective visual media content of the plurality of ephemeral messages one at a time and one after another in a chronological sequence that corresponds in order to the respective posting times such that the last posted message is displayed last in the chronological sequence; and for each of the plurality of ephemeral messages, responsive to expiration of the respective associated ephemeral lifetime, automatically removing the ephemeral message from the gallery such that the ephemeral message is thereafter unavailable for viewing as part of the gallery.

2. The method of claim 1, wherein the displayed time value comprises a continued availability value for the associated gallery, the continued availability value being defined as an interval between a present time and expiry of the ephemeral lifetime of the last posted message.

3. The method of claim 1, cam wherein the alpha-numerical representation of each recency label includes numerical indicia.

4. The method of claim 1, wherein the respective time value represented by each recency label comprises an elapsed time since the posting time of the last posted ephemeral message in the associated gallery.

5. The method of claim 1, further comprising:

maintaining a gallery availability parameter based on the posting time of the last posted ephemeral message in the gallery, the gallery availability parameter indicating a time value associated with continued availability of the gallery for viewing via the user interface; and responsive to the gallery availability parameter satisfying predefined criteria, making the gallery unavailable for viewing via the user interface.

6. The method of claim 5, wherein the predefined criteria for the gallery availability parameter are satisfied when time elapsed since the posting time of the last posted ephemeral message is equal to or greater than said default period of time that defines the associated ephemeral lifetime of the last posted ephemeral message.

7. The method of claim 6, wherein the default period is 24 hours.

8. The method of claim 1, wherein the particular gallery item of said gallery comprises a graphical user interface element having an on-screen area that is variable corresponding to variation in the amount of time elapsed since the posting time of the last posted ephemeral message in the gallery.

9. The method of claim 8, wherein the on-screen area of the user interface element of said gallery item is inversely proportional to the time elapsed since posting of the last posted ephemeral message in the gallery, the on-screen area progressively decreasing with passage of time.

10. A system comprising:

one or more computer processors; and one or more memories storing instructions executed by the one or more computer processors to configure the one or more computer processors to perform automated operations comprising:

maintaining a gallery comprising a plurality of ephemeral messages that respectively comprise visual media content including photographic or video material, each of the plurality of ephemeral messages having a respective posting time at which the ephemeral message was posted to the gallery, each ephemeral message having an associated ephemeral lifetime that begins at the respective posting time thereof and that ends upon expiration of a default period of time subsequent to the respective posting time thereof, a last posted ephemeral message being that one of the plurality of ephemeral messages whose posting time is most recent;

causing display on a user device of a user interface that enables viewing of the gallery on the user device the user interface including:

a plurality of gallery items representing a corresponding plurality of galleries, a particular one of the plurality of gallery items corresponding to said gallery; and a respective recency label displayed in visual association with each of the plurality of gallery items, each recency label displaying an immediately visible alpha-numerical representation of a time value indicative of a time elapsed since the posting time of the last posted ephemeral message in the associated gallery;

receiving user input indicating selection of the particular gallery item corresponding to said gallery;

responsive to selection of the particular gallery item, causing automated sequential display of the plurality of ephemeral message on the user device, the automated sequential display comprising displaying the respective visual media content of the plurality of ephemeral messages one at a time and one after another in a chronological sequence that corresponds in order to the respective posting times such that the last posted message is displayed last in the chronological sequence; and for each of the plurality of ephemeral messages, responsive to expiration of the respective associated ephemeral lifetime, automatically removing the ephemeral message from the gallery such that the ephemeral message is thereafter unavailable for viewing as part of the gallery.

11. The system of claim 10, wherein the displayed time value comprises a continued availability value for the associated gallery, the continued availability value being defined as an interval between a present time and expiry of the ephemeral lifetime of the last posted message.

12. The system of claim 10, wherein the alpha-numerical representation of each recency label includes numerical indicia.

13. The system of claim 10, wherein the respective time value represented by each recency label comprises an elapsed time since the posting time of the last posted ephemeral message in the associated gallery.

14. The system of claim 10, wherein the instructions further configure the one or more processors to perform operations comprising:

maintaining a gallery availability parameter based on the posting time of the last posted ephemeral message in the gallery, the gallery availability parameter indicating a time value associated with continued availability of the gallery for viewing via the user interface; and responsive to the gallery availability parameter satisfying predefined criteria, making the gallery unavailable for viewing via the user interface.

15. The system of claim 14, wherein the predefined criteria for the gallery availability parameter are satisfied when time elapsed since the posting time of the last posted ephemeral message is equal to or greater than said default period of time that defines the associated ephemeral lifetime of the last posted ephemeral message.

16. A non-transitory computer readable storage medium having stored thereon instructions for causing a machine, when executing the instructions, to perform operations comprising:

maintaining a gallery comprising a plurality of ephemeral messages that respectively comprise visual media content including photographic or video material, each of the plurality of ephemeral messages having a respective posting time at which the ephemeral message was posted to the gallery, ephemeral message having an associated ephemeral lifetime that begins at the respective posting time thereof and that ends upon expiration of a default period of time subsequent to the respective posting time thereof, a last posted ephemeral message being that one of the plurality of ephemeral messages whose posting time is most recent;

causing display on a user device of a user interface that enables viewing of the gallery on the user device the user interface including:

a plurality of gallery items representing a corresponding plurality of galleries, a particular one of the plurality of gallery items corresponding to said gallery; and a respective recency label displayed in visual association with each of the plurality of gallery items, each recency label displaying an immediately visible alpha-numerical representation of a time value indicative of a time elapsed since the posting time of the last posted ephemeral message in the associated gallery;

receiving user input indicating selection of the particular gallery item corresponding to said gallery;

responsive to selection of the particular gallery item, causing automated sequential display of the plurality of ephemeral message on the user device, the automated sequential display comprising displaying the respective visual media content of the plurality of ephemeral messages one at a time and one after another in a chronological sequence that corresponds in order to the respective posting times such that the last posted message is displayed last in the chronological sequence; and for each of the plurality of ephemeral messages, responsive to expiration of the respective associated ephemeral lifetime, automatically removing the ephemeral message from the gallery such that the ephemeral message is thereafter unavailable for viewing as part of the gallery.

17. The non-transitory computer readable storage medium of claim 16, wherein the displayed time value comprises a continued availability value for the associated gallery, the continued availability value being defined as an interval between a present time and the expiry time of the last posted ephemeral message.

18. The non-transitory computer readable storage medium of claim 16, further comprising:

maintaining a gallery availability parameter based on the posting time of the last posted ephemeral message in the gallery, the gallery availability parameter indicating a time value associated with continued availability of the gallery for viewing via the user interface; and responsive to the gallery availability parameter satisfying predefined criteria, making the gallery unavailable for viewing via the user interface.

19. The non-transitory computer readable storage medium of claim 18, wherein the predefined criteria for the gallery availability parameter is satisfied upon occurrence of the expiry time of the last posted ephemeral message.

20. The non-transitory computer readable storage medium of claim 16, wherein the respective time value represented by each recency label comprises an elapsed time since the posting time of the last posted ephemeral message in the associated gallery.

* * * * *